US010576335B2

(12) United States Patent
Greaney et al.

(10) Patent No.: US 10,576,335 B2
(45) Date of Patent: Mar. 3, 2020

(54) GOLF CLUB INCLUDING COMPOSITE MATERIAL WITH COLOR COATED FIBERS AND METHODS OF MAKING THE SAME

(71) Applicant: Taylor Made Golf Company, Inc., Carlsbad, CA (US)

(72) Inventors: Mark Greaney, Vista, CA (US); Mattieu Bovee, Carlsbad, CA (US); Colin O'Connell-Long, Encinitas, CA (US); Todd Beach, San Diego, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

(21) Appl. No.: 16/039,844

(22) Filed: Jul. 19, 2018

(65) Prior Publication Data

US 2019/0022478 A1    Jan. 24, 2019

Related U.S. Application Data

(60) Provisional application No. 62/609,027, filed on Dec. 21, 2017, provisional application No. 62/535,092, filed on Jul. 20, 2017.

(51) Int. Cl.
*A63B 53/04*    (2015.01)
*A63B 53/06*    (2015.01)
(Continued)

(52) U.S. Cl.
CPC .... *A63B 53/0466* (2013.01); *A63B 2053/002* (2013.01); *A63B 2053/0429* (2013.01); *A63B 2209/02* (2013.01); *B32B 5/024* (2013.01)

(58) Field of Classification Search
USPC .................................... 473/324–350
See application file for complete search history.

(56) References Cited

U.S. PATENT DOCUMENTS 4,519,804 A * 5/1985 Kato ...................... D04H 1/495
428/171
5,035,764 A * 7/1991 Blake .................... B29C 70/086
156/166

(Continued)

FOREIGN PATENT DOCUMENTS

CN    103806042 A    5/2014
EP     0149763 A2    7/1985
(Continued)

OTHER PUBLICATIONS

Translation of Office Action issued in Japanese Patent Application No. 2018-135438, dated Jun. 26, 2019.

*Primary Examiner* — Alvin A Hunter
(74) *Attorney, Agent, or Firm* — Sterne, Kessler, Goldstein & Fox P.L.L.C.

(57) ABSTRACT

A golf club including at least one component with a construction that includes a composite material with color/metallic coated fibers. In some embodiments, at least a portion of an outer surface of the golf club head is defined by a layered structure including color/metallic coated fibers. The layered structure may include a non-woven composite layer comprising a plurality of unidirectional fiber composite plies and woven composite layer disposed over the non-woven fiber composite layer and including color/metallic coated fibers. In some embodiments, an optically transparent coating may be disposed over the woven composite layer. In some embodiments, the color/metallic coated fibers may be electroplated fibers.

24 Claims, 49 Drawing Sheets

(51) Int. Cl.
    *A63B 53/00*     (2015.01)
    *B32B 5/02*     (2006.01)

(56) References Cited

U.S. PATENT DOCUMENTS

| | | | | |
|---|---|---|---|---|
| 5,242,720 A * | 9/1993 | Blake | B29C 70/086 | 428/34.5 |
| 5,425,538 A * | 6/1995 | Vincent | A63B 53/04 | 473/342 |
| 5,464,695 A * | 11/1995 | Kawamoto | D01F 1/10 | 428/370 |
| 5,916,042 A * | 6/1999 | Reimers | A63B 53/04 | 473/334 |
| 6,387,488 B1 * | 5/2002 | Kumazawa | D01D 5/30 | 428/220 |
| 6,435,980 B1 * | 8/2002 | Reyes | A63B 53/04 | 473/324 |
| 6,969,326 B2 * | 11/2005 | De Shiell | A63B 53/0466 | 473/345 |
| 6,992,029 B1 * | 1/2006 | Chou | D03D 15/00 | 139/420 C |
| 7,267,620 B2 * | 9/2007 | Chao | A63B 53/0466 | 473/342 |
| 7,438,645 B2 * | 10/2008 | Hsu | A63B 53/02 | 473/246 |
| 7,789,766 B2 * | 9/2010 | Morris | A63B 53/02 | 473/246 |
| 7,790,637 B2 | 11/2010 | DiFonzo et al. | | |
| 7,985,146 B2 * | 7/2011 | Lin | A63B 53/0466 | 473/330 |
| 8,460,123 B1 * | 6/2013 | Demille | A63B 53/04 | 473/345 |
| 8,641,554 B1 * | 2/2014 | Hocknell | A63B 53/00 | 473/307 |
| 8,684,864 B2 * | 4/2014 | Lin | A63B 53/0466 | 473/342 |
| 8,777,776 B2 * | 7/2014 | Wahl | A63B 53/0466 | 473/342 |
| 9,033,822 B1 * | 5/2015 | DeMille | A63B 53/0466 | 473/345 |
| 9,056,230 B2 * | 6/2015 | Golden | A63B 53/0466 | |
| 9,409,066 B2 * | 8/2016 | Lin | A63B 53/0466 | |
| 9,526,955 B2 * | 12/2016 | DeMille | A63B 53/0466 | |
| 9,808,682 B2 * | 11/2017 | DeMille | A63B 53/0466 | |
| 9,861,866 B2 * | 1/2018 | DeMille | A63B 53/0466 | |
| 9,868,036 B1 * | 1/2018 | Kleinert | A63B 53/0466 | |
| 9,975,011 B1 * | 5/2018 | Wester | A63B 53/0466 | |
| 10,105,579 B1 * | 10/2018 | DeMille | A63B 53/0466 | |
| 2004/0235584 A1 * | 11/2004 | Chao | A63B 53/0466 | 473/342 |
| 2005/0071242 A1 | 3/2005 | Allen et al. | | |
| 2008/0146374 A1 * | 6/2008 | Beach | A63B 53/0466 | 473/350 |
| 2010/0318442 A1 | 12/2010 | Paul et al. | | |

FOREIGN PATENT DOCUMENTS

| | | | |
|---|---|---|---|
| EP | 0420655 A2 | | 4/1991 |
| JP | 08215355 A | * | 8/1996 |
| JP | 2005-204727 A | | 8/2005 |
| WO | WO-2014/181114 A1 | | 11/2014 |

* cited by examiner

3200

3500

3600

4000

4100

4200

4300

GOLF CLUB INCLUDING COMPOSITE MATERIAL WITH COLOR COATED FIBERS AND METHODS OF MAKING THE SAME

CROSS-REFERENCE TO RELATED APPLICATIONS

This application claims priority to the following U.S. Provisional Applications: U.S. Provisional Application No. 62/535,092, filed Jul. 20, 2017, and U.S. Provisional Application No. 62/609,027, filed Dec. 21, 2017. Both of these applications are incorporated herein in their entirety by reference thereto.

FIELD

The present disclosure relates to golf clubs. More specifically, the present disclosure relates to a golf club, such as a wood-type golf club, having a lightweight club head with a construction that includes a composite material with color coated fibers, for example a composite sole or crown insert with color coated fibers.

BACKGROUND

Modern "wood-type" golf clubs (notably, "drivers," "fairway woods," and "utility or hybrid clubs"), are generally called "metalwoods" since they tend to be made of strong, lightweight metals, such as titanium. An exemplary metalwood golf club, such as a driver or fairway wood, typically includes a hollow shaft and a club head coupled to a lower end of the shaft. Most modern versions of club heads are made, at least in part, from a strong, yet lightweight metal material such as, for example, a titanium, steel, or aluminum alloy. There have also been heads formed of carbon fiber composite material. The use of these materials is advantageous for the larger club heads now sought by golfers, i.e., at least 300 cc and up to about 500 cc in volume. The larger sized, yet conventionally weighted, club heads strive to provide larger "sweet spots" on the striking face and club moments of inertia that, for some golfers, make it easier to get a golf ball up in the air and with greater accuracy.

Titanium alloys are particularly favored in club head designs for their combination of strength and light weight. However, the material can be quite costly. Steel alloys are more economical; however, since the density of steel alloys is greater than for titanium alloys, steel club heads are limited in size in order to remain within conventional head weights while maintaining durability.

Composite club heads, such as a carbon fiber reinforced epoxy or other polymer, for example, are an alternative to metal club heads. A notable advantage is the relatively light weight compared to stainless steel alloys. However, these club heads have suffered from durability and performance qualities associated with composite materials. These include higher labor costs in manufacture and undesirable acoustic properties of the composite material.

A lightweight and durable golf club head that can be manufactured using a cost effective process may be desirable. Therefore, there is a continuing need for innovations in construction and manufacturing of golf club heads. Embodiments discussed herein fulfill this need and others.

BRIEF SUMMARY OF THE INVENTION

The present disclosure describes a golf club including at least one component (e.g., a club head or club shaft) with a construction that includes a composite material with color coated fibers. The foregoing and other objects, features, and advantages of the invention will become more apparent from the following detailed description, which proceeds with reference to the accompanying figures.

Some embodiments are directed to a golf club including a grip, a golf club shaft, and a golf club head, where at least a portion of an outer surface of the golf club head is defined by a layered structure including a non-woven composite layer including a plurality of unidirectional fiber composite plies, the unidirectional fiber composite plies including an innermost unidirectional fiber composite ply and an outermost unidirectional fiber composite ply; a woven composite layer disposed over the outermost unidirectional fiber composite ply and including color coated fibers; and an optically transparent coating disposed over the woven composite layer, the optically transparent coating defining the least a portion of the outer surface of the golf club head.

In some embodiments, the woven composite layer may have a fiber areal weight of 200 grams per meter squared or more.

In some embodiments, the golf club head may include a crown insert including the layered structure. In some embodiments, the golf club head may include a sole insert including the layered structure. In some embodiments, the golf club head may include a face insert including the layered structure.

In some embodiments, the color coated fibers of the woven composite layer may include a core fiber and a metallic coating layer coated on the core fiber. In some embodiments, the core fiber may include at least one of carbon fiber, fiberglass, or polymer based fibers. In some embodiments, the metallic coating layer may be a different color than the core fiber.

In some embodiments, the color coated fibers of the woven composite layer may be embedded in a polymeric matrix material. In some embodiments, the polymeric matrix material may be optically transparent. In some embodiments, the color coated fibers of the woven composite layer may include a core fiber, a coating layer coated on the core fiber, and a polymeric sizing layer coated on the coating layer and configured to adhere the color coated fibers to the polymeric matrix material.

In some embodiments, the color coated fibers of the woven composite layer may each include color coated carbon fibers.

In some embodiments, the woven composite layer may include a weave pattern selected from the group of: a plain weave pattern, a twill weave pattern, a satin weave pattern, a harness-satin weave pattern, a triaxial pattern, jacquard pattern, an aquarius pattern, a constellation pattern, a galaxy pattern, a rock pattern, an atomic pattern, a wasp pattern, a roswell pattern, a labyrinth pattern, a basket weave pattern, a dobby weave pattern, a piqué weave pattern, a momie weave pattern, a leno weave pattern, a swivel weave pattern, a double weave pattern, a pile weave pattern, a slack-tension weave pattern, a tapestry weave pattern, a spread tow weave pattern, a rib weave pattern, and an oxford weave pattern.

In some embodiments, the layered structure may have a thickness in the range of 0.10 mm to 1.20 mm. In some embodiments, the layered structure may have a thickness in the range of 0.5 mm to 1.0 mm. In some embodiments, the layered structure may have a thickness in the range of 0.25 mm to 0.8 mm.

In some embodiments, the woven composite layer may include color coated carbon fibers and metallic fibers interwoven with the color coated carbon fibers. In some embodiments, the metallic fiber is a color coated metallic fiber.

In some embodiments, the golf club may include a movable weight configured to be moved from a first position to a second position in the golf club head. In some embodiments, the golf club may include a hosel portion configured to receive a sleeve attached to the golf club shaft, the sleeve being capable of being positioned to adjust the loft, lie, or face angle of the golf club head.

In some embodiments, the color coated fibers of the woven composite layer may include colored electroplated fibers.

In some embodiments, the outermost unidirectional fiber composite ply may include color coated fibers.

Some embodiments are directed to a golf club head including an outer surface including at least a portion defined by a layered structure including an inner composite layer having a plurality of unidirectional fiber composite plies and an outer composite layer disposed over the inner composite layer and having color coated fibers embedded in a matrix material.

Some embodiments are directed to a golf club including a grip, a golf club shaft, and a golf club head including a hosel portion configured to receive a sleeve attached to the golf club shaft, the sleeve being capable of being positioned to adjust the loft, lie, or face angle of the golf club head, where at least a portion of an outer surface of the golf club head is defined by a layered structure including an inner composite layer having a plurality of unidirectional fiber composite plies and an outer composite layer disposed over the inner composite layer and having color coated fibers embedded in a matrix material.

Some embodiments are directed to a golf club including a grip, a golf club shaft, and a golf club head, where at least one of the golf club head and the golf club shaft includes an outer surface defined by a layered structure including a non-woven composite layer including a plurality of unidirectional fiber composite plies and a woven composite layer disposed over the non-woven composite layer and including color coated fibers embedded in a matrix material.

In some embodiments, the color coated fibers of the woven composite layer may include a core fiber and an electroplated metallic coating layer coated on the core fiber. In some embodiments, the electroplated metallic coating layer may be a different color than the core fiber.

In some embodiments, the unidirectional fiber composite plies may include an innermost unidirectional fiber composite ply and an outermost unidirectional fiber composite ply, and the outermost unidirectional fiber composite ply includes color coated fibers.

In some embodiments, the golf club may include an optically transparent coating disposed over the woven composite layer, the optically transparent coating defining the outermost surface of the layered structure.

In some embodiments, at least a portion of a face of the golf club head may be defined by the layered structure.

Some embodiments are directed to a golf club including a grip, a golf club shaft, and a golf club head, where at least one of the golf club head and the golf club shaft includes an outer surface defined by a layered structure including a first composite layer including a plurality of unidirectional fiber composite plies and an outer composite layer disposed over the first composite layer and including color coated fibers embedded in a matrix material.

In some embodiments, the golf club head may include a crown insert including the layered structure. In some embodiments, the golf club head may include a sole insert including the layered structure. In some embodiments, the golf club head may include a face insert including the layered structure.

BRIEF DESCRIPTION OF THE DRAWINGS/FIGURES

The present invention(s) are illustrated by way of example and not limitation in the figures of the accompanying drawings in which like references indicate similar elements.

Figure 53:
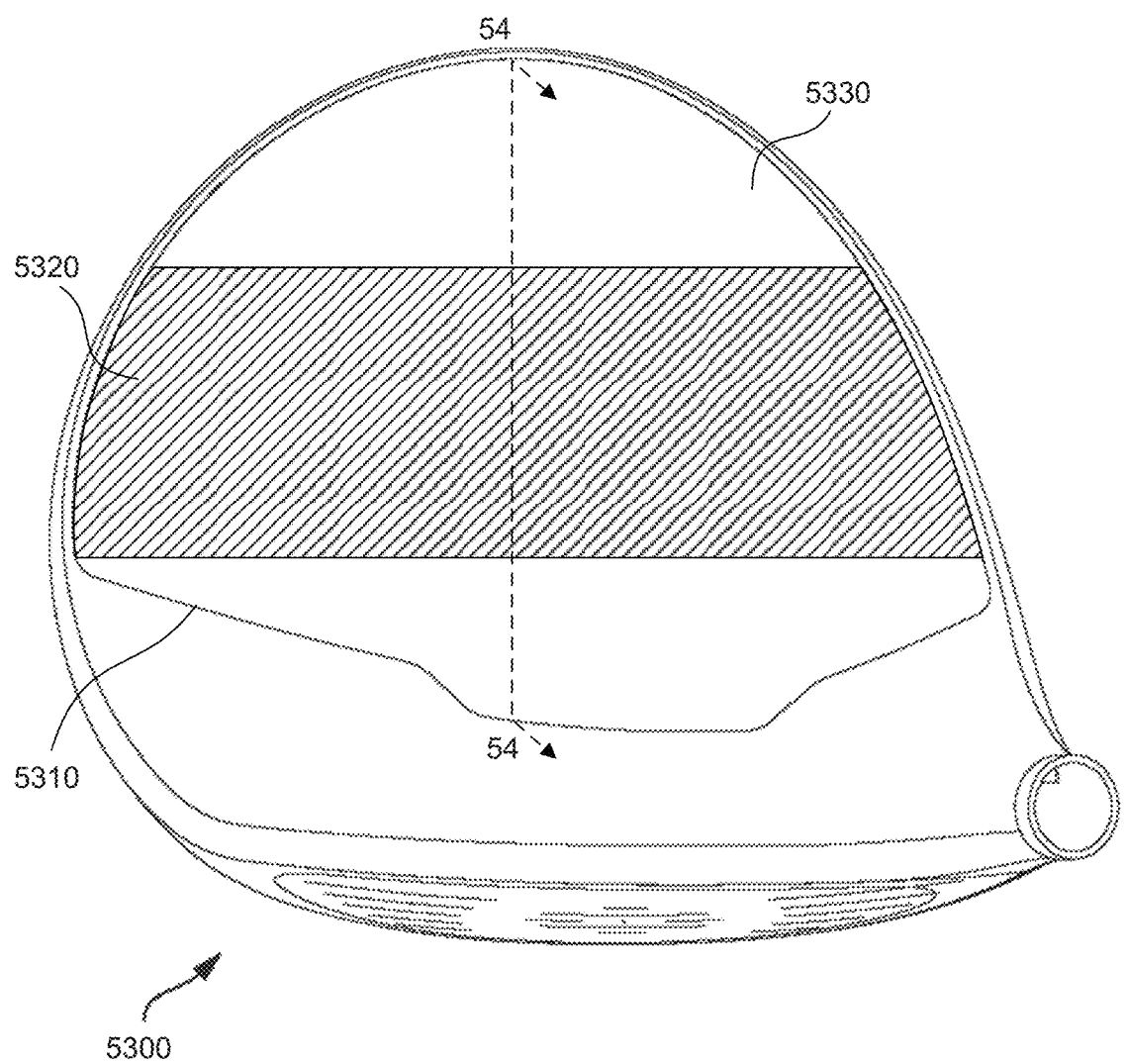
FIG. 53 is a golf club head having a partially colored composite crown insert according to some embodiments.
Figure 54A:
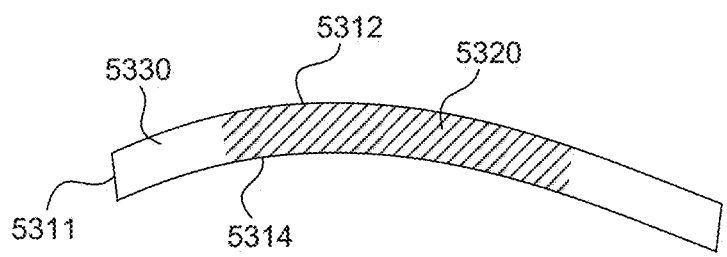
Figure 54B:
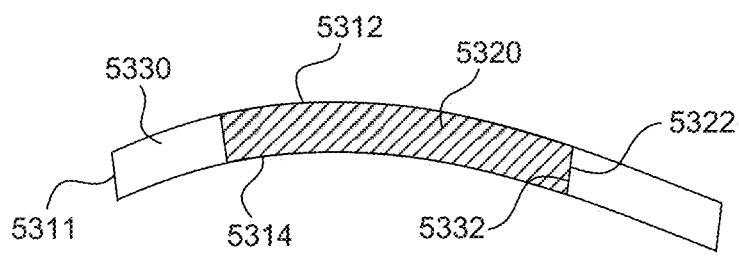
Figure 54C:
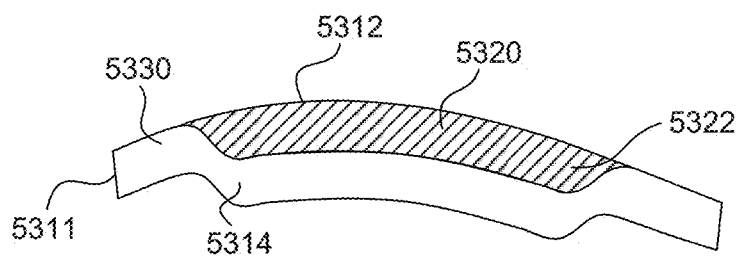
Figure 54D:
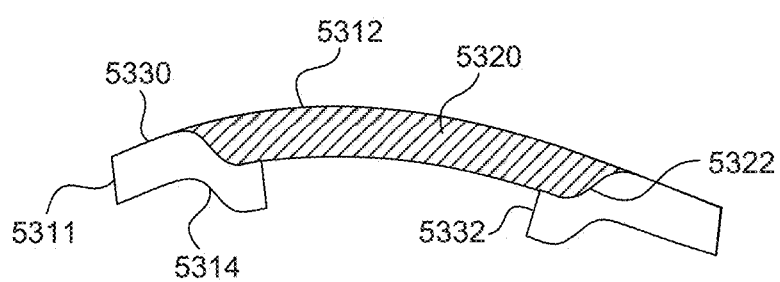

FIG. 54A is a cross-sectional view of the partially colored composite crown insert of FIG. 53 according to some embodiments taken along the line 54-54 in FIG. 53. FIG. 54B is a cross-sectional view of the partially colored composite crown insert of FIG. 53 according to some embodiments taken along the line 54-54 in FIG. 53. FIG. 54C is a cross-sectional view of the partially colored composite crown insert of FIG. 53 according to some embodiments taken along the line 54-54 in FIG. 53. FIG. 54D is a cross-sectional view of the partially colored composite crown insert of FIG. 53 according to some embodiments taken along the line 54-54 in FIG. 53.

Figure 55:
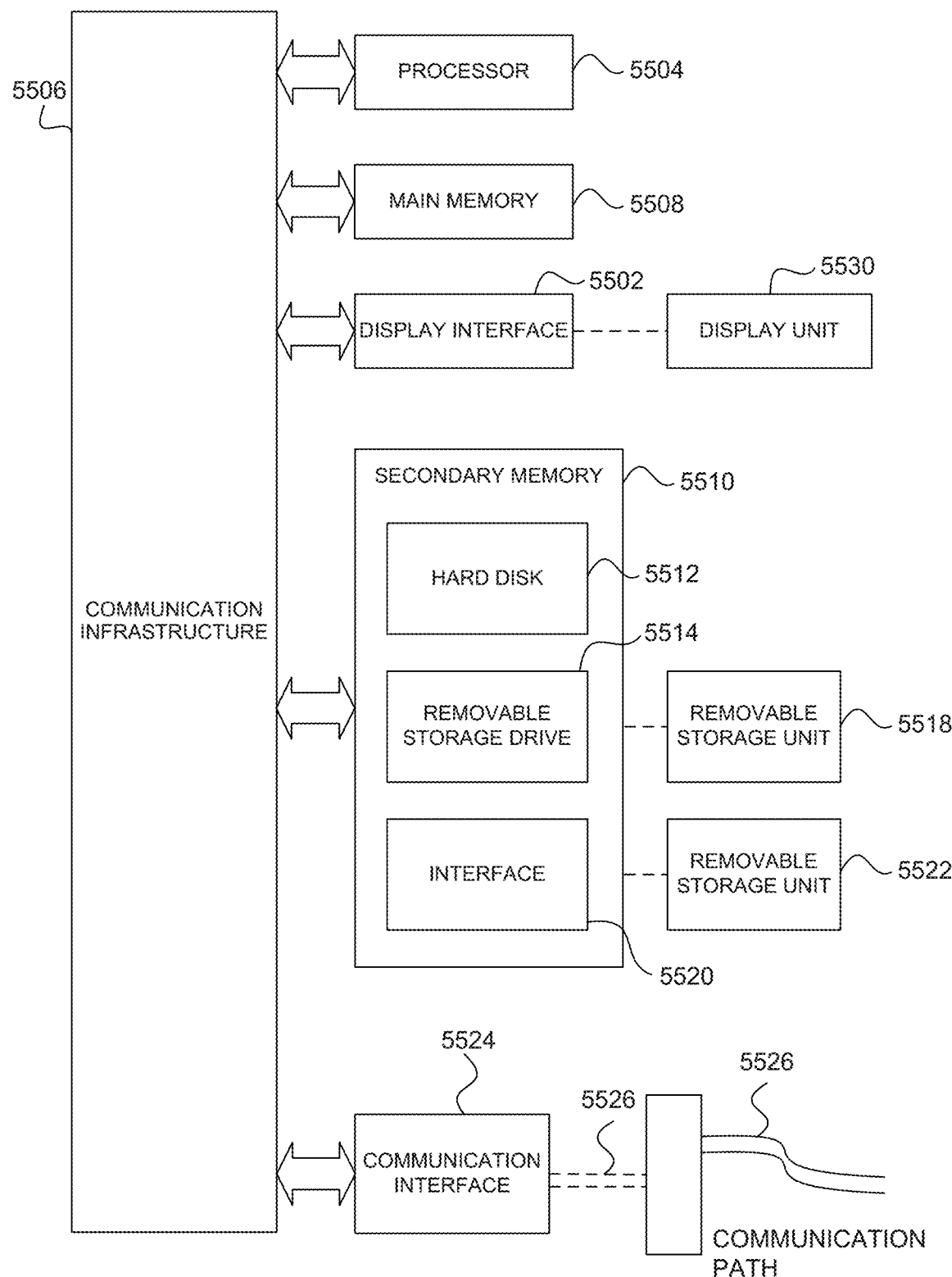

FIG. 55 is a schematic block diagram of an exemplary computer system in which embodiments may be implemented.

DETAILED DESCRIPTION OF THE INVENTION

The following describes embodiments of golf club heads in the context of a driver-type golf club, but the principles, methods and designs described may be applicable in whole or in part to fairway woods, utility clubs (also known as hybrid clubs) and the like.

A golf club including one or more components that are constructed, at least in part, with a composite material may provide beneficial properties for a golfer. For example, a golf club head composed of two or more materials (e.g., a metal material and a composite material) may provide beneficial properties (e.g., weight, sound, size, and center of gravity properties) for a golfer. In some cases, a composite club head may include a metal body and one or more inserts comprising a composite material. For example, a composite material insert may define a portion of a crown of the club head and/or a composite material may define a portion of a sole of the club head. The composite insert(s) may serve to reduce the weight of a given club head geometry without sacrificing mechanical properties of the club head (e.g., strength and impact performance characteristics) due to the composite material's lightweight and high strength properties.

In some instances, the sound created when a golf club head strikes a golf ball may be a factor in a consumer's mental characterization of a golf club. For instance, a consumer may positively associate an audibly pleasing sound with a particular golf club brand or line. Or a consumer may negatively associate an audibly unpleasing (or less audibly pleasing) sound with a particular golf club brand or line. This positive or negative association may influence a consumer's decision to purchase (or not to purchase) a certain golf club, or golf club head. In some embodiments, the audible characteristics of a golf club head may be tailored to by provide a desirable sound by incorporating metallic fibers into a composite layer utilized to construct the club head. In some embodiments, the metallic fibers may be fibers made of a metallic material. In some embodiments, the metallic fibers may include a non-metallic material core that is coated with a metallic material. In some embodiments, the metallic fibers may include a metallic material core that is coated with a metallic material.

The metallic material(s) of the fibers may influence the damping characteristics of the composite layer, and therefore influence the sound created when a golf club head strikes a golf ball. In embodiments including a metallic coating, the metallic coating may be an electroplated metallic coating. In some embodiments, metallic fibers may be incorporated into a crown insert for a golf club head to influence the acoustics of the golf club head. In some embodiments, metallic fibers may be incorporated into a sole insert for a golf club head to influence the acoustics of the golf club head.

In addition to structural properties (e.g., weight, sound, size, and center of gravity properties), the construction of visual features on a golf club may be a concern. Visual features of a golf club (e.g., alignment features, logos, brand names, product names, and aesthetic patterns) can be an important tool for attracting a consumer's attention and facilitating brand recognition. Since a consumer's attention may be drawn to the visual features of a golf club, the aesthetic appeal and details of these features may play a role in influencing a consumer's decision to purchase (or not to purchase) a golf club, or golf club component. Moreover, it may be desirable to provide visual features that do not fade or degrade over time. In particular, it may be desirable to provide alignment features for a golf club (e.g., an alignment feature that assists a golfer with visually aligning a club head with a golf ball) that do not fade or degrade over time. A faded or degraded alignment feature may affect the ability of a golfer to properly align a club head and/or himself relative to a golf ball, which may affect the golfer's performance.

In some embodiments, color coating fibers present a composite layer with a material having a different from the color of the fibers may be utilized to construct aesthetically appealing visual features on a golf club. In such embodiments, due to the nature of fiber composite layers/plies, the color coating on the fibers will be protected from damage by the matrix material of the composite. In some embodiments, the color coating on the fibers may be a metallic material. In such embodiments, the metallic color coating may serve the dual purpose of providing aesthetically appealing visual features as well as desirable acoustic properties for a golf club.

In some embodiments, color coated fibers may be incorporated into a crown insert for a golf club head to provide one or more of the benefits discussed above. In some embodiments, color coated fibers may be incorporated into a sole insert for a golf club head to provide one or more of the benefits discussed above. In some embodiments, color coated fibers may be incorporated into a golf club shaft to provide one or more of the benefits discussed above. In some embodiments, color coated fibers may be incorporated into a face insert for a golf club head to provide one or more of the benefits discussed above.

A golf club head 10 according to some embodiments is shown in FIGS. 1-8. The golf club head 10 includes a body 11 and a face portion 42 coupled to the body 11. Furthermore, golf club head 10 defines a toe region 14 and a heel region 16, opposite the toe region 14. Body 11 of golf club head 10 includes a forward region 12 and a rearward region 18, opposite the forward region 12. Face portion 42 is coupled to body 11 at forward region 12 of body 11. In some embodiments, face portion 42 may include a face insert (e.g., face insert 4510). Body 11 of golf club head 10 additionally includes a sole portion 17, defining a bottom of golf club head 10, and a crown portion 19, opposite sole portion 17 and defining a top of golf club head 10. Also, body 11 of golf club head 10 includes a skirt portion 21 that defines a transition region where body 11 of golf club head 10 transitions between crown portion 19 and sole portion 17. Accordingly, skirt portion 21 is located between crown portion 19 and sole portion 17.

Figure 9:
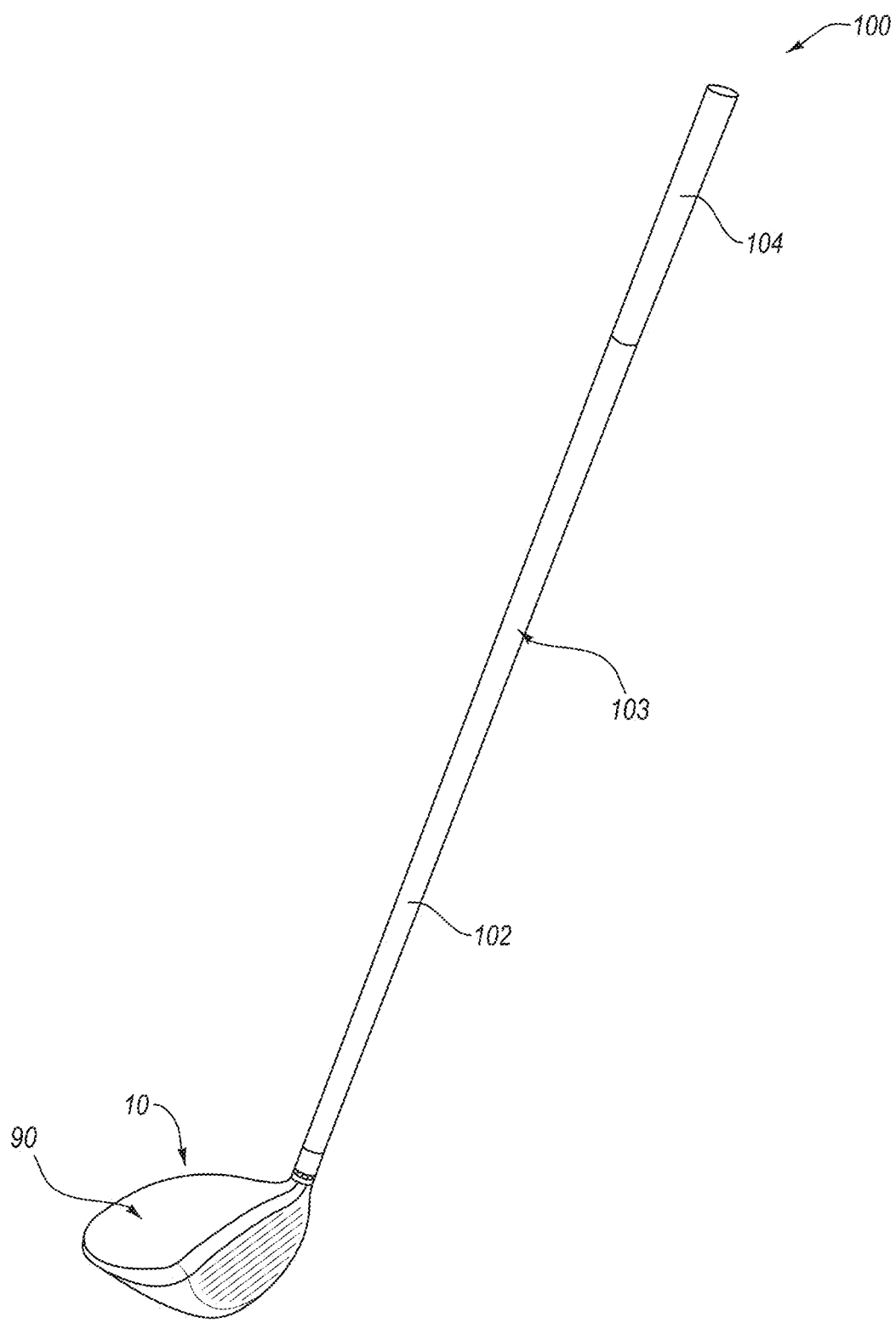
FIG. 9 is a perspective view of a golf club according to some embodiments.

Golf club head 10 also includes a hosel 20 extending from heel region 16 of golf club head 10. As shown in FIG. 9, a shaft 102 of a golf club 100 may be attached directly to hosel 20 or, alternatively, attached indirectly to hosel 20, such as via a flight control technology (FCT) component (e.g., a hosel insert 22, which may be an adjustable lie/loft assembly) coupled with hosel 20 (see, e.g., FIG. 2). The golf club 100 also includes a grip 104 fitted around a distal end or free end of shaft 102. Grip 104 of golf club 100 helps promote the handling of golf club 100 by a user during a golf swing. Golf club head 10 includes a hosel axis 91, which is coaxial with the shaft 102, defining a central axis of hosel 20.

In some embodiments, such as shown in FIGS. 1-8, body 11 of the golf club head 10 includes a frame 24 to which one or more inserts of body 11 are coupled. For example, crown portion 19 of body 11 includes a crown insert 26 coupled to a toe side of frame 24. Similarly, sole portion 17 of body 11 includes a sole insert 28 coupled to a bottom side of the frame 24. In some embodiments, golf club head 10 may include two or more crown inserts 26 and/or two or more sole inserts 28. In some embodiments, crown insert(s) 26 and/or sole insert(s) 28 may include a layered structure as discussed herein (e.g., layered structures 2200 and 2300).

Although in some examples of golf club head 10, body 11 may not include inserts (e.g., body 11 forms a one-piece monolithic construction), according to certain examples of golf club head 10, body 11 includes one or more inserts fixedly secured to frame 24. For example, frame 24 of body 11 may have at least one of a sole opening 60, sized and configured to receive all or portion of sole insert 28, and/or a crown opening 62 sized and configured to receive all or a portion of crown insert 26. More specifically, sole opening 60 may receive all or portion of and fixedly secure sole insert 28, which may have the rear weight track 30 joined thereto (as described below). Similarly, crown opening 62 may receive all or a portion of and fixedly secure crown insert 26. Sole and crown openings 60, 62 are each formed to have a peripheral edge or recess to seat, respectively, sole insert 28 and crown insert 26, such that sole and crown inserts 28, 26 are either flush with the frame 24 to provide a smooth seamless outer surface or, alternatively, a slightly recessed outer surface or slightly protruding outer surface. As used herein, the term "flush" refers to two surfaces having edges that follow the same surface profile without more than a +/−0.15 mm height change between the two surfaces on the surface profile. For purposes of determining a height change, the edge of a first surface is considered to have a zero height, the height of a second surface is measured relative to the first surface. The heights of the first and second surfaces are measured orthogonal to the surface profile at the edges of the surfaces. A flush surface, for example, at the interface between crown insert 26 and frame 24 may help conceal the location of an adhesive, which may not be as aesthetically appealing as the material and/or paint layers of frame 24 and crown insert 26. A sole insert or crown insert defining a slightly recessed outer surface or slight protruding outer surface will have a height change of more than +/−0.15 mm relative to frame 24.

In some embodiments, frame 24 may have a face opening, at a forward region 12 of body 11, to receive and fixedly secure face portion 42 of golf club head 10. Face portion 42 can be fixedly secured to the face opening of frame 24 by welding, braising, soldering, screws, or other coupling means. Face portion 42 can be made from any of various materials, such as, for example, metals, metal alloys, fiber-reinforced polymers, and the like. In some implementations, the face portion may be integrally formed.

Frame 24 of body 11 may be made from a variety of different types of materials. According to one example, frame 24 may be made from a metal material, such as a titanium or titanium alloy (including but not limited to 6-4 titanium, 3-2.5, 6-4, SP700, 15-3-3-3, 10-2-3, or other alpha/near alpha, alpha-beta, and beta/near beta titanium alloys), aluminum and aluminum alloys (including but not limited to 3000 series alloys, 5000 series alloys, 6000 series alloys, such as 6061-T6, and 7000 series alloys, such as 7075), or the like. Frame 24 may be formed by conventional casting, metal stamping, or other known manufacturing processes. In certain examples, frame 24 may be made of non-metal materials. Generally, frame 24 provides a framework or skeleton of golf club head 10 to strengthen golf club head 10 in areas of high stress caused by the impact of a golf ball with face portion 42. Such areas include a transition region where golf club head 10 transitions from face portion 42 to crown portion 19, sole portion 17, and skirt portion 21 of body 11.

In some embodiments, sole insert 28 and/or crown insert 26 may be made from a polymer or fiber-reinforced polymer (e.g., composite material). The polymer can be any of various polymers, such as thermoplastic or thermoset materials. The fibers of the fiber-reinforced polymer or composite material can be any of various fibers, such as carbon fiber or glass fiber. One exemplary material from which sole insert 28 and/or crown insert 26 may be made from is a thermoplastic continuous carbon fiber composite laminate material having long, aligned carbon fibers in a PPS (polyphenylene sulfide) matrix or base.

A commercial example of a fiber-reinforced polymer, from which sole insert 28 and/or crown insert 26 may be made, is TEPEX® DYNALITE 207 manufactured by Lanxess®. TEPEX® DYNALITE 207 is a high strength, lightweight material, arranged in sheets, having multiple layers of continuous carbon fiber reinforcement in a PPS thermoplastic matrix or polymer to embed the fibers. The material may have a 54% fiber volume, but can have other fiber volumes. For example, in some embodiments the fiber volume may be 70%, 65%, 60%, 57%, 54%, 42%, or within any range having any two of these values as end points. According to one example, the material weighs 200 g/m2.

Another commercial example of a fiber-reinforced polymer, from which sole insert 28 and/or crown insert 26, is made is TEPEX® DYNALITE 208. This material also has a carbon fiber volume range of 42 to 70%. For example, in some embodiments the fiber volume may be 70%, 65%, 60%, 57%, 45%, 42%, or within any range having any two of these values as end points. In some embodiments, the carbon fiber may have a volume of 45% and a weight of 200 g/m2. DYNALITE 208 differs from DYNALITE 207 in that it has a TPU (thermoplastic polyurethane) matrix or base rather than a polyphenylene sulfide (PPS) matrix.

By way of example, the fibers of each sheet of TEPEX® DYNALITE 207 sheet (or other fiber-reinforced polymer material, such as DYNALITE 208) are oriented in the same direction with the sheets being oriented in different directions relative to each other, and the sheets are placed in a two-piece (male/female) matched die, heated past the melt temperature, and formed to shape when the die is closed. This process may be referred to as thermoforming and is especially well-suited for forming sole insert 28 and crown insert 26. After crown insert 26 and sole insert 28 are formed (separately, in some implementations) by the thermoforming process, each is cooled and removed from the matched die. In some implementations, crown insert 26 and/or sole insert 28 may have a uniform thickness, which facilitates use of the thermoforming process and ease of manufacture. However, in other implementations, crown insert 26 and/or sole insert 28 may have a variable thickness to strengthen select local areas of the insert by, for example, adding additional plies in select areas to enhance durability, acoustic properties, or other properties of the respective inserts.

Figure 2:
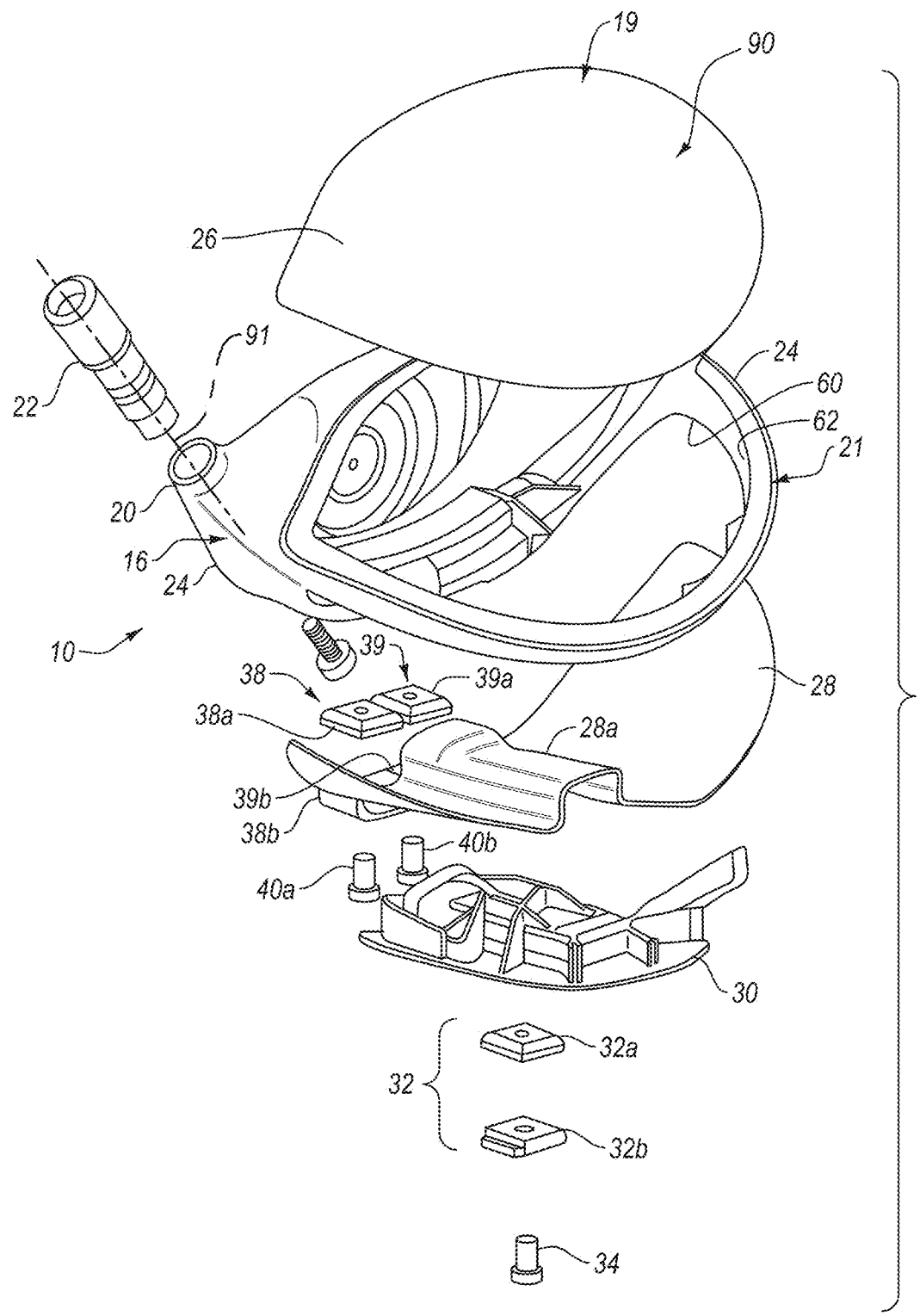
FIG. 2 is an exploded perspective view from a top of the golf club head of FIG. 1 according to some embodiments.

As shown in FIG. 2, crown insert 26 and sole insert 28 may each have a complex three-dimensional shape and curvature corresponding generally to a desired shape and curvature of crown portion 19 and sole portion 17 of golf club head 10. It will be appreciated that various types of club heads, such as driver-type club heads, fairway wood-type club heads, iron-type club head, or putter-type club heads may be manufactured using one or more of the principles, methods, and materials described herein.

In an alternative embodiment, sole insert 28 and/or crown insert 26 can be made by a process other than thermoforming, such as injection molding or thermosetting. In a thermoset process, sole insert 28 and/or crown insert 26 may be made from "prepreg" plies of woven or unidirectional composite fiber fabric (such as carbon fiber composite fabric) that is preimpregnated with resin and hardener formulations that activate when heated. The prepreg plies are placed in a mold suitable for a thermosetting process, such as a bladder mold or compression mold, and stacked/oriented with the carbon or other fibers oriented in different directions. The plies are heated to activate the chemical reaction and form sole insert 28 and/or crown insert 26. Each insert is cooled and removed from its respective mold. In some embodiments, sole insert 28 and/or crown insert 26 may be made by a hybrid process including a thermoforming or thermosetting process and an injection molding process.

The carbon fiber reinforcement material for sole insert 28 and/or crown insert 26, made by the thermoset manufacturing process, may be a carbon fiber known as "34-700" fiber, available from Grafil, Inc., of Sacramento, Calif., which has a tensile modulus of 234 Gpa (34 Msi) and a tensile strength of 4500 Mpa (650 Ksi). Another suitable fiber, also available from Grafil, Inc., is a carbon fiber known as "TR50S" fiber which has a tensile modulus of 240 Gpa (35 Msi) and a tensile strength of 4900 Mpa (710 Ksi). Exemplary epoxy resins for the prepreg plies used to form the thermoset crown and sole inserts include Newport 301 and 350 and are available from Newport Adhesives & Composites, Inc., of Irvine, Calif.

In one example, the prepreg sheets have a quasi-isotropic fiber reinforcement of 34-700 fiber having an areal weight between about 20 g/m$^2$ to about 200 g/m$^2$ preferably about 70 g/m$^2$ and impregnated with an epoxy resin (e.g., Newport 301), resulting in a resin content (R/C) of about 40%. For convenience of reference, the primary composition of a prepreg sheet can be specified in abbreviated form by identifying its fiber areal weight, type of fiber, e.g., 70 FAW 34-700. The abbreviated form can further identify the resin system and resin content, e.g., 70 FAW 34-700/301, R/C 40%.

Based on the foregoing, body 11 of golf club head 10 of the present disclosure has at least one of a crown portion 19 at least partially made from a fiber-reinforced polymer, a sole portion 17 at least partially made from a fiber-reinforced polymer, or a crown portion 19 and a sole portion 17 made entirely from a metal or metal alloy. For example, in certain embodiments, body 11 of golf club head 10 has both a crown portion 19 and sole portion 17 at least partially made from a fiber-reinforced polymer, in other embodiments, body 11 of golf club head 10 has a crown portion 19 at least partially made from a fiber-reinforced polymer and a sole portion 17 entirely made from a metal or metal alloy, and in yet other embodiments, body 11 of golf club head 10 has both a crown portion 19 and sole portion 17 made entirely from a metal or metal alloy. However, as will be explained in more detail below, notwithstanding the variability of the composition of crown portion 19 and sole portion 17 of golf club head 10 of the present disclosure, the same type of profile of crown portion 19 can be common among the various embodiments of golf club head 10 to cooperatively, along with the composition of crown portion 19 and sole portion 17, promote certain performance characteristics of golf club head 10.

Figure 18:
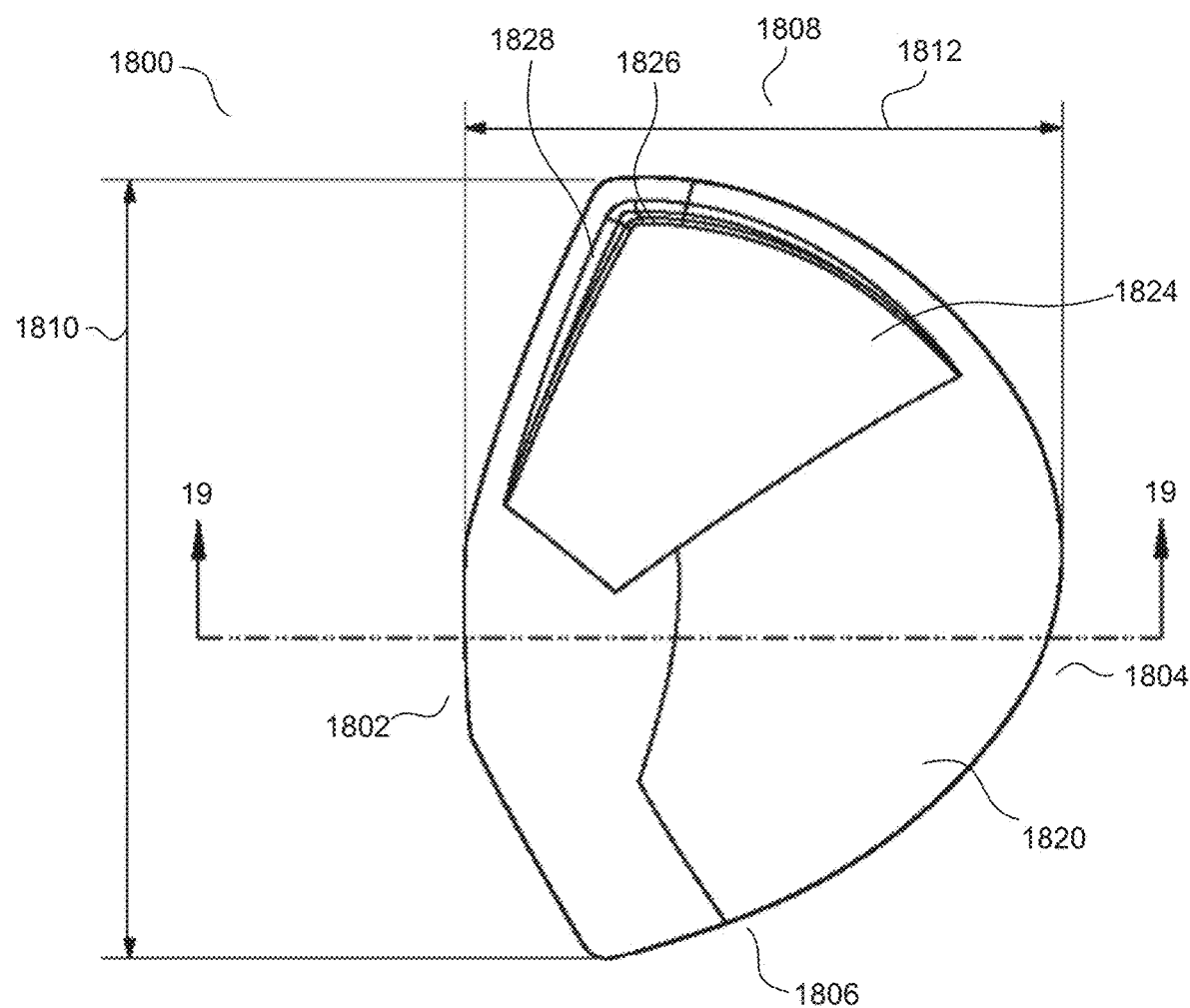
FIG. 18 is crown insert according to some embodiments.
Figure 19:
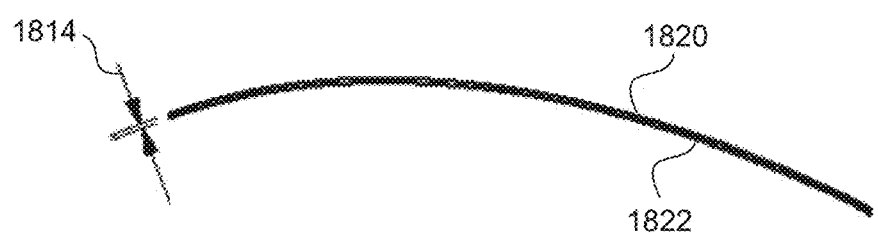
FIG. 19 is a cross-sectional view of the crown insert of FIG. 18 taken along the line 19-19 of FIG. 18.

FIGS. 18 and 19 illustrate a crown insert 1800 according to some embodiments. Crown insert 1800 may be utilized in the construction of a golf club head, such as golf club head 10, golf club head 500, or golf club head 4500. Crown insert 1800 includes a front side 1802, a rear side 1804, a heel side 1806, and a toe side 1808. Crown insert 1800 may be made from a composite material including a layered structure discussed herein.

The depth 1812 of crown insert 1800, measured from front side 1802 to rear side 1804, may be in the range of 80 millimeters (mm) to 110 mm. In some embodiments, depth 1812 may be in the range of 90 mm to 100 mm. In some embodiments, depth 1812 may be equal to 94 mm+/−1.0 mm. In some embodiments, depth 1812 may be 94.61 mm. The width 1810 of crown insert 1800, measured from heel side 1806 to toe side 1808, may be in the range of 110 mm to 140 mm. In some embodiments, width 1810 may be in the range of 120 mm to 130 mm. In some embodiments, width 1810 may be 123 mm+/−1.0 mm. In some embodiments, width 1810 may be 123.40 mm. The thickness 1814 of crown insert 1800, measured from an outer surface 1820 to an inner surface 1822 of crown insert 1800, may be in the range of 0.50 mm to 0.70 mm. In some embodiments, thickness 1814 may be 0.58 mm+/−0.05 mm.

In some embodiments, crown insert 1800 may include a surface feature 1824 formed on outer surface 1820. In some embodiments, surface feature 1824 may be a protrusion formed on outer surface 1820. In some embodiments, surface feature 1824 may be a recess formed in outer surface 1820. A wall 1826 that intersects with outer surface 1820 may define a perimeter edge 1828 of surface feature 1824. In some embodiments, wall 1826 may define a perimeter edge 1828 that completely surrounds surface feature 1824. In some embodiments, wall 1826 may define a perimeter edge 1828 that partially surrounds surface feature 1824. For example, wall 1826 may define a perimeter edge 1828 at a front portion of surface feature 1826 and a rear portion of surface feature 1824 may be not be defined by wall 1824. In such embodiments, the depth/height of surface feature 1824 may decrease to a value of zero when moving from the front portion of surface feature 1824 to the rear portion of surface feature 1824. In certain embodiments, wall 1826 may define a perimeter edge 1828 that defines less than 20%, less than 30%, less than 40%, less than 50%, less than 70%, less than 80%, or less than 90% of the entire perimeter of surface feature 1824.

In some embodiments, the radius of curvature of edge 1828 may be in the range of 0.5 mm to 1.5 mm, or 0.5 mm to 3.0 mm, or 0.5 mm to 5.0 mm, or 0.5 mm to 15.0 mm. In some embodiments, the radius of curvature of edge 1828 may be 1.0 mm. Recess 1824 may be sized and shaped to tailor one or more structural properties (e.g., weight, sound, size, and center of gravity properties) of crown insert 1800 and, in turn, a club head to which crown insert 1800 is attached.

Figure 20:
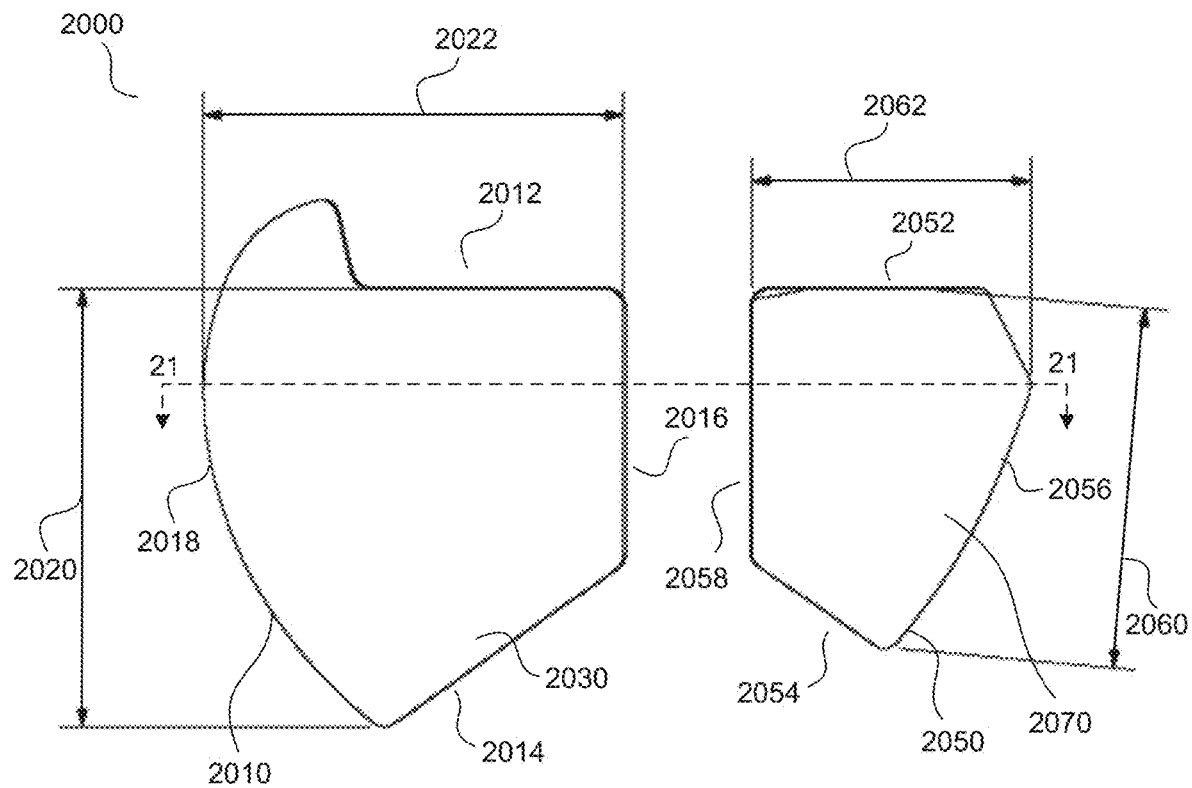
FIG. 20 is a set of sole inserts according to some embodiments.
Figure 21:
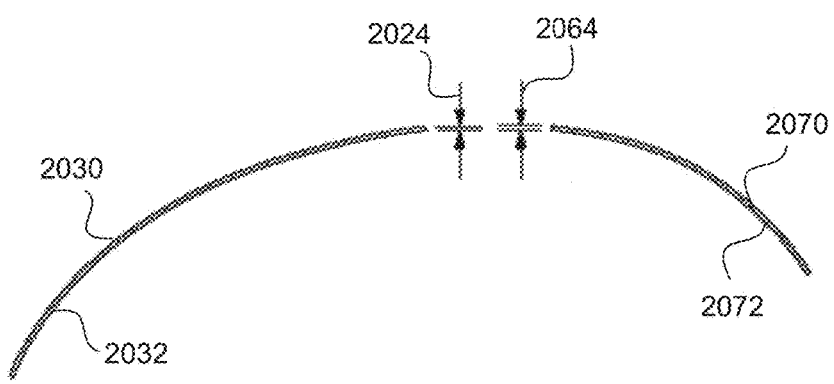
FIG. 21 is a cross-sectional view of the sole inserts of FIG. 20 taken along the line 21-21 of FIG. 20.

FIGS. 20 and 21 illustrate a sole insert set 2000 according to some embodiments. Sole insert set 2000 includes a first sole insert 2010 and a second sole insert 2050. Sole inserts 2010 and 2050 may be utilized in the construction of a golf club head, such as golf club head 10, golf club head 500, or golf club head 4500. Sole inserts 2010 and 2050 may be made from a composite material including a layered structure discussed herein.

First sole insert 2010 includes a front side 2012, a rear side 2014, a heel side 2016, and a toe side 2018. The depth 2020 of first sole insert 2010, measured from front side 2012 to rear side 2014, may be in the range of 50 mm to 80 mm. In some embodiments, depth 2020 may be in the range of 60 mm to 70 mm. In some embodiments, depth 2020 may be equal to 62.5 mm+/−1.0 mm. In some embodiments, depth 2020 may be 62.8 mm. The width 2022 of first sole insert 2010, measured from heel side 2016 to toe side 2018, may be in the range of 45 mm to 75 mm. In some embodiments, width 2022 may be in the range of 55 mm to 65 mm. In some embodiments, width 2022 may be 60 mm+/−1 mm. In some embodiments, width 2022 may be 59.9 mm. The thickness 2024 of first sole insert 2010, measured from an outer surface 2030 to an inner surface 2032 of first sole insert 2010, may be in the range of 0.50 mm to 0.70 mm. In some embodiments, thickness 2024 may be 0.58 mm+/−0.10 mm.

Similar to first sole insert 2010, second sole insert 2050 includes a front side 2052, a rear side 2054, a heel side 2056, and a toe side 2058. The depth 2060 of second sole insert 2050, measured from front side 2052 to rear side 2054, may be in the range of 35 mm to 65 mm. In some embodiments, depth 2060 may be in the range of 45 mm to 55 mm. In some embodiments, depth 2060 may be equal to 51.5 mm+/−1.0 mm. In some embodiments, depth 2060 may be 51.6 mm. The width 2062 of second sole insert 2050, measured from heel side 2056 to toe side 2058, may be in the range of 25 mm to 55 mm. In some embodiments, width 2062 may be in the range of 35 mm to 45 mm. In some embodiments, width 2062 may be 40 mm+/−1.0 mm. In some embodiments, width 2062 may be 39.8 mm. The thickness 2064 of second sole insert 2050, measured from an outer surface 2070 to an inner surface 2072 of second sole insert 2050, may be in the range of 0.50 mm to 0.70 mm. In some embodiments, thickness 2064 may be 0.58 mm+/−0.10 mm.

In some embodiments, crown insert 1800, first sole insert 2010, and/or second sole insert 2050 may be composed of a composite material including one or more layers/plies that include metallic coated fibers embedded in a matrix material. In some embodiments, crown insert 1800, first sole insert 2010, and/or second sole insert 2050 may be composed of a composite material including one or more layers/plies that include color coated fibers embedded in a matrix material. In some embodiments, the color coating on the fibers may be a metallic color coating. For purposes of the present disclosure, the terms "color/metallic coating" and "color/metallic coated" include the following types of coatings: a color coating, a metallic coating, and a colored metallic coating.

In some embodiments, the fibers may be carbon fibers, fiberglass fibers, metallic fibers, or polymer fibers (e.g., Kevlar® fibers or Mylar® fibers), or a combination thereof. In embodiments including polymer fibers, the fibers may be dyed in addition to, or as an alternative to, being color coated). In embodiments including metallic fibers, suitable metallic materials include, but are not limited to, steel, nickel, aluminum, titanium, tungsten, copper, chromium zinc, gold, silver, cobalt, magnesium, platinum, palladium, iron, tin, tungsten, or an alloy of one or more of these materials. In embodiments including color coated fibers, the color coating may be a different color than the color of the fibers themselves. In some embodiments, the color/metallic coated fibers may be unidirectional fibers embedded within a matrix material. In some embodiments, the color/metallic coated fibers may be fibers woven in a pattern and embedded within a matrix material. In some embodiments, color/metallic fibers woven in a pattern may not be embedded within a matrix material and may be bonded (e.g., adhesively bonded) to other layers in a layered structure. For example, color/metallic fibers woven in a pattern may be bonded to a metal layer, a composite layer, or other rigid surface of a club head, a crown insert, a sole insert, or a face insert.

A color/metallic coating, may be applied to the fibers using a suitable coating method including, but not limited to, electroplating, physical vapor deposition (PVD), chemical vapor deposition (CVD), and anodization. In embodiments including a metallic coating, the metallic material of the coating may be, but is not limited to, nickel (Ni), copper (Cu), chromium (Cr), zinc (Zn), gold (Au), silver (Ag), aluminum (Al), cobalt (Co), magnesium (Mg), platinum (Pt), palladium (Pd), iron (Fe), titanium (Ti), tin (Sn), tungsten (W), and an alloy including one or more of these materials.

In some embodiments, crown insert 1800, first sole insert 2010, second sole insert 2050, and/or a face insert 4510 described herein may be composed of a layered structure including one or more layers/plies with color/metallic coated fibers. In some embodiments, the layered structure may define at least a portion of an outer surface of a golf club head (e.g., outer surface 90 of golf club head 10). In such embodiments, the outer surface of the golf club head may be the outermost surface of the golf club head that is exposed to the environment surrounding the golf club head. In some embodiments, the layered structure may define outer surface 1820, 2030, 2070, and/or 4512 of crown insert 1800, first sole insert 2010, second sole insert 2050, and/or face insert 4510, respectively. In some embodiments, outer surfaces 1820, 2030, 2070, and/or 4512 may define a portion of an outer surface of a golf club head.

In some embodiments, the color/metallic coated fibers of crown insert 1800, first sole insert 2010, second sole insert 2050, and/or face insert 4510 may extend from a center of the insert to a peripheral edge of the insert. In some embodiments, the color/metallic coated fibers may be visible on 95% or more, 90% or more, 85% or more, 80% or more, 70% or more, 60% or more, 50% or more, 40% or more, 30% or more, 20% or more, 10% or more, or 5% or more of the outer surface area of the insert. In some embodiments, the color/metallic coated fibers may be visible on 50% or less of the outer surface area of the insert. For example, the color/metallic coated fibers may be visible on 50%, 40%, 30%, 20%, 10%, 5%, or 1% of the outer surface area of the insert, or within a range having any two of these values as end points. In some embodiments, the color/metallic coated fibers of the insert may be visible at the peripheral edge of the outer surface of the insert.

In some embodiments, crown insert 1800, first sole insert 2010, second sole insert 2050, and/or face insert 4510 may be machined to fit within a crown recess regions, sole recess region, and face recess region to a consistent and uniform bond gap (junction) between a club head frame and the insert(s). In such embodiments, the consistent and uniform bond gap between the insert(s) and the frame may minimize the need for a paint layer to mask or cover the bond gap thereby hiding the imperfections of the bond gap. In some embodiments, the insert(s) may be machined such that the bond gap (junction) dimensions satisfy those discussed in U.S. patent application Ser. No. 15/370,530, filed on Dec. 6, 2016, which is incorporated by reference in its entirety by reference thereto.

Figure 22:
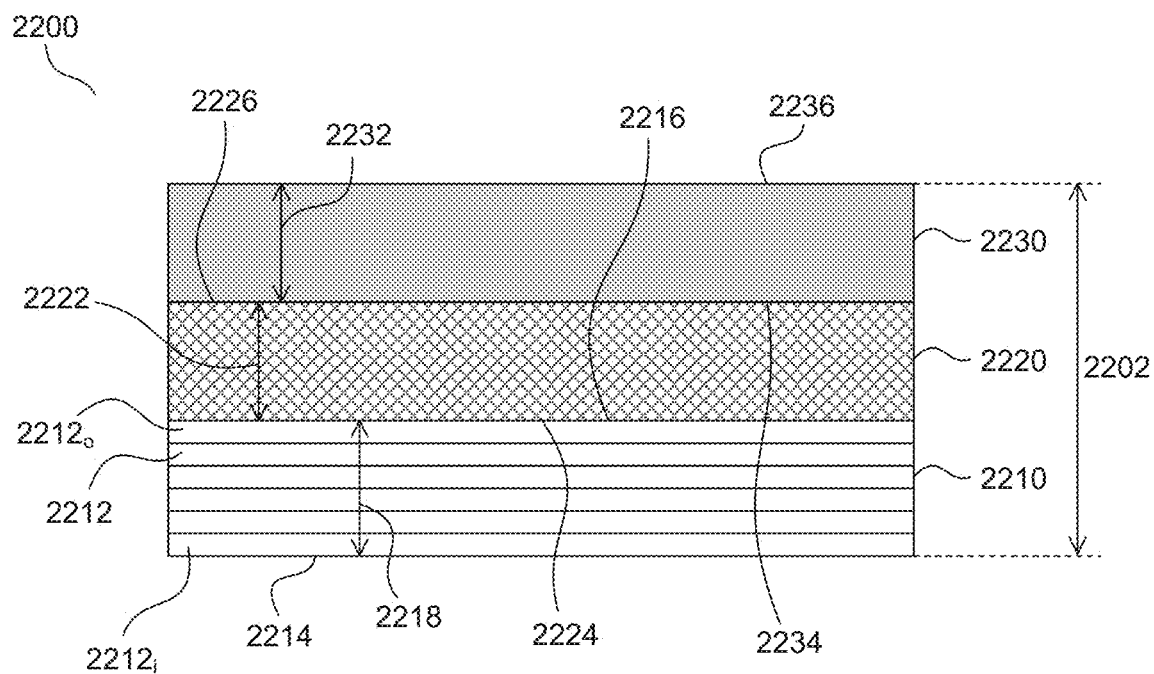
FIG. 22 is a layered structure according to some embodiments.
Figure 24:
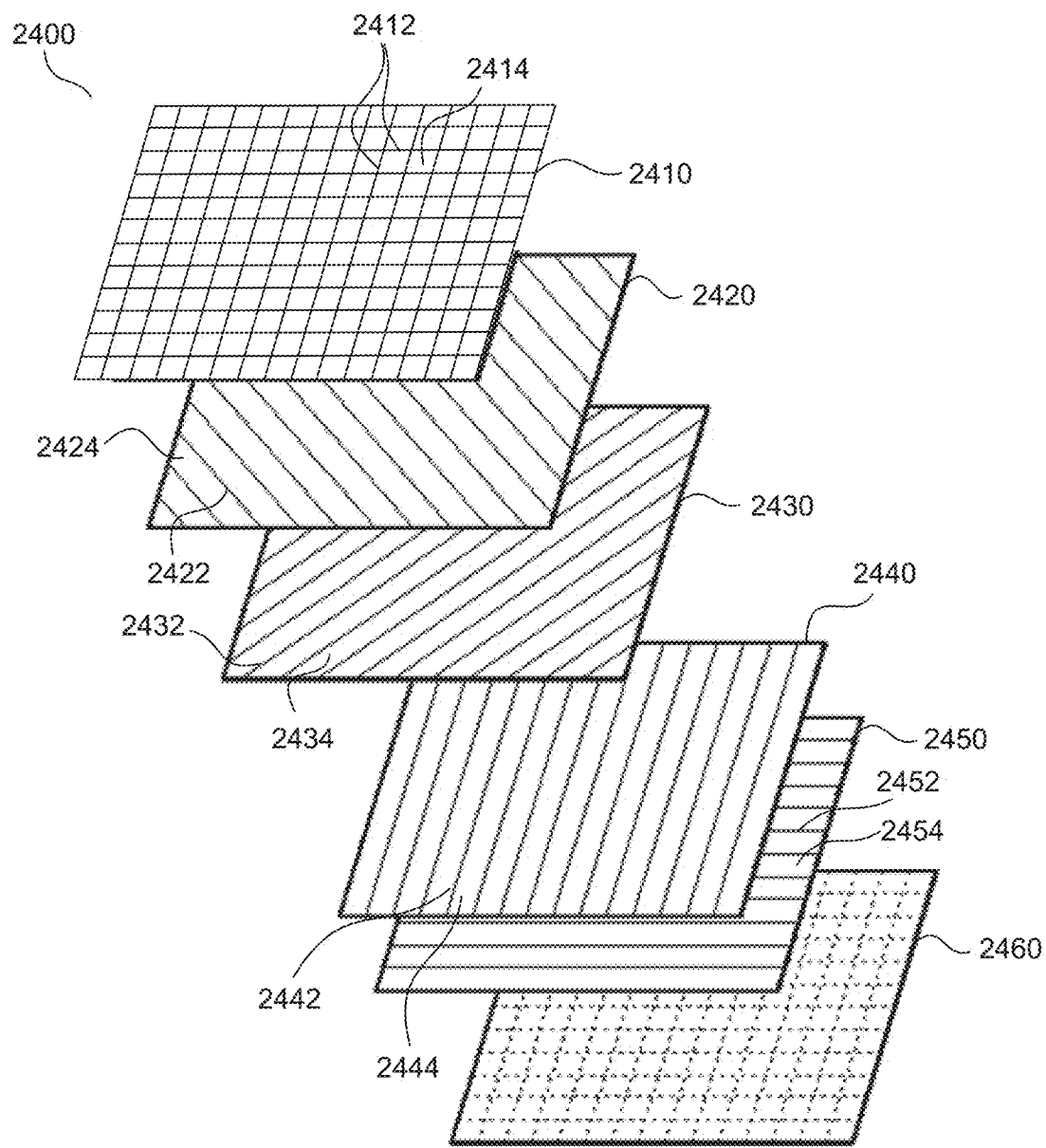
FIG. 24 is an exploded view of a layered structure according to some embodiments.

In some embodiments, a layered structure may include a woven composite layer including color/metallic coated fibers. FIG. 22 shows a layered structure 2200 including a woven composite layer 2220 with color/metallic fibers according to some embodiments. Layered structure 2200 may include a non-woven composite layer 2210 (i.e., a non-woven composite layup) including a plurality of unidirectional fiber composite plies 2212. In some embodiments, layered structure 2200 may include a plurality of woven composite layers 2220 and/or a plurality of non-woven composite layers 2210. In some embodiments, layered structure 2200 may not include woven composite layer 2220. For example, in some embodiments, a face insert (e.g., face insert 4510) may be constructed with a layered structure 2200 devoid of a woven composite layer 2220. In some embodiments, non-woven composite layer 2210 may include one or more "clusters" of elongated strips, for example, clusters 4624a-4624g of elongated strips 4626 as described in reference to FIGS. 49-52. While clusters of elongated strips are described in reference to face insert 4510, one or more clusters of elongated strips may be incorporated into a layered structure for a crown insert or sole insert described herein. Clusters of elongated strips may be utilized to impart a desired surface contour and/or structural characteristics to inserts discussed herein. Non-woven composite layer 2210 may include any suitable number of unidirectional fiber composite plies 2212, such as for example, two plies, three plies, four plies, five plies, six plies, or seven plies. FIG. 24 and Table 1 below provide examples of possible layups for unidirectional fiber composite plies 2212. In some embodiments, non-woven composite layer 2210 may be a single unidirectional fiber composite ply 2212. In such embodiments, the single ply 2212 may have thickness of 0.60 mm+/−0.05 mm.

In any event, unidirectional fiber composite plies 2212 of non-woven composite layer 2210 include an innermost unidirectional fiber composite ply 2212i and an outermost unidirectional fiber composite ply 2212o. Outermost unidirectional fiber composite ply 2212o defines an outer surface 2216 of non-woven composite layer 2210. Innermost unidirectional fiber composite ply 2212i defines an inner surface 2214 of non-woven composite layer 2210, which may be the inner surface of layered structure 2200. In some embodiments, a scrim layer (e.g., scrim layer 2460) may be disposed on innermost unidirectional fiber composite ply 2212i and define the inner surface of layered structure 2200. As used herein, the term "unidirectional fiber composite ply" means a ply having fibers embedded within a matrix material with all of the fibers oriented in substantially the same direction within the matrix material.

Non-woven composite layer 2210 may have a thickness 2218, measured from inner surface 2214 to outer surface 2216, in the range of 0.55 mm to 1.0 mm, including subranges. For example, thickness 2218 may be 0.55 mm, 0.60 mm, 0.65 mm, 0.70 mm, 0.75 mm, 0.80 mm, 0.85 mm, 0.90 mm, 0.95 mm, or 1.0 mm, or in a range having any two of these values as endpoints.

In some embodiments, one or more of unidirectional fiber composite plies 2212 may include color/metallic coated fibers. In some embodiments, at least outermost unidirectional fiber composite ply 2212o may include color/metallic coated fibers. In such embodiments, the color/metallic coated fibers of at least the outermost unidirectional fiber composite ply 2212o may aid in concealing any visually perceptive gaps between color/metallic coated fibers of woven composite layer 2220 of layered structure 2200. Such gaps may create visually unappealing defects in visual features created by woven composite layer 2220 by introducing an unintentional change in color. Visually perspective gaps between color/metallic coated fibers of woven composite layer 2220 may be most likely to occur in areas of a component including layered structure 2200 that have a relatively sharp radius of curvature (e.g., a radius of curvature of 5.0 mm or less). For example, edge 1828 of recess 1824 of crown insert 1800 may create an area susceptible to the formation of visually perceptive gaps between color/metallic coated fibers of composite woven layer 2220. A visually perceptive gap, may be a gap larger than 0.50 mm. In some embodiments, outermost unidirectional fiber composite ply 2212o and the second outermost unidirectional fiber composite play 2212 (i.e., the fiber composite ply 2212 immediately adjacent to outermost unidirectional fiber composite player 2212o) may include color/metallic coated fibers. In some embodiments, all the unidirectional fiber composite plies 2212 in non-woven composite layer 2210 may include color/metallic coated fibers.

Woven composite layer 2220 may be disposed over outermost unidirectional fiber composite ply 2212o. In some embodiments, an inner surface 2224 of woven composite layer 2220 may be in direct contact with outer surface 2216 of non-woven composite layer 2210. In some embodiments, the color/metallic coated fibers of woven composite layer 2220 may be embedded within a matrix material. In some embodiments, the matrix material may be optically transparent. In some embodiments, the matrix material may be colorless. In embodiments including fibers with a color coating, which may or may not be metallic, the color of the color coating may be, but is not limited to, red, crimson, maroon, magenta, pink, orange, yellow, gold, chartreuse, green, blue, navy, aqua, teal, cerulean, indigo, violet, purple, brown, black, grey, white, beige, silver, taupe, and various shades of these colors. In some embodiments, the color of a fiber coating may be a silver metallic color, such as but not limited to metallic red, metallic pink, metallic orange, metallic yellow, metallic gold, metallic green, metallic blue, metallic teal, metallic purple, metallic brown, metallic black, metallic grey, metallic white, metallic silver, and various shades of these colors. In some embodiments, the color coating may be a glittered color coating.

As used herein, "optically transparent" means an average transmittance of 70% or more in the wavelength range of 400 nm to 700 nm through a 1.0 mm thick piece of a material. In some embodiments, an optically transparent material may have an average transmittance of 75% or more, 80% or more, 85% or more, or 90% or more in the wavelength range of 400 nm to 700 nm through a 1.0 mm thick piece of the material. The average transmittance in the wavelength range of 400 nm to 700 nm is calculated by measuring the transmittance of all wavelengths between 400 nm and 700 nm and averaging the measurements.

The color of a coating or layer may be described with respect to CIELab color space using L*a*b* color values or L*C*h color values, but other color descriptions can be used. As used herein, L* is referred to as lightness, a* and b* are referred to as chromaticity coordinates, C* is referred to as chroma, and h is referred to as hue. In the CIELab color space, +a* is a red direction, −a* is a green direction, +b* is a yellow direction, and −b* is the blue direction. L* has a value of 100 for a perfect white diffuser. Chroma and hue are polar coordinates associated with a* and b*, wherein chroma (C*) is a distance from the axis along which a*=b*=0 and hue is an angle measured counterclockwise from the +a* axis.

In some embodiments, a yellow color may have L, a, and b values within the following ranges: L=80–95; a=−20–5; and b=45–110. In some embodiments, an orange color may have L, a, and b values within the following ranges: L=50–90; a=5–65; and b=40–95. In some embodiments, a red color may have L, a, and b values within the following ranges: L=35–85; a=25–80; and b=−50–55. In some embodiments, a violet color may have L, a, and b values within the following ranges: L=15–80; a=20–80; and b=−65–0. In some embodiments, a blue color may have L, a, and b values within the following ranges: L=10–90; a=−55–55; and b=−75−−10. In some embodiments, a green color may have L, a, and b values within the following ranges: L=25–90; a=−85−−15; and b=−15–85.

Woven composite layer 2220 may have a thickness 2222, measured from inner surface 2224 to an outer surface 2226 of woven composite layer 2220 in the range of 0.05 mm to 0.15 mm, including subranges. For example, thickness 2222 may be 0.05 mm, 0.06 mm, 0.07 mm, 0.08 mm, 0.09 mm, 0.10 mm, 0.11 mm, 0.12 mm, 0.13 mm, 0.14 mm, or 0.15 mm, or in a range having any two of these values as endpoints.

Woven composite layer 2220 may include fibers woven in any suitable weave pattern. As used herein the term "weave pattern" means a woven pattern having two or more sets of fibers or fiber tows oriented in different directions, with the different sets of fibers or fiber tows overlapping each other and interwoven with each other (for example, in an alternating, overlapping configuration). A weave pattern includes an ordered arrangement of fiber or fiber tow sets across the pattern. A weave pattern does not include a significant amount of randomly oriented fibers or fibers tows. In some embodiments, a weave pattern may have a consistent pattern of overlapping and interwoven fibers or fiber tows across the weave pattern. In some embodiments, a weave pattern may include different areas having different weave pattern types. For example, a first portion of a weave pattern may have a first weave pattern type (e.g., plain weave) and a second portion of the weave pattern may have a second weave pattern type (e.g., twill weave).

Figure 28:
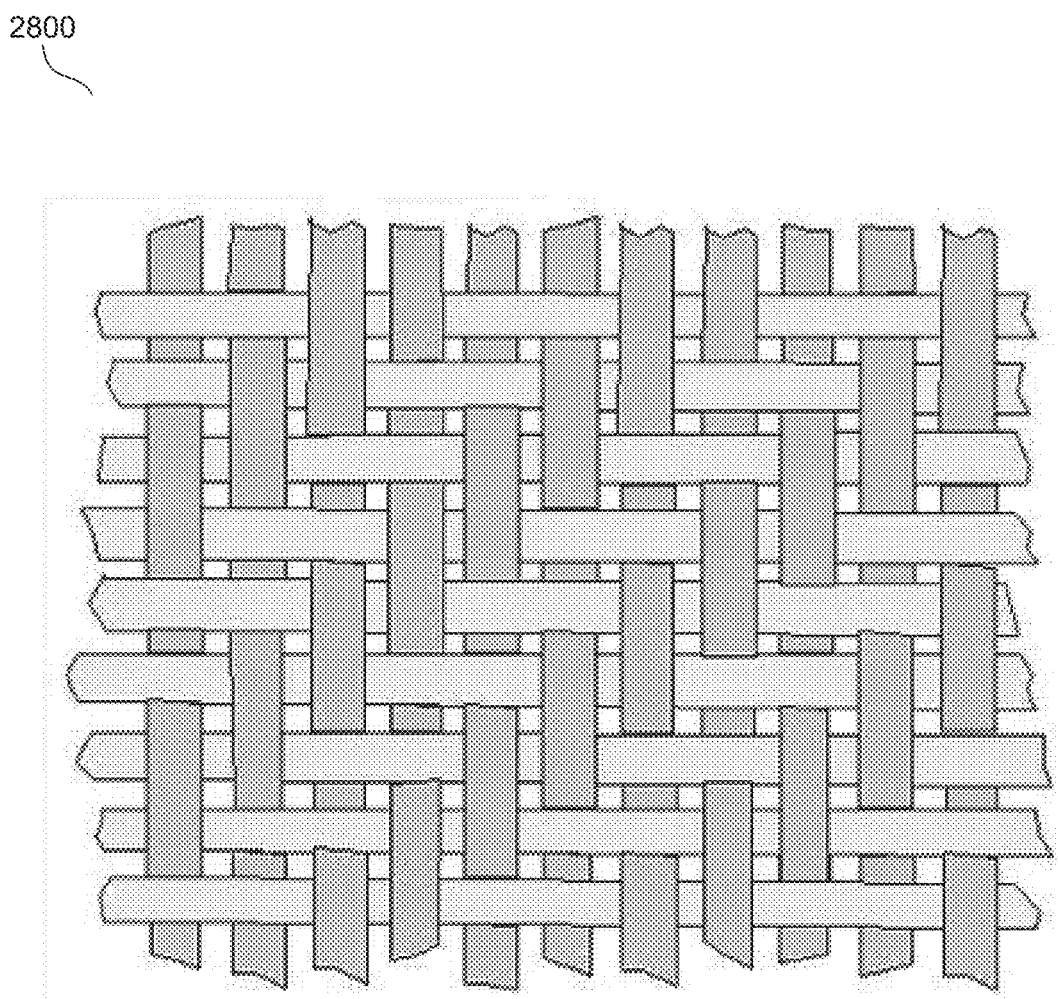
FIG. 28 is a 2×2 twill weave pattern according to some embodiments.
Figure 29:
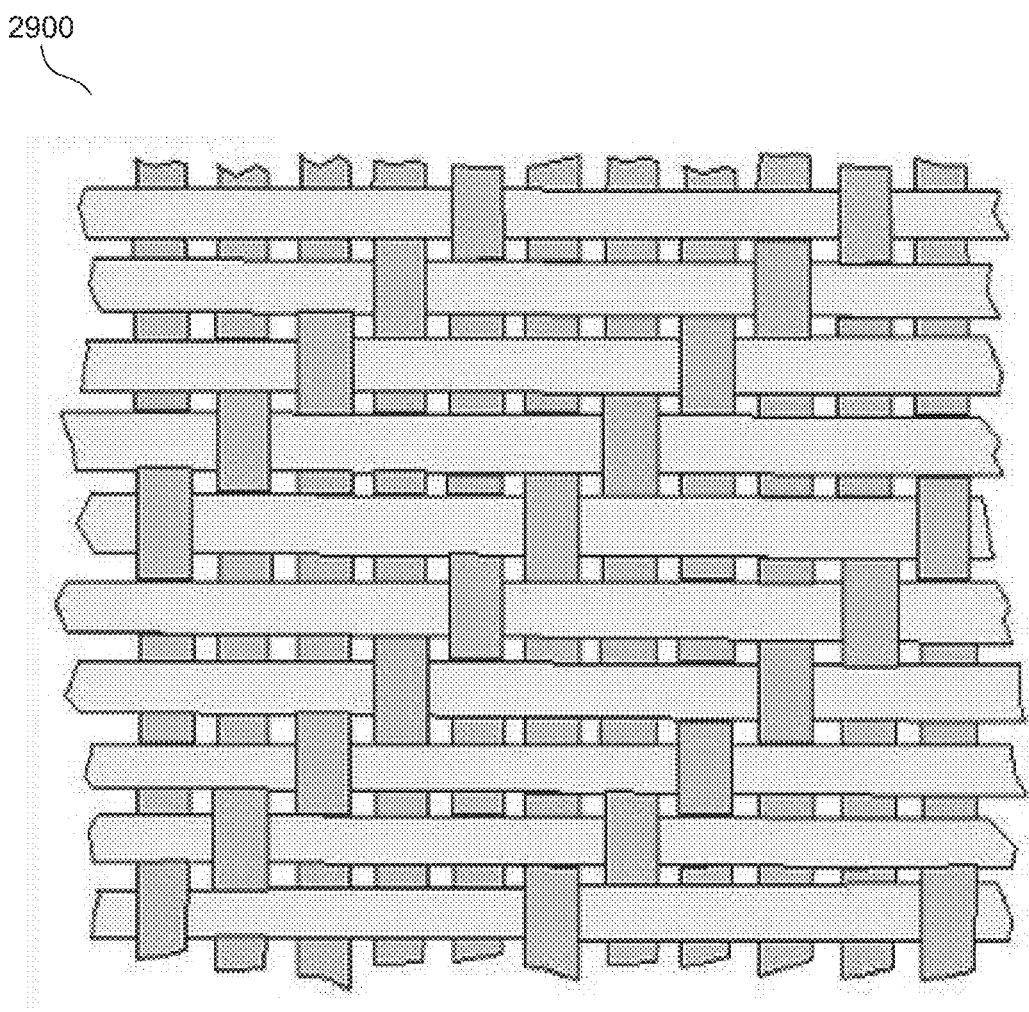
FIG. 29 is a 4 harness satin weave pattern according to some embodiments.
Figure 30:
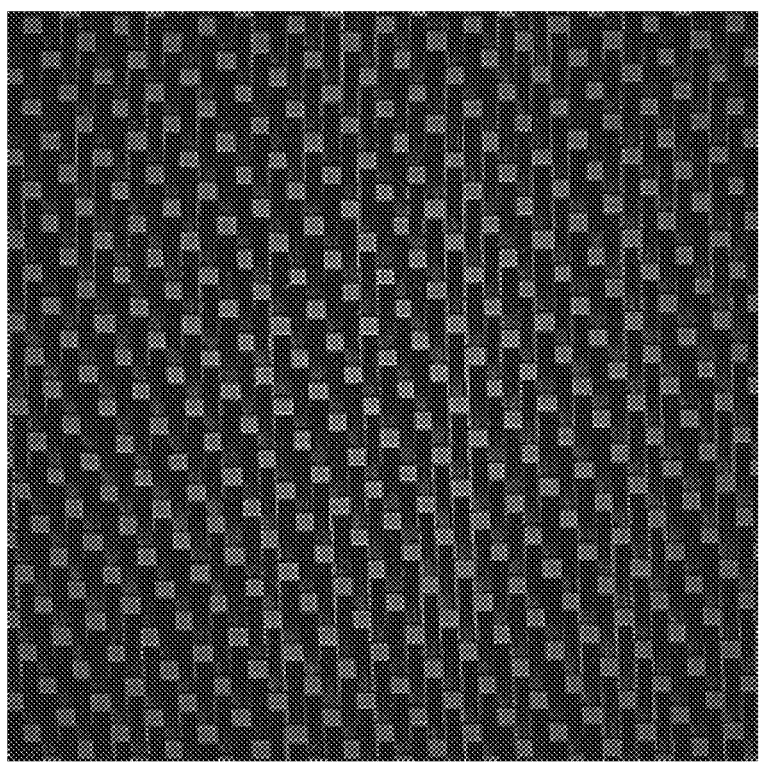
FIG. 30 is a 5 harness-satin weave pattern according to some embodiments.
Figure 31:
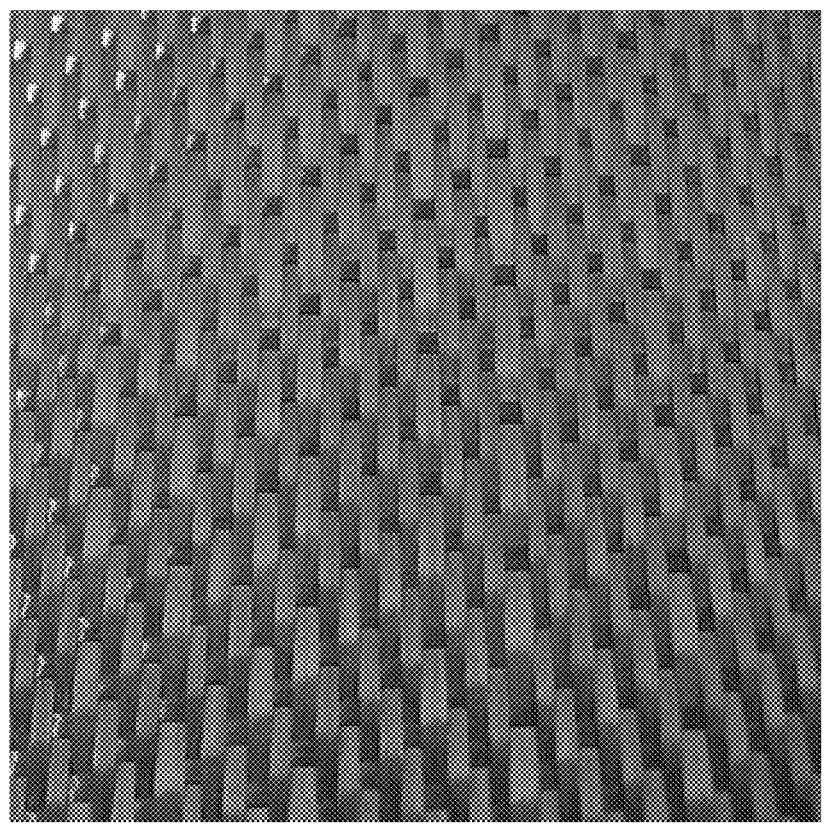
FIG. 31 is an 8 harness-satin weave pattern according to some embodiments.
Figure 32:
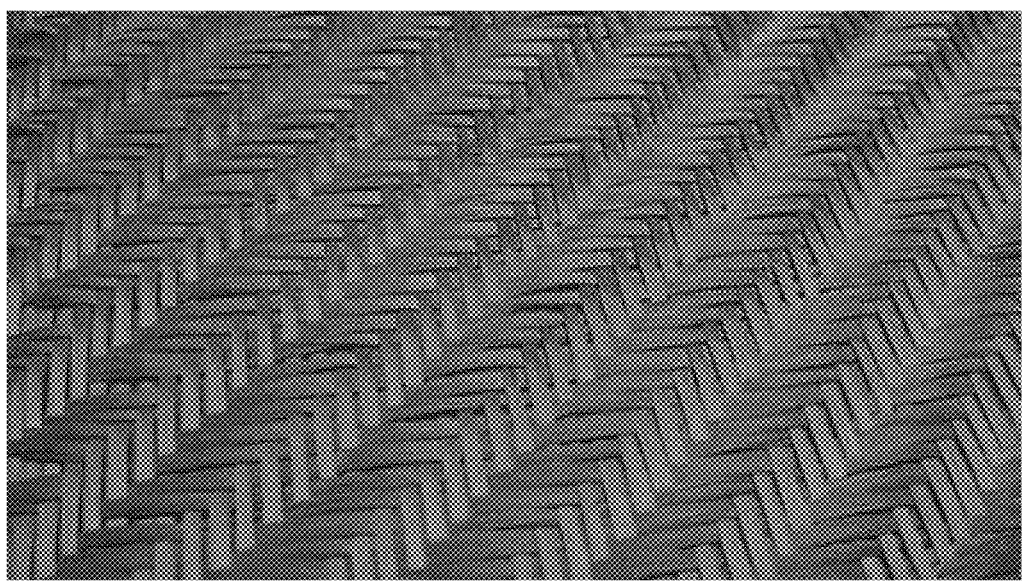
FIG. 32 is a 4×4 twill weave pattern according to some embodiments.
Figure 33:
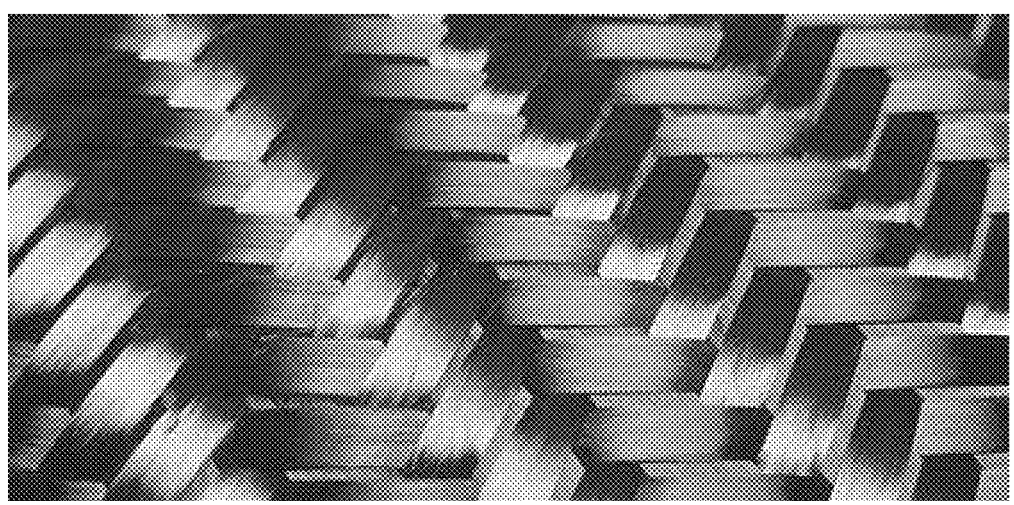
FIG. 33 is a triaxial balance weave pattern according to some embodiments.
Figure 34:
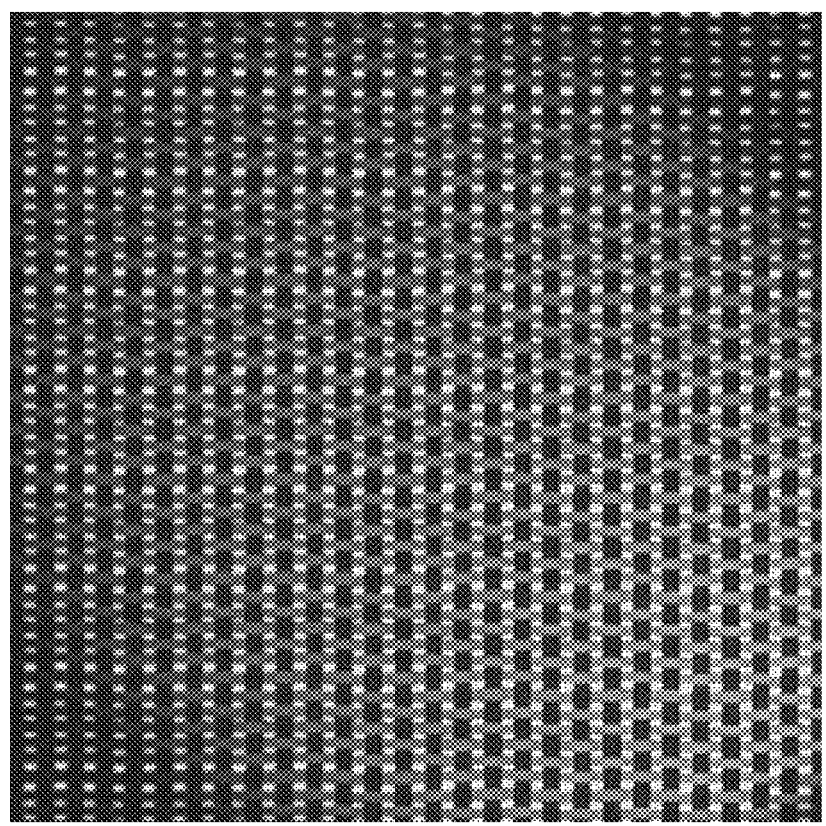
FIG. 34 is a 1K×3K plain weave pattern according to some embodiments.
Figure 35:
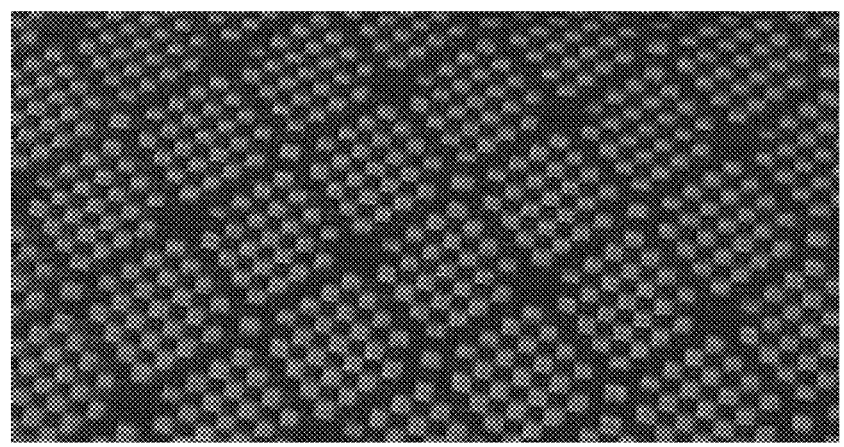
FIG. 35 is an A jacquard weave pattern according to some embodiments.
Figure 36:
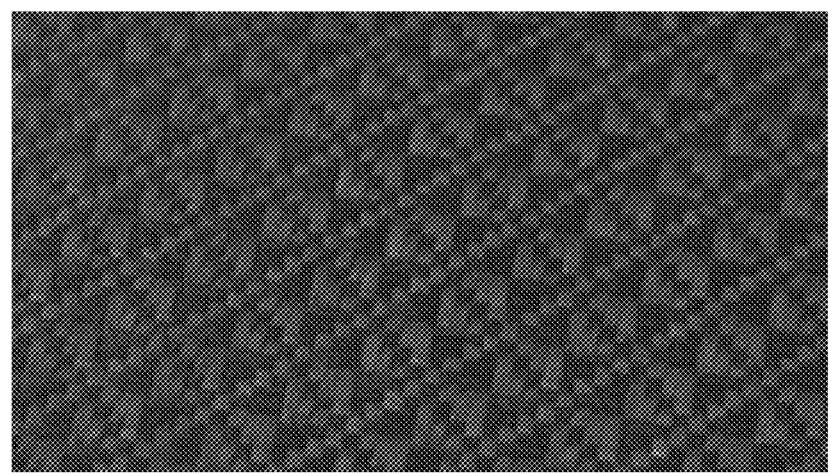
FIG. 36 is a D jacquard weave pattern according to some embodiments.
Figure 37:
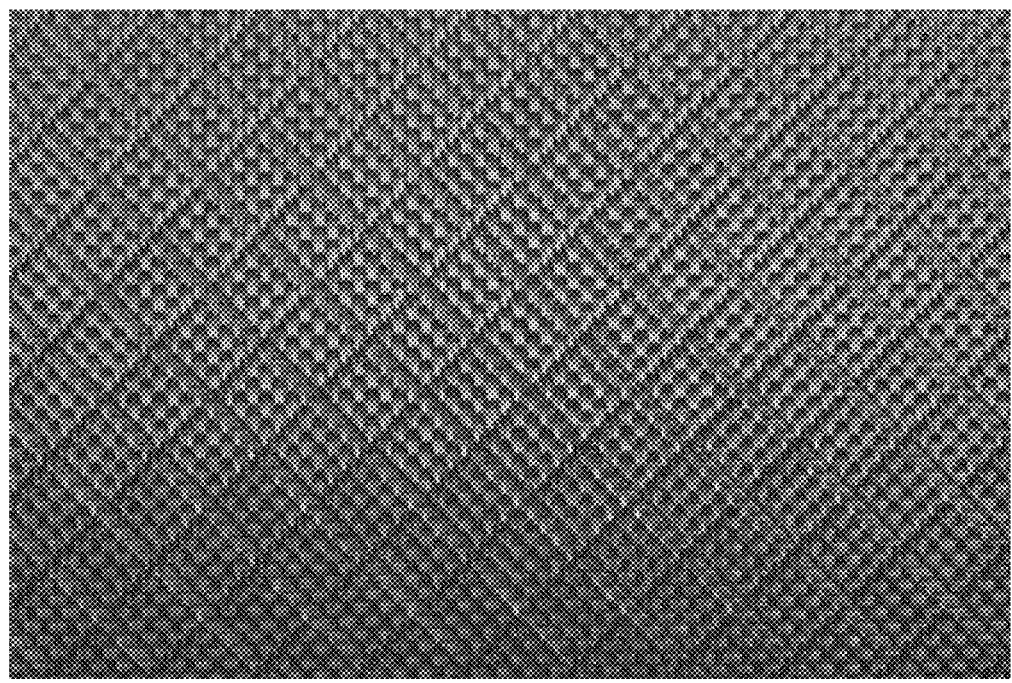
FIG. 37 is an aquarius weave pattern according to some embodiments.
Figure 38:
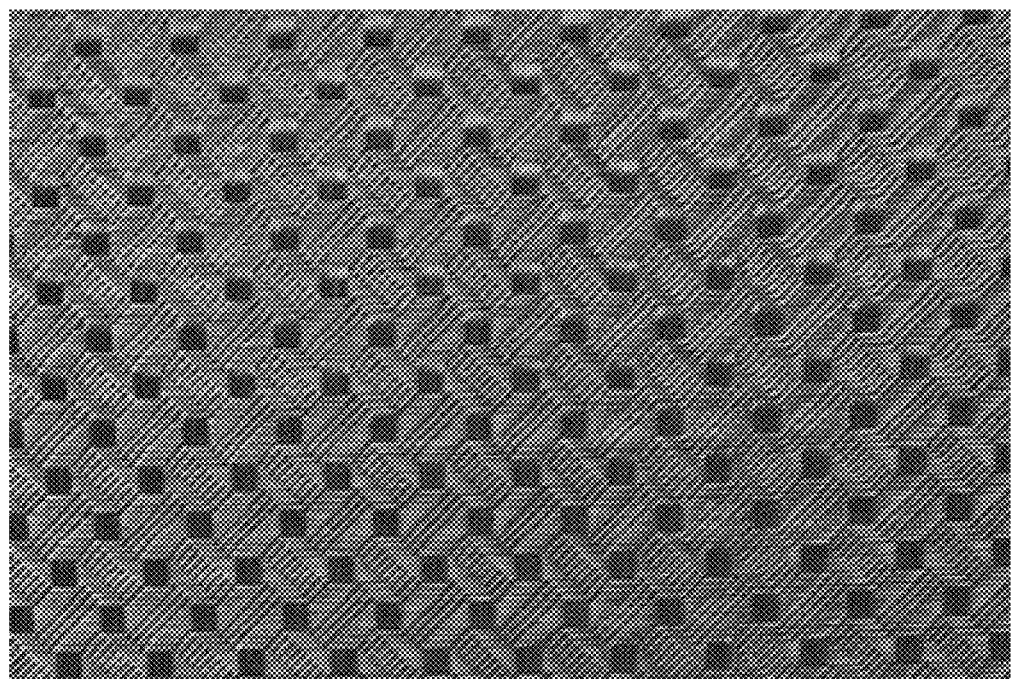
FIG. 38 is a constellation weave pattern according to some embodiments.
Figure 39:
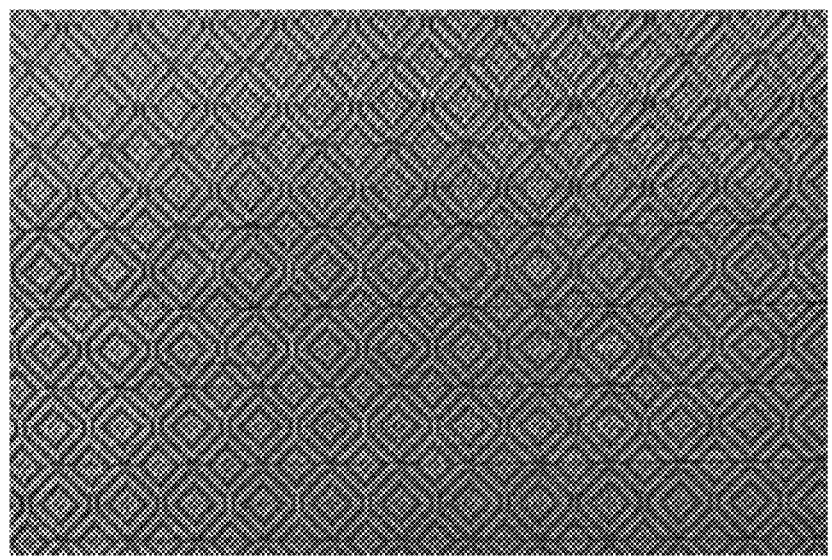
FIG. 39 is a galaxy weave pattern according to some embodiments.
Figure 40:
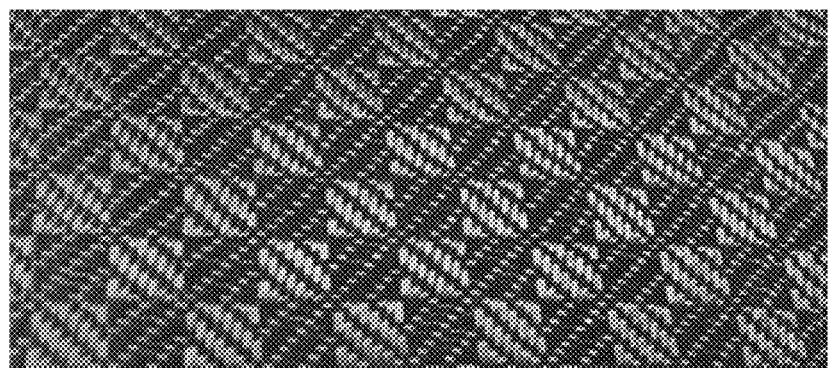
FIG. 40 is a rook weave pattern according to some embodiments.
Figure 41:
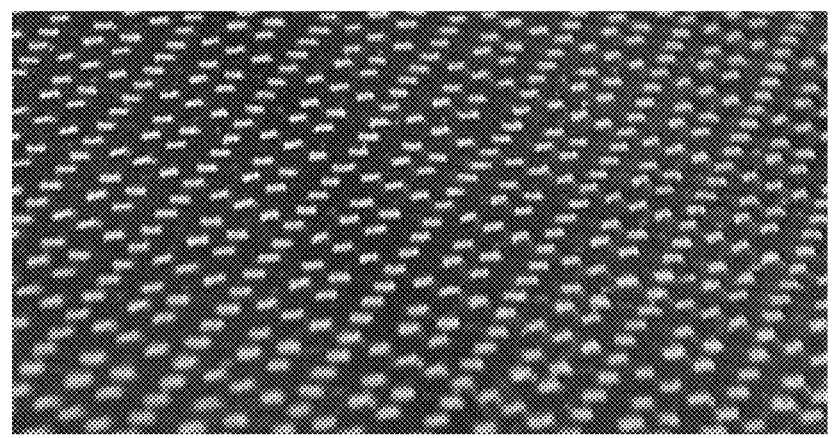
FIG. 41 is an atomic weave pattern according to some embodiments.
Figure 42:
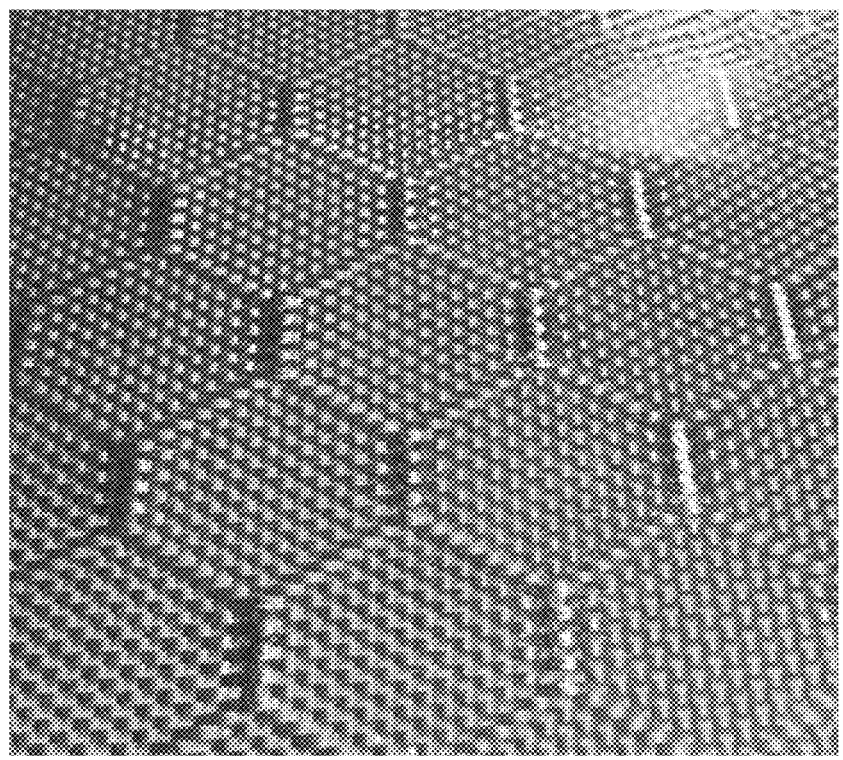
FIG. 42 is a wasp weave pattern according to some embodiments.
Figure 43:
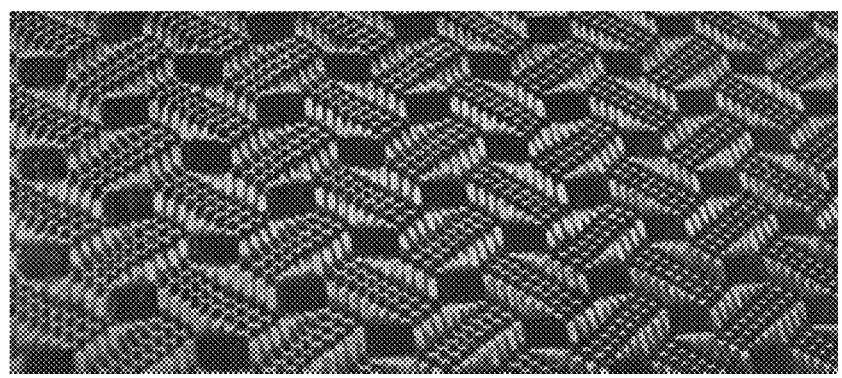
FIG. 43 is a roswell weave pattern according to some embodiments.
Figure 44:
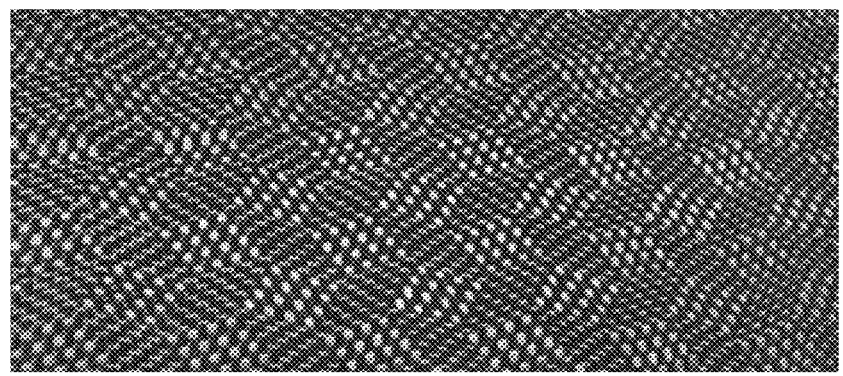
FIG. 44 is a labyrinth weave pattern according to some embodiments.

Suitable weave patterns for composite layer 2220 include, but are not limited to, the following patterns. A plain weave pattern, for example the 1×1 plain weave pattern 2700 shown in FIG. 27A or the 1K×3K plain weave pattern 3400 shown in FIG. 34. A twill weave pattern, for example the 2×2 twill weave pattern 2800 shown in FIG. 28 or the 4×4 twill weave pattern 3200 shown in FIG. 32. A satin weave pattern or a harness-satin weave pattern, for example the 4 harness-satin weave pattern 2900 shown in FIG. 29, the 5 harness-satin weave pattern 3000 shown in FIG. 30, and the 8 harness-satin weave pattern 3100 shown in FIG. 31. A triaxial weave pattern, for example the triaxial balance weave pattern 3300 shown in FIG. 33. A jacquard weave pattern, for example the A jacquard weave pattern 3500 shown in FIG. 35 or the D jacquard weave pattern 3600 shown in FIG. 36. An aquarius weave pattern, for example the aquarius weave pattern 3700 shown in FIG. 37. A constellation weave pattern, for example the constellation weave pattern 3800 shown in FIG. 38. A galaxy weave pattern, for example the galaxy weave pattern 3900 shown in FIG. 39. A rook weave pattern, for example the rook weave pattern 4000 shown in FIG. 40. An atomic weave pattern, for example the atomic weave pattern 4100 shown in FIG. 41. A wasp weave pattern, for example, the wasp weave pattern 4200 shown in FIG. 42. A roswell weave pattern, for example the roswell weave pattern 4300 shown in FIG. 43. A labyrinth weave pattern, for example the labyrinth weave pattern 4400 shown in FIG. 44. A basket weave pattern. A dobby weave pattern. A piqué weave pattern. A momie weave pattern. A leno weave pattern. A swivel weave pattern. A double weave pattern. A pile weave pattern. A slack-tension weave pattern. A tapestry weave pattern. A spread tow weave pattern. A rib weave pattern. And an oxford weave pattern. Custom weave patterns may also be used, for example, a weave pattern including two or more of the above-listed patterns. In some embodiments, woven composite layer 2220 may be a knitted composite layer including fibers knitted in suitable knitted pattern.

In some embodiments, the weave pattern of woven composite layer 2220, or any other woven composite layer discussed herein, may have a minimum weave density to inhibit separation or movement between fibers and/or fiber tows of the woven composite layer when forming a golf club component (e.g., a crown insert, a sole insert, or a club shaft) including the woven composite layer. Undesired separation or movement between fibers and/or fibers tows may result in visually unappealing spots on a component made using the woven composite layer. For example, if the woven pattern of fibers/fiber tows for a woven composite layer is cut from a sheet of fibers/fiber tows color coated in sheet form, separation and/or movement of fibers/fiber tows may result in non-colored portions of the fibers/fiber tows becoming visible in the colored woven pattern. A sufficiently high weave density can prevent undesired separation and/or movement between fibers/fiber tows in a woven pattern, and therefore help prevent the formation of visually unappealing spots.

In some embodiments, the weave pattern of woven composite layer 2220 may have a minimum weave density (also called "Fiber Areal Weight" (FAW)) in the range of 50-650 grams per meter squared ($g/m^2$) of weave pattern, including subranges. For example, the weave density may be 50 grams per meter squared, 100 grams per meter squared, 150 grams per meter squared, 200 grams per meter squared, 220 grams per meter squared, 240 grams per meter squared, 250 grams per meter squared, 260 grams per meter squared, 280 grams per meter squared, 300 grams per meter squared, 320 grams per meter squared, 340 grams per meter squared, 350 grams per meter squared, 360 grams per meter squared, 380 grams per meter squared, 400 grams per meter squared, 450 grams per meter squared, 500 grams per meter squared, 550 grams per meter squared, 600 grams per meter squared, 650 grams per meter squared, or within a range having any two of these values as end points. In some embodiments, the weave density may be 240 grams per meter squared or more. In some embodiments, the weave density may be more than 650 grams per meter squared. Weave density is the mass of woven material per unit area of a weave pattern. As such, for a given material, a tighter weave pattern will result in a higher weave density because more woven material will be present per unit area.

In some embodiments, the color/metallic coating material for woven composite layer may be present at a density of 0.5 to 4.0 grams per meter squared of weave pattern. In some embodiments, the color/metallic coating material may be present at a density of 1.0 to 4.0 grams per meter squared of weave pattern. In some embodiments, the color/metallic coating material may be present at a density of 1.0 to 3.0 grams per meter squared of weave pattern. In some embodiments, the color/metallic coating material may be present at a density of 1.0 to 2.0 grams per meter squared of weave pattern. The thickness of the color/metallic coating material coated on individual fibers, individual fiber tows, or on a sheet of woven fiber may be tailored to achieve a desired density of colored material. Unless indicated otherwise, the density of a weave pattern and the density of a color/metallic coating material are measured in the absence of a matrix material (e.g., before a woven material is embedded within a matrix material). In some embodiments, the density of a weave pattern may be measured after embedding the woven material into a matrix material by measuring the density of the embedded woven material and factoring out the density of the matrix material.

In some embodiments, an optically transparent coating 2230 may be disposed over woven composite layer 2220. In such embodiments, an outer surface 2236 of optically transparent coating 2230 may define the least a portion of an outer surface of a golf club head (e.g., outer surface 90 of golf club head 10). In such embodiments, the outer surface of the golf club head may be the outermost surface of the golf club head that is exposed to the environment surrounding the golf club head. In some embodiments, outer surface 2236 may define an outer surface of a crown or sole insert (e.g., outer surfaces 1820, 2030, and 2070 of crown insert 1800, first sole insert 2010, and second sole insert 2050, respectively). In some embodiments, an inner surface 2234 of optically transparent coating 2230 may be in direct contact with outer surface 2226 of woven composite layer 2220.

Optically transparent coating 2230 may have a thickness 2232, measured from inner surface 2234 to outer surface 2236 in the range of 0.01 mm to 0.06 mm, including subranges. For example, thickness 2232 may be 0.01 mm, 0.015 mm, 0.02 mm, 0.025 mm, 0.03 mm, 0.035 mm, 0.04 mm, 0.045 mm, 0.05 mm, 0.055 mm, or 0.06 mm, or in a range having any two of these values as endpoints. In some embodiments, optically transparent coating 2230 may be composed of an optically transparent polymeric material, such as but not limited to, polycarbonate or polyurethane. In some embodiments, optically transparent coating 2230 may be colorless.

In some embodiments, layered structure 2200 may have an overall thickness 2202 in the range of 0.10 mm to 1.20 mm, including subranges. For example, thickness 2202 may be 0.10 mm, 0.15 mm, 0.20 mm, 0.25 mm, 0.30 mm, 0.35 mm, 0.40 mm, 0.45 mm, 0.50 mm, 0.55 mm, 0.60 mm, 0.65 mm, 0.70 mm, 0.75 mm, 0.80 mm, 0.85 mm, 0.90 mm, 0.95 mm, 1.0 mm, 1.05 mm, 1.10 mm, 1.15 mm, or 1.20 mm, or in a range having any two of these values as endpoints. In some embodiments, layered 2200 may have an overall thickness 2202 in the range of 0.50 mm to 1.0 mm. In some embodiments, layered structure 2200 may have an overall thickness 2202 in the range of 0.25 mm to 0.8 mm.

In some embodiments, a layered structure for crown insert 1800, first sole insert 2010, second sole insert 2050, and/or face insert 4510 may include a dye clear layer. In some embodiments, layered structure 2200 may include a dye clear layer (e.g., dye clear layer 2340). In such embodiments, the dye clear layer may serve to enhance the color and/or brightness of metallic/colored fibers of a layered structure. In some embodiments, at least outermost unidirectional ply 2212o may include lightly colored fibers (e.g., fiberglass or Kevlar® fibers) and the dye clear may enhance the brightness of the fiber color. In some embodiments, a layered structure discussed herein may include dye clear layers having different degrees of shininess. For example, a layered structure discussed herein may include a relatively shiny dye clear layer disposed over a first portion of the layered structure and a relatively dull dye clear layer disposed over a second portion of the layered structure. The different degrees of shininess for different dye clear layers may produce a layered structure with different areas having different visual appearances. For example, a relatively dull dye clear layer may visually darken the color of underlying colored fibers while a relatively shiny dye clear layer may visually brighten the color of underlying colored fibers. In some embodiments, a relatively shiny dye clear layer may be called a glossy dye clear layer and a relatively dull dye clear layer may be called a matte dye clear layer. These different portions of a dye clear layer may be portions of a continuous layer or may be separate layers that, together, define a dye clear layer.

Figure 23:
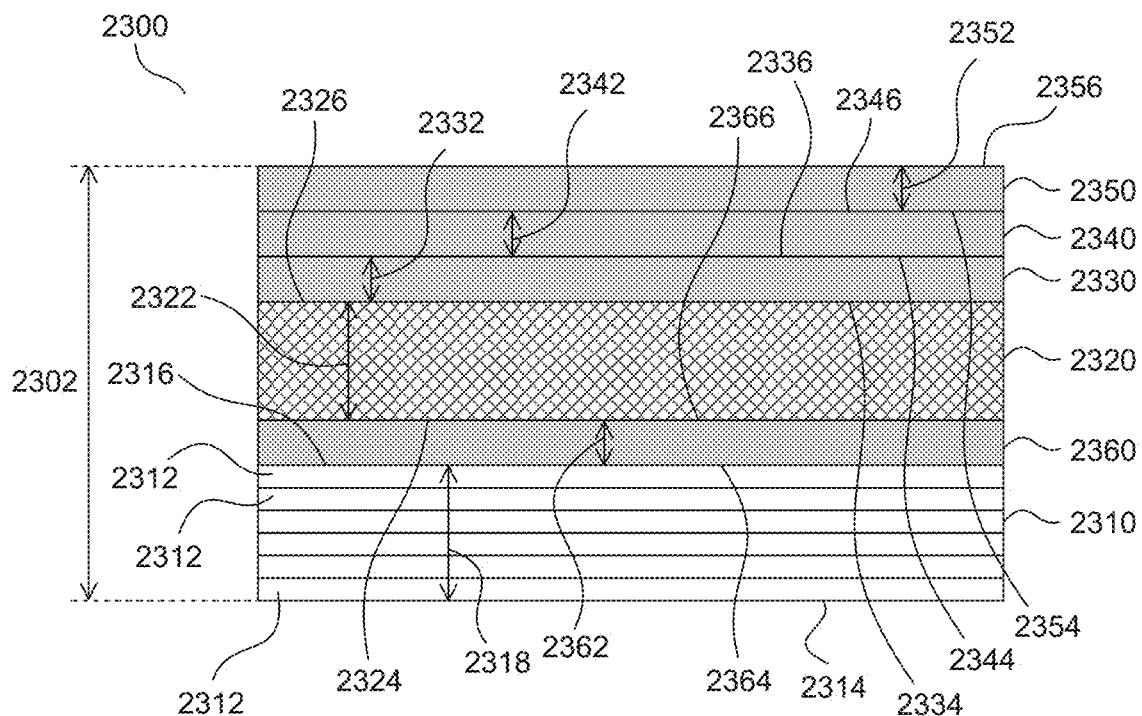
FIG. 23 is a layered structure according to some embodiments.

FIG. 23 shows a layered structure 2300 including a dye clear layer according to some embodiments. Layered structure 2300 may include a non-woven composite layer 2310 (i.e., a non-woven composite layup) including a plurality of unidirectional fiber composite plies 2312. Non-woven composite layer 2310 may include any suitable number of unidirectional fiber composite plies 2312, such as for example, two plies three plies, four plies, five plies, six plies, or seven plies. FIG. 24 and Table 1 below provide examples of possible layups for unidirectional fiber composite plies 2312. In some embodiments, non-woven composite layer 2310 may be a single unidirectional fiber composite ply 2312. In such embodiments, the single ply 2312 may have thickness of 0.60 mm+/−0.05 mm.

In some embodiments, layered structure 2300 may include a plurality of woven composite 2320 layers and/or a plurality of non-woven composite layers 2310. In some embodiments, layered structure 2300 may not include woven composite layer 2320. For example, in some embodiments a face insert (e.g., face insert 4510) may be constructed with a layered structure 2300 devoid of a woven composite layer 2320. In some embodiments, non-woven composite layer 2310 may include one or more "clusters" of elongated strips, for example, clusters 4624a-4624g of elongated strips 4626 as described in reference to FIGS. 49-52. In some embodiments, all or a portion of the unidirectional fiber composite plies 2312 in non-woven composite layer 2310 may include color/metallic coated fibers.

Similar, to non-woven composite layer 2210, non-woven composite layer 2310 may have a thickness 2318, measured from an inner surface 2314 to an outer surface 2316 of non-woven composite layer 2310, in the range of 0.55 mm to 1.0 mm, including subranges. For example, thickness 2318 may be 0.55 mm, 0.60 mm, 0.65 mm, 0.70 mm, 0.75 mm, 0.80 mm, 0.85 mm, 0.90 mm, 0.95 mm, or 1.0 mm, or in a range having any two of these values as endpoints.

A woven composite layer 2320 may be disposed over outer surface 2316 of non-woven composite layer 2310. In some embodiments, an inner surface 2324 of woven composite layer 2320 may be in direct contact with outer surface 2316 of non-woven composite layer 2310. In some embodiments, the fibers of woven composite layer 2320 may be embedded within a matrix material. In some embodiments, the matrix material may be optically transparent. In some embodiments, the matrix material may be colorless. In some embodiments, the fibers of woven composite layer 2320 may be color/metallic coated fibers.

Similar to woven composite layer 2220, woven composite layer 2320 may have a thickness 2322, measured from inner surface 2324 to an outer surface 2326 of woven composite layer 2320, in the range of 0.05 mm to 0.15 mm, including subranges. For example, thickness 2322 may be 0.05 mm, 0.06 mm, 0.07 mm, 0.08 mm, 0.09 mm, 0.10 mm, 0.11 mm, 0.12 mm, 0.13 mm, 0.14 mm, or 0.15 mm, or in a range having any two of these values as endpoints. Woven composite layer 2320 may include fibers woven in any suitable weave pattern, including but not limited to, the patterns discussed above for woven composite layer 2220. In some embodiments, woven composite layer 2320 may be a knitted composite layer including fibers knitted in suitable knitted pattern.

In some embodiments, layered structure 2300 may include a paint primer layer 2330 disposed over woven composite layer 2320. In some embodiments, an inner surface 2334 of paint primer layer 2330 may be in direct contact with outer surface 2326 of woven composite layer 2320. In some embodiments, paint primer layer 2330 may be optically transparent. In some embodiments, paint primer layer 2330 may be colorless. Paint primer layer 2330 may have a thickness 2332, measured from inner surface 2334 to an outer surface 2336 of paint primer layer 2330, in the range of 0.003 mm to 0.01 mm, including subranges. For example, thickness 2332 may be 0.003 mm, 0.004 mm, 0.005 mm, 0.006 mm, 0.007 mm, 0.008 mm, 0.009 mm, or 0.01 mm, or in a range having any two of these values as endpoints.

A dye clear layer 2340 may be disposed over paint primer layer 2330. In some embodiments, an inner surface 2344 of dye clear layer 2340 may be in direct contact with outer surface 2336 of paint primer layer 2330. Dye clear layer 2340 may be a colored transparent polymeric layer. A suitable base material for dye clear layer 2340 is, but is not limited to polyurethane.

Dye clear layer 2340 may be colored with a dye. The color of dye clear layer 2340 may be, but is not limited to, red, crimson, maroon, magenta, pink, orange, yellow, gold, chartreuse, green, blue, navy, aqua, teal, cerulean, indigo, violet, purple, brown, black, grey, white, beige, silver, taupe, and various shades of these colors. In some embodiments, the color of a dye clear layer 2340 may be a silver metallic color, such as but not limited to metallic red, metallic pink, metallic orange, metallic yellow, metallic gold, metallic green, metallic blue, metallic teal, metallic purple, metallic brown, metallic black, metallic grey, metallic white, metallic silver, and various shades of these colors.

Dye clear layer 2340 may have a thickness 2342, measured from inner surface 2344 to an outer surface 2346 of dye clear layer 2340, in the range of 0.01 mm to 0.10 mm, including subranges. For example, thickness 2342 may be 0.01 mm, 0.02 mm, 0.03 mm, 0.04 mm, 0.05 mm, 0.06 mm, 0.07 mm, 0.08 mm, 0.09 mm, or 0.10 mm, or in a range having any two of these values as endpoints. In some embodiments, one or more features may be pad printed on inner surface 2344 and/or outer surface 2346 of dye clear layer 2340. Such features include, but are not limited to, alignment features, logos, brand names, product names, and aesthetic patterns.

In some embodiments, dye clear layer 2340 may be a tinted layer. In some embodiments, dye clear layer 2340 may include reflective pigment to provide as sparkling appearance. The reflective pigment, may be but is not limited to, metallic flakes made of a metal such as, but not limited to, nickel (Ni), copper (Cu), chromium (Cr), zinc (Zn), gold (Au), silver (Ag), aluminum (Al), cobalt (Co), magnesium (Mg), platinum (Pt), palladium (Pd), iron (Fe), titanium (Ti), tin (Sn), tungsten (W), or any alloy of one or more of these metals.

In some embodiments, dye clear layer 2340 may include different portions having different colors, tints, and/or pigments. These different portions of dye clear layer 2340 may be portions of a continuous layer or may be separate layers that, together, define dye clear layer 2340. For example, dye clear layer 2340 may include a first portion having a first color, pigment, and/or tint and a second portion having a second color, pigment, and/or tint (or no color, pigment, and/or tint). The different colors, pigments, and/or tints for different portions of dye clear layer 2340 may produce a layered structure 2300 with different areas having different visual appearances. For example, in some embodiments, dye clear layer 2340 may have a first portion including a colored dye and a second portion devoid of a colored dye. In such embodiments, the colored dye may visually darken the color of underlying colored fibers while the non-dyed portion of dye clear layer 2340 may leave the appearance of underlying colored fibers substantially unaltered. As another example, in some embodiments, dye clear layer 2340 may have a first portion including a first colored dye and a second portion including a second colored dye that is a different color than the first colored dye. In some embodiments, portions of dye clear layer 2340 having different colors, tints, and/or pigments may have the same degree of shininess. In some embodiments, portions of dye clear layer 2340 having different colors, tints, and/or pigments may also have different degrees of shininess. For example, in some embodiments, dye clear layer 2340 may have a first glossy portion including a first colored dye and a second matte portion including a second colored dye.

In some embodiments, layered structure 2300 may include an optically transparent coating 2350 disposed over dye clear layer 2340. In such embodiments, an outer surface 2356 of optically transparent coating 2350 may define the least a portion of an outer surface of a golf club head (e.g., outer surface 90 of golf club head 10). In such embodiments, the outer surface of the golf club head may be the outermost surface of the golf club head that is exposed to the environment surrounding the golf club head. In some embodiments, outer surface 2356 may define an outer surface of a crown or sole insert (e.g., outer surfaces 1820, 2030, and 2070 of crown insert 1800, first sole insert 2010, and second sole insert 2050, respectively). In some embodiments, an inner surface 2354 of optically transparent coating 2350 may be in direct contact with outer surface 2346 of dye clear layer 2340.

Optically transparent coating 2350 may have a thickness 2352, measured from inner surface 2354 to an outer surface 2356 of optically transparent coating 2350, in the range of 0.01 mm to 0.06 mm, including subranges. For example, thickness 2352 may be 0.01 mm, 0.015 mm, 0.02 mm, 0.025 mm, 0.03 mm, 0.035 mm, 0.04 mm, 0.045 mm, 0.05 mm, 0.055 mm, or 0.06 mm, or in a range having any two of these values as endpoints. In some embodiments, optically transparent coating 2350 may be colorless.

In some embodiments, layered structure 2300 may include a dye clear layer 2360 disposed over non-woven composite layer 2310 between non-woven composite layer 2310 and woven composite layer 2320. In some embodiments, an inner surface 2364 of dye clear layer 2360 may be in direct contact with outer surface 2316 of non-woven composite layer 2310. In some embodiments, an outer surface 2366 of dye clear layer 2360 may be in direct contact with inner surface 2324 of woven composite layer 2320. In embodiments including dye clear layer 2360, dye clear layer 2360 may aid in concealing any visually perceptive gaps between fibers of woven composite layer 2320.

Dye clear layer 2360 may have a thickness 2362, measured from inner surface 2364 to outer surface 2366 in the range of 0.01 mm to 0.10 mm, including subranges. For example, thickness 2362 may be 0.01 mm, 0.02 mm, 0.03 mm, 0.04 mm, 0.05 mm, 0.06 mm, 0.07 mm, 0.08 mm, 0.09 mm, or 0.10 mm, or in a range having any two of these values as endpoints. Dye clear layer 2360 may be composed of the same material(s) and dye(s) as dye clear layer 2340.

In some embodiments, layered structure 2300 may have an overall thickness 2302 in the range of 0.10 mm to 1.40 mm, including subranges. For example, thickness 2302 may be 0.10 mm, 0.15 mm, 0.20 mm, 0.25 mm, 0.30 mm, 0.35 mm, 0.40 mm, 0.45 mm, 0.50 mm, 0.55 mm, 0.60 mm, 0.65 mm, 0.70 mm, 0.75 mm, 0.80 mm, 0.85 mm, 0.90 mm, 0.95 mm, 1.0 mm, 1.05 mm, 1.10 mm, 1.15 mm, 1.20 mm, 1.25 mm, 1.30 mm, 1.35 mm, or 1.40 mm, or in a range having any two of these values as endpoints.

In some embodiments, a golf club shaft may include an outer surface (e.g., outer surface 103 of club shaft 102) defined in whole or in part by a material including layered structure 2200 or layered structure 2300. In some embodiments, the outer surface of the golf club shaft may be the outermost surface of the golf club shaft that is exposed to the environment surrounding the golf club shaft.

FIG. 24 shows an exploded view of a layered structure 2400 according to some embodiments. Layered structure 2400 may include a woven composite layer 2410 including woven fibers 2412 embedded in a matrix material 2414. Fibers 2412 may be woven in any suitable weave pattern, including but not limited to the patterns discussed above for woven composite layer 2220. In some embodiments, the material of matrix 2414 may be optically transparent. In some embodiments, the material of matrix 2414 may be colorless.

Layered structure 2400 also includes four unidirectional fiber composite plies 2420, 2430, 2440, and 2450. Unidirectional fiber composite plies 2420, 2430, 2440, and 2450 may include fibers oriented in desired directions. For example, as shown in FIG. 24, first unidirectional fiber composite ply 2450 may include fibers 2452 embedded within a matrix material 2454 and oriented at a 0 degree angle, second unidirectional fiber composite ply 2440 may include fibers 2442 embedded within a matrix material 2444 and oriented at a 90 degree angle, third unidirectional fiber composite ply 2430 may include fibers 2432 embedded within a matrix material 2434 and oriented at a +45 degree angle, and fourth unidirectional fiber composite ply 2420 may include fibers 2422 embedded within a matrix material 2424 and oriented at a −45 degree angle.

The order of plies 2420, 2430, 2440, and 2450, the orientation of fibers within the plies, and the material of matrices 2424, 2434, 2444, and 2454 may be tailored to provide desired structural characteristics (e.g., elastic modulus, Poisson's ratio, and shear modulus values) for layered structure 2400. In some embodiments, the material of matrices 2424, 2434, 2444, and 2454 may be optically transparent. In some embodiments, the material of matrices 2424, 2434, 2444, and 2454 may be colorless.

In some embodiments, layered structure 2400 may include a scrim layer 2460. In some embodiments, scrim layer 2460 may be a structured form of glass fiber reinforcement in which fiber strands are continuous and laid down in two directions at 90 degrees relative to each other. The glass fibers of scrim layer 2460 may be embedded within a matrix material. Scrim layer 2460 may provide structural reinforcement for layered structure 2400 or protection during blasting to improve roughness for bond strength.

Figure 25:
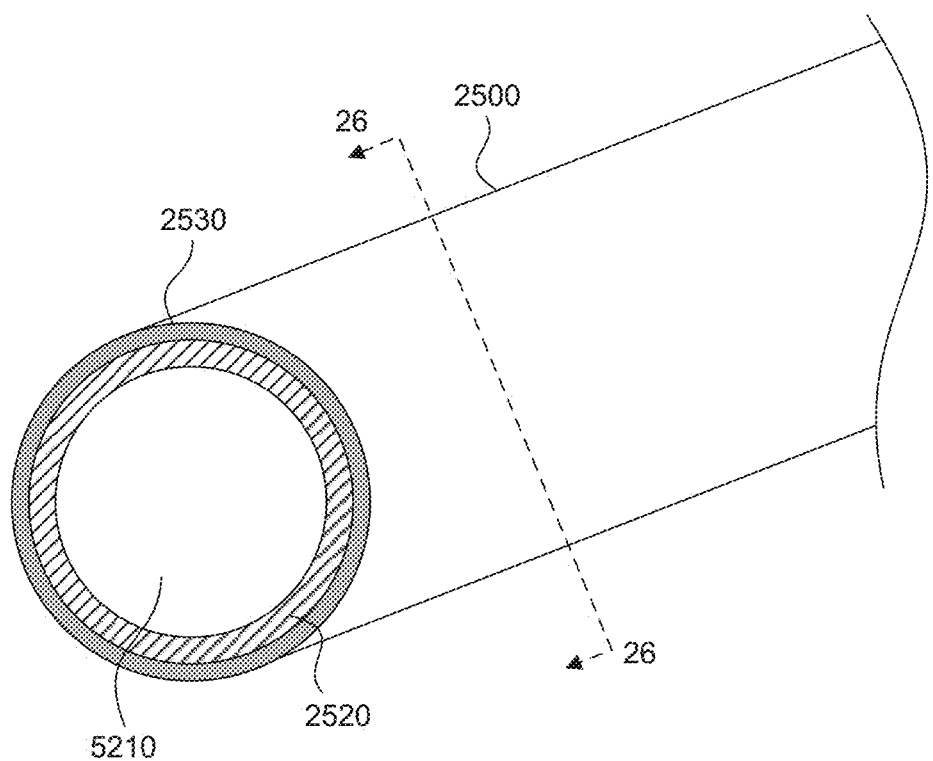
FIG. 25 is a coated fiber according to some embodiments.
Figure 26:
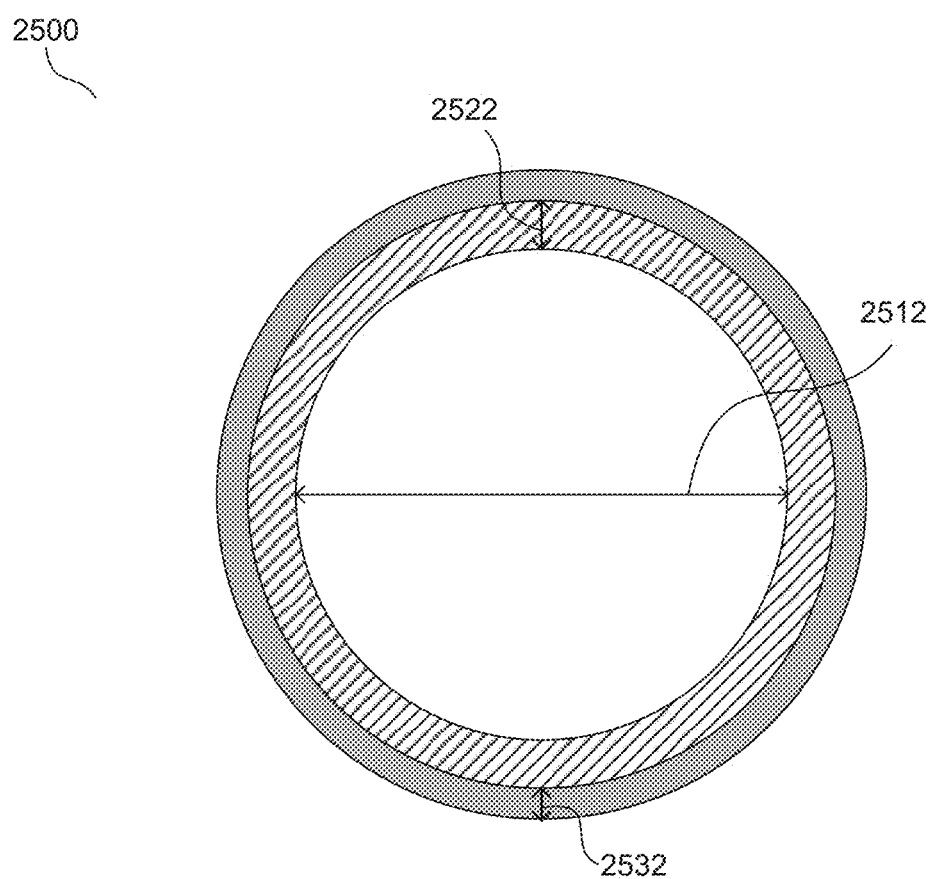
FIG. 26 is a cross-sectional view of the coated fiber in FIG. 25 taken along the line 26-26 in FIG. 25.

FIGS. 25 and 26 show a coated fiber 2500 according to some embodiments. Coated fiber 2500 may be color/metallic coated fiber including a fiber core 2510 and a coating layer 2520 coated on fiber core 2510. Coating layer 2520 may be coated around fiber core 2510, e.g., around the entire outer surface of fiber core 2510. In some embodiments, fiber core 2510 may be a non-metallic fiber core, such as a Kevlar® (aramid fiber) core. In some embodiments, fiber core 2510 may be a carbon fiber. In some embodiments, fiber core 2510 may be a fiberglass fiber. In some embodiments, fiber core 2510 may be a polymer based fiber (e.g., an aramid fiber, such as Kevlar® fiber or a polyester fiber, such as Mylar® fiber). In some embodiments, fiber core 2510 may be a metallic core made of a metallic material, such as but not limited to, steel, nickel, aluminum, titanium, tungsten, copper, chromium zinc, gold, silver, cobalt, magnesium, platinum, palladium, iron, tin, tungsten, or an alloy of one or more of these materials. Fiber core 2510 may have a diameter 2512 in the range of 5 microns to 15 microns. In some embodiments, diameter 2512 may be in the range of 5 microns to 10 microns.

In some embodiments, coating layer 2520 may be a metallic coating layer. Suitable metallic materials for coating layer 2520 include, but are not limited to, nickel (Ni), copper (Cu), chromium (Cr), zinc (Zn), gold (Au), silver (Ag), aluminum (Al), cobalt (Co), magnesium (Mg), platinum (Pt), palladium (Pd), iron (Fe), titanium (Ti), tin (Sn), tungsten (W), and an alloy including on or more of these materials. In some embodiments, coating layer 2520 may be a polymeric coating layer. In some embodiments, coating layer 2520 may be a color coating layer. In such embodiments, the color coating layer 2520 may be a different color than the color of fiber core 2510.

In some embodiments, coating layer 2520 may have a thickness 2522 equal to 1% to 5% of the diameter of the fiber core on which it is coated. In some embodiments, thickness 2522 of coating layer 2520 may be equal to 1% to 3% of the diameter of the fiber core on which it is coated. In some embodiments, thickness 2522 of coating layer 2520 may be equal to 0.2% to 3% of the diameter of the fiber core on which it is coated. In some embodiments, thickness 2522 of coating layer 2520 may be equal to 0.2% to 1% of the diameter of the fiber core on which it is coated. In some embodiments, thickness 2522 may be in the range of 0.0.02 microns (micrometers) to 1.0 micron, including subranges. For example, thickness 2522 may be 0.02 microns, 0.03 microns, 0.04 microns, 0.05 microns, 0.06 microns, 0.07 microns, 0.08 microns, 0.09 microns, 0.10 microns, 0.20 microns, 0.30 microns, 0.40 microns, 0.50 microns, 0.60 microns, 0.70 microns, 0.80 microns, 0.90 microns, or 1.0 micron, or a range including any two of these values as endpoints. These thickness may also apply to a coating layer coated around a fiber tow or a coating layer applied to the surface of a woven fiber sheet. For example, thickness 2722 of color/metallic coating 2720 shown in FIG. 27B may have a value equal to, or within the range of, any of the values or ranges discussed above for thickness 2522.

Figure 27A:
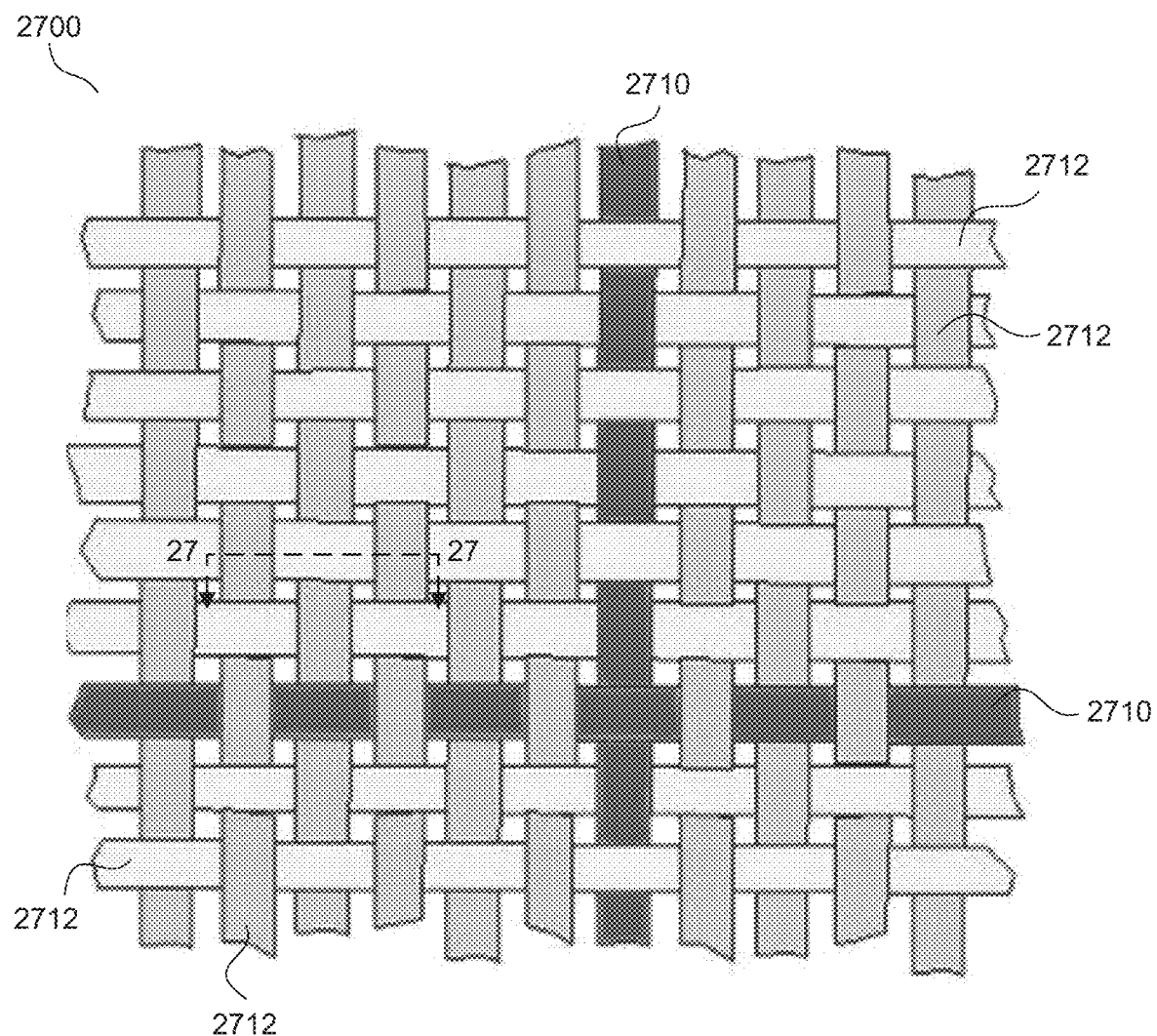
FIG. 27A is a 1×1 plain weave pattern according to some embodiments.
Figure 27B:
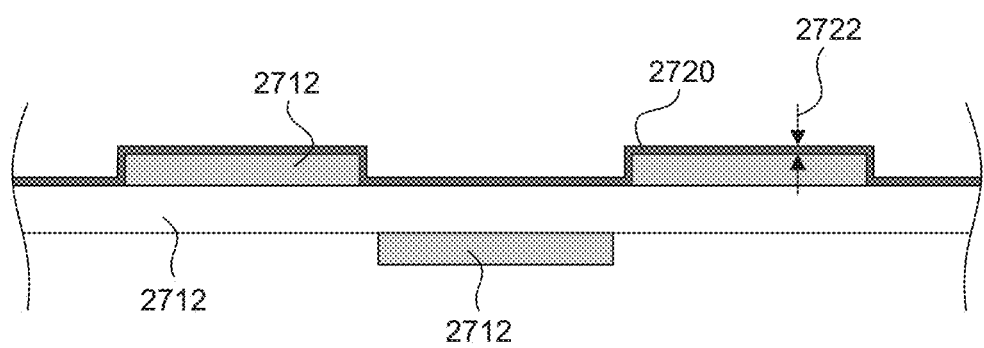
FIG. 27B is a cross-sectional view of FIG. 27A taken along the line 27-27 in FIG. 27A.

While FIG. 27B shows coating 2720 coated on a top surface of plain weave pattern 2700, coating 2720 may be alternatively or additionally be coated on a bottom surface of plain weave pattern 2700. Also, while plain weave pattern 2700 of FIG. 27A is used to illustrate a coating disposed on a surface of a woven pattern, coatings may be disposed on a surface of any weave pattern, for example the weave patterns discussed herein, in a similar fashion.

In some embodiments, coated fiber 2500 may include a sizing layer 2530 coated on coating layer 2520. Sizing layer 2530 may be configured to facilitate adhesion between coated fiber 2500 and a matrix material in which coated fiber 2500 is embedded. Sizing layer 2530 may also aid in concealing any visual defects (e.g., holes) in coating layer 2520. Sizing layer 2530 may include one or several polymeric components, a coupling agent, a lubricant, and a range of additives (surfactants, plasticizers, anti-static agents, adhesion promoters, anti-foams, rheology modifiers). This mixture is typically applied to a fiber in a rather dilute, aqueous form with a solids content between 5% and 15%. Suitable polymeric materials for sizing layer 2530 include, but are not limited to, an epoxy, a polyurethane, a polyamide, poly(hydroxyether)/Phenoxy™ manufactured by Gabriel Performance Products, and K-90 poly(vinylpyrrolidone).

In some embodiments, sizing layer 2530 may have a thickness 2532 equal to 1% to 1.5% of the diameter of the fiber core on which it is coated. In some embodiments, thickness 2532 of sizing layer may be in the range of 0.10 microns to 0.50 microns. Assuming a homogenous coating round a fiber surface, the thickness of a sizing layer may be calculated using the following equation:

$$t_s = R_f \left( \sqrt{1 + \frac{\rho_f}{\rho_s}\left(\frac{1}{\frac{1}{w_s} - 1}\right)} - 1 \right)$$

where $t_s$ is the sizing thickness, $R_f$ is the fiber radius, $\rho_f$ is the fiber density, $\rho_s$ is the sizing density, and $w_s$ is the weight fraction sizing present on the fiber surface.

When weaving fibers, such as coated fibers 2500, the fibers may be arranged in tows including a plurality of fibers (e.g., 1K or 3K tows) and the tows may be woven into weave patterns discussed herein. The tows of fibers may be woven into patterns to create desired visual features of a golf club, including but not limited to, alignment features, logos, brand names, product names, and aesthetic patterns. In some embodiments, tows composed of color coated fibers having different colors may be utilized to create desired visual features. In some embodiments, tows of non-coated fibers and tows of color coated fibers may be utilized to created desired visual features.

In some embodiments, as discussed above, metallic fibers of a woven composite layer (e.g., woven composite layers 2220 and 2320) may influence the acoustic properties of a woven composite layer, and thus the acoustic properties of a golf club component, such as a golf club head. In such embodiments, the metallic fibers may be metallic fiber tows. The metallic fiber tows may be tows composed entirely of metallic fibers or tows composed partially of metallic fibers. In some embodiments, the metallic fibers may include a non-metallic core that is coated with a metallic material. In such embodiments, the thickness of the metallic coating on the core fibers may influence the acoustic characteristics for a woven composite layer. In general, the larger the thickness of a metallic coating, the more similar a woven composite layer's damping ratio will be to a metallic material. Accordingly, coating non-metallic fibers with a sufficiently thick metallic coating layer (which may be colored) may influence the acoustic properties of a woven composite layer. In some embodiments, the metallic fibers may be individual metallic fibers. In some embodiments, the metallic fibers may be metallic tapes. In some embodiments, the metallic fibers may be metallic tapes wound around a core fiber (filament). As used herein, a "metallic tape" means a metallic material having a length that is substantially larger than its width and a cross-sectional area, taken perpendicular to its length, having a width at least 1.5 times its larger than its height. In some embodiments, a metallic tape may be a tape coated with a metallic coating (which may be colored).

In some embodiments, controlling the thickness of the metallic coating may be selected to achieve a damping ratio in the range of 2 to 10, 2 to 20, 2 to 50, 2 to 100, 2 to 200, 3 to 10, 3 to 20, 3 to 50, 3 to 100, 3 to 200, 10 to 20, 10 to 50, 10 to 100, or 10 to 200 normalized to a carbon steel, a stainless steel (e.g. 17-4 PH stainless steel), an alloy steel, a nickel-based ferroalloy, a cast iron, an aluminum alloy, a magnesium alloy, a copper alloy, a titanium alloy, and a tungsten alloy.

In some embodiments, the thickness of a metallic coating layer utilized to influence the acoustic properties of a woven composite layer may be in the range of 1.0 micron to 10 microns, including subranges. For example, the thickness of such a metallic coating layer may be 1.0 micron, 2.0 microns, 3.0 microns, 4.0 microns, 5.0 microns, 6.0 microns, 7.0 microns, 8.0 microns, 9.0 microns or 10 microns, or a range including any two of these values as endpoints.

In some embodiments, tows composed in whole or in part of metallic fibers may be utilized to influence the acoustic properties of a woven composite layer. In some embodiments, these tows may be interwoven with tows of base fibers of the woven composite layer. In some embodiments, the tows of base fibers may be tows of non-metallic fibers. In some embodiments, the tows of base fibers may be tows of fibers including a non-metallic core coated with a metallic coating layer (which may or may not be colored). As a non-limiting example, a woven composite layer may include color coated carbon fibers and metallic fibers interwoven with the color coated carbon fibers.

FIG. 27A illustrates plain weave pattern 2700 including metallic fiber tows 2710 interwoven with base fiber tows 2712 according to some embodiments. The metallic fiber tows 2710 are tows composed in whole or in part of metallic fibers. For example, metallic fiber tows 2710 may be 1K or 3K fiber tows composed in whole or in part of metallic fibers. Base fiber tows 2712 are tows composed base fibers. For example, base fiber tows 2712 may be 1K or 3K fiber tows of composed of base fibers. In some embodiments, metallic fiber tows 2710 interwoven with base fiber tows 2712 may be fiber tows composed of fibers made entirely of one or more metallic material. In some embodiments, the metallic fibers of metallic fiber tows 2710 may be un-coated metallic fibers. In some embodiments, metallic fibers of metallic fiber tows 2710 may include non-metallic fiber cores coated within a metallic material. In some embodiments, the metallic fibers of metallic fiber tows 2710 may include metallic fiber cores coated with a metallic material. In some embodiments, the metallic fibers of metallic fibers tows 2710 may include metallic fiber cores coated with a non-metallic coating, such as a polymeric coating.

In embodiments including interwoven metallic fiber tows 2710, metallic fiber tows 2710 may be present at a weight percent in the range of 5 wt % to 95 wt % of the total weight of fibers in a woven fiber composite layer, including subranges. For example, metallic fiber tows 2710 may be present at a weight percent of 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or 95 wt %, or in a range having any two of these values as endpoints. The wt % of metallic fiber tows 2710 may be selected to achieve a desired damping ratio and acoustic properties for a woven composite layer. In some embodiments, the weight percent of metallic fiber tow may be utilized to enhance the acoustic frequency of a golf club head upon impact to have a natural frequency of greater than 2500 Hz, greater than 3000 Hz, or greater than 3300 Hz. In general, the larger the weight percent of metallic fiber tows, the more similar a woven composite layer's damping ratio will be to a metallic material.

In some embodiments, the diameter of metallic fibers of metallic fiber tows 2710 may be in the range of 5 microns to 15 microns. In some embodiments, diameter of metallic fibers of metallic fiber tows 2710 may be in the range of 5 microns to 10 microns. The diameter of metallic fibers of metallic fiber tows 2710 may be selected to achieve a desired damping ration and acoustic properties for a woven composite layer. In some embodiments, the diameter and/or material(s) of the metallic fiber may be utilized to enhance the acoustic frequency of a golf club head upon impact to have a natural frequency of greater than 2500 Hz, greater than 3000 Hz, or greater than 3300 Hz.

While plain weave pattern 2700 of FIG. 27A is used to illustrate the incorporation of metallic fiber tows into a woven pattern, metallic fiber tows may be incorporated into any weave pattern, for example the weave patterns discussed herein, in a similar fashion as discussed in regard to weave pattern 2700.

In some embodiments, a woven composite layer (e.g., layer 2220 or 2320) may be a partially colored woven composite layer. In such embodiments, one or more portions of the woven composite layer may be defined by a colored weave pattern and one or more portions of the woven composite layer may be defined by a non-colored weave pattern. For purposes of this description, a colored weave pattern is a weave pattern including at least one set of colored woven fibers/fiber tows. A colored weave pattern need not include 100% colored fibers/fiber tows. For example, a colored weave pattern may include a colored set of fibers/fibers tows interwoven with a non-colored set of fibers/fibers tows. For example, the vertically oriented fiber tows 2710 in FIG. 27A may be non-colored and the horizontally oriented fiber tows 2710 in FIG. 27A may be colored, or vice versa.

FIGS. 53 and 54A-54D show a golf club head 5300 with a crown insert 5310 having a woven composite layer 5311 with a colored portion 5320 defining a portion of a top surface 5312 of woven composite layer 5311 and a non-colored portion 5330 defining a portion of top surface 5312 of woven composite layer 5311. For purposes of illustration, the cross-sectional views of FIGS. 54A-54D, show only woven composite layer 5311 of crown insert 5310. However, crown insert 5310 may include other layers as described herein. Further, while FIGS. 53 and 54A-54D show a crown insert with colored and non-colored portions, other golf club components discussed herein (e.g., sole inserts and face inserts) may include colored and non-colored portions as described in reference to FIGS. 53 and 54A-54D.

Colored portion 5320 is illustrated as a rectangular strip in FIG. 53. However, colored portion 5320 may have any desirable shape and size. Further, while FIG. 53 shows a single colored portion 5320, woven composite layer 5311 may include any suitable number of colored portions 5320. In some embodiments, colored portion(s) 5320 may define 5% or more, 10% or more, 20% or more, 30% or more, 40% or more, 50% or more, 60% or more, 70% or more, 80% or more, 85% or more, 90% or more, or 95% or more of top surface 5312 of woven composite layer 5311. In some embodiments, colored portion(s) 5320 may define 50% or less of top surface 5312 of woven composite layer 5311, for example 50%, 40%, 30%, 20%, 10%, 5%, or 1% of top surface 5312 of woven composite layer 5311, or within a range having any two of these values as end points. In some embodiments, colored portion(s) 5320 may define at least a portion of a peripheral edge of crown insert 5310 at top surface 5312. In some embodiments, the weave pattern of colored portion 5320 and the weave pattern of non-colored portion 5330 may be the same. In some embodiments, the weave pattern of colored portion 5320 and the weave pattern of non-colored portion 5330 may be different (e.g., in one or more of weave type, weave density, weave material, etc.).

In some embodiments, colored portion 5320 may be directly interwoven with non-colored portion 5330. In such embodiments, woven composite layer 5311 is woven such that colored fiber/fiber tows are used to weave colored portion 5320 and non-colored fibers/fiber tows are used to weave non-colored portion 5330. In such embodiments, color portion 5320 and non-colored portion 5330 define a single woven composite layer with no defined edges between portions 5320 and 5330. FIG. 54A is a cross-section view of woven composite layer 5311 with colored portion 5320 directly interwoven with non-colored portion 5330. In some embodiments, top surface 5312 and 5314 may be smooth and seamless surfaces defined by colored portion 5320 and non-colored portion 5330 in FIG. 54A.

In some embodiments colored portion 5320 may be a separate woven layer bonded to one or more non-colored woven layers defining non-colored portion 5330. In such embodiments, woven composite layer 5311 may manufactured by laying up prepreg colored woven layer(s) and prepreg non-colored woven layer(s), and bonding the prepreg layers together.

In some embodiments, a prepreg colored layer be laid up adjacent to one or more non-colored woven layers. FIG. 54B shows a cross-sectional view of a woven composite layer 5311 including a colored woven layer defining colored portion 5320 disposed adjacent to non-colored woven layers defining non-colored portion 5330. In such embodiments, edges 5322 of colored portion 5320 may be bonded to edges 5332 of non-colored portion 5330. In some embodiments, top surface 5312 and 5314 may be smooth surfaces defined by colored portion 5320 and non-colored portion 5330 in FIG. 54B.

FIG. 54C shows a cross-sectional view of a woven composite layer 5311 including a colored woven layer defining colored portion 5320 disposed on top of a non-colored woven layer defining non-colored portion 5330. In some embodiments, as shown in FIG. 54C, edges 5322 of colored portion 5320 may be pressed within non-colored portion 5330 during bonding of color portion 5320 and non-colored portion 5330 (e.g., during a molding/forming process). In such embodiments, top surface 5312 may be a smooth surface defined by colored portion 5320 and non-colored portion 5330. And bottom surface 5314 may have a protrusion at a location corresponding to the colored portion 5320. In some embodiments, colored portion 5320 may sit on top of non-colored portion 5330 such that it defines a protrusion on top surface 5312, and bottom surface 5314 may be smooth (i.e., the opposite of FIG. 54C). In embodiments of FIG. 54C, a mold cavity used to mold crown insert 5310 may include a recess corresponding to the protrusion on bottom surface 5314 or top surface 5312 in order to create the opposing smooth surface.

FIG. 54D shows a cross-sectional view of a woven composite layer 5311 including a colored woven layer defining colored portion 5320 disposed on top of and overlapping non-colored woven layers defining non-colored portion 5330. In some embodiments, as shown in FIG. 54D, edges 5322 of a colored portion 5320 may be pressed within non-colored portion 5330 during bonding of color portion 5320 and non-colored portion 5330 (e.g., during a molding/forming process). In such embodiments, top surface 5312 may be a smooth surface defined by colored portion 5320 and non-colored portion 5330. And bottom surface 5314 may include protrusions defined by edges 5332 of non-woven portions 5330. In embodiments of FIG. 54D, a mold cavity used to mold crown insert 5310 may include a surface corresponding to the shape of bottom surface 5314 of FIG. 54D in order to create smooth top surface 5312. In such embodiments, top surface 5312 may take on the shape of the mold cavity in contact with top surface 5312. And by relieving the bottom surface of the mold, undesirable squeezing out of resin may be prevented, thereby preventing a molded insert from becoming dry at locations of overlap between colored and non-colored portions. In other words, such a mold cavity may help maintain equal pressure across the insert during molding, thereby facilitating a consistent/desired ratio of resin and fiber across the molded insert.

In some embodiments, golf club heads described herein may include one or more adjustable loft, lie, or face angle systems that are capable of adjusting the loft, lie, or face angle either in combination with one another or independently from one another. For example, a portion of hosel insert 22 and a golf club shaft (e.g., club shaft 102) collectively define hosel axis 91 (see e.g., FIG. 2) of an assembled golf club. A portion of hosel insert 22 may be effective to support a club shaft along the longitudinal axis of the assembly, which is offset from hosel axis 91 by an offset angle. Hosel insert 22 can provide a single offset angle that can be between 0 degrees and 4 degrees, in 0.25 degree increments. For example, offset angle can be 1.0 degree, 1.25 degrees, 1.5 degrees, 1.75 degrees, 2.0 degrees, 2.25 degrees, 2.5 degrees, 2.75 degrees, or 3.0 degrees. In some embodiments, hosel insert 22 may be removably coupled to hosel portion 20 and/or club shaft 102. In some embodiments, hosel insert 22 may be capable of being positioned to adjust the loft, lie, or face angle of the golf club head 10. In some embodiments, hosel insert 22 may be configured to allow for the adjustment of at least one of a loft, lie, or face angle described in U.S. Pat. No. 8,303,431, patented on Nov. 6, 2012, herein incorporated by reference in its entirety by reference thereto.

In some embodiments, golf club head 10 may include a rear weight track 30 (or rearward weight track 30 or front-to-rear weight track 30) located in the sole portion 17 of the body 11 of the golf club head 10. The rear weight track 30 defines a track to which a weight 32 (or weight assembly 32) is slidably mounted. In some implementations, the weight 32 is slidably mounted to the rear weight track 30 with fastening means, such as a screw 34. In some implementations, the weight 32 has a multi-piece design. For example, the weight 32 may have first and second weight elements 32a, 32b coupled together to form the weight 32. In some implementations, the weight 32 may be secured to the rear weight track 30 by clamping a portion of the track, such as at least one ledge, such that the fastening means is put in tension i.e. a tension system. Additionally or alternatively, the weight 32 may be secured to the rear weight track 30 by compressing against a portion of the track such that the fastening means is put in compression i.e. a compression system. However, the weight 32 can take forms other than as shown, such as a single-piece design, and can be movably mounted to the rear weight track 30 in ways other than as shown. The rear weight track 30 allows the weight 32 to be selectively loosened and tightened for slidable adjustment forward and rearward along the weight track to adjust the effective center of gravity (CG) of golf club 10 head in a forward-to-rearward direction. By adjusting the CG of the golf club head 10 forward or rearward, the performance characteristics of the golf club head 10 are adjusted, which promotes an adjustment to the flight characteristics of a golf ball struck by the golf club head 10, such as the topspin and backspin characteristics of the golf ball.

As discussed in more detail below, a rear weight track 30 provides a user with additional adjustability. Moving the weight closer to the striking face may produce a lower spinning ball due to a lower and more forward CG. This would also allow a user to increase club head loft, which in general higher lofted clubs are considered to be "easier" to hit. Moving the weight rearward towards the rear of the club allows for increased moment of inertia (MOI) and a higher spinning ball. Clubs with higher MOI are generally considered "easier" to hit. Accordingly, the rear weight track 30 allows for at least both spin and MOI adjustment.

As shown, the rear weight track 30 may include at least one weight assembly in any of various positions along the rear weight track 30, such as forward or rearward. More than one weight may be used in any one of the positions and/or there may be several weight ports strategically placed on the club head body. For example, the golf club head 10 may include a toe weight port and a heel weight port. A user could then move more weight to either the toe or heel to promote either a draw or fade bias. Additionally, splitting discretionary weight between a forward and rearward position produces a higher MOI club, whereas moving all the weight to the forward portion of the club produces a golf club with a low and forward CG. Accordingly, a user could select between a "forgiving" higher MOI club, or a club that produces a lower spinning ball.

Figure 3:
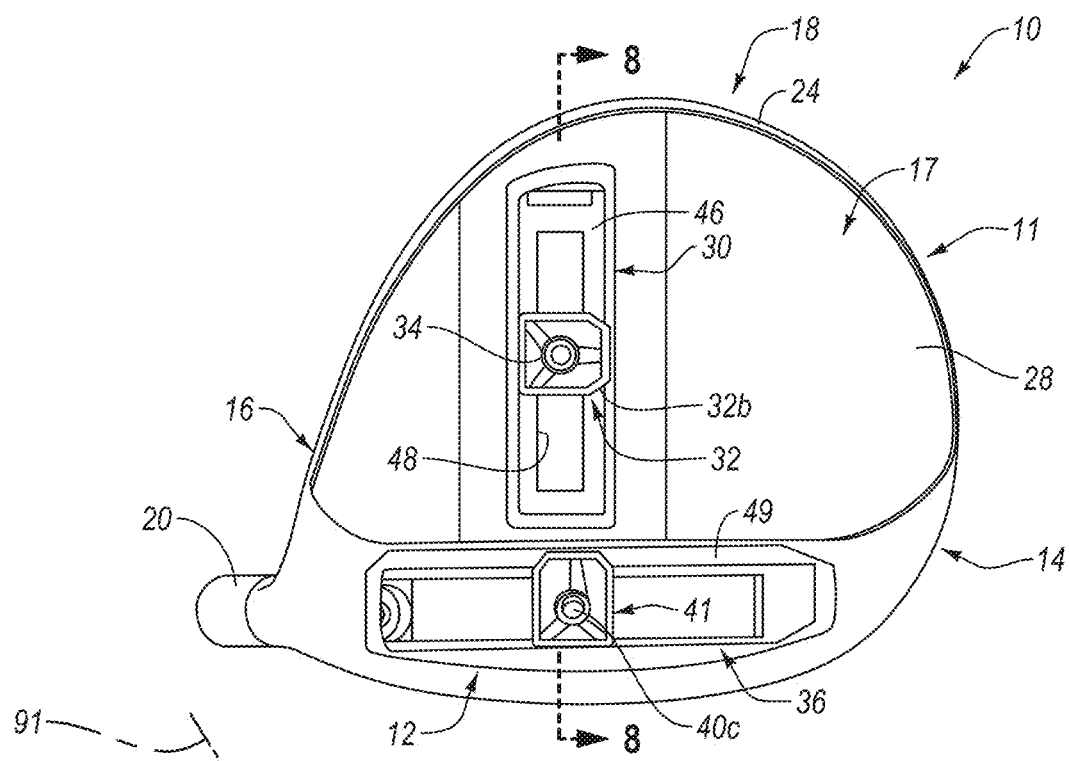
FIG. 3 is bottom view of the golf club head of FIG. 1 according to some embodiments.

Referring to for example FIG. 3, the frame 24 of the body 11 may include a forward or lateral weight track 36 (or forward or lateral channel 36) integrally formed with the frame 24 at the forward region 12 and along the sole portion 17 of the body 11. The lateral weight track 36 extends generally parallel to, but offset from, the face portion 42 of the golf club head 10 and generally perpendicular to the weight track 30. The lateral weight track 36 defines a track or port to which at least one weight may be slidably mounted. In one example, as shown in FIG. 2, the weight includes a first weight 38 (or weight assembly 38) having two pieces 38a, 38b, and a second weight 39 (or weight assembly 39) having two pieces 39a, 39b. Each of the first and second weights 38, 39 are fastened by fastening means, such as respective screws 40a, 40b, to the lateral weight track 36. In some implementations, the first and second weights 38, 39 may be secured to the rear weight track 30 by clamping a portion of the track, such as at least one ledge, such that the fastening means is put in tension i.e. a tension system. Additionally or alternatively, the first and second weights 38, 39 may be secured to the rear weight track 30 by compressing against a portion of the track such that the fastening means is put in compression i.e. a compression system. The first and second weights 38, 39 can take other shapes than as shown, can be mounted in other ways, and can take the form of a single-piece design or multi-piece design (e.g., more than two pieces).

Figure 1:
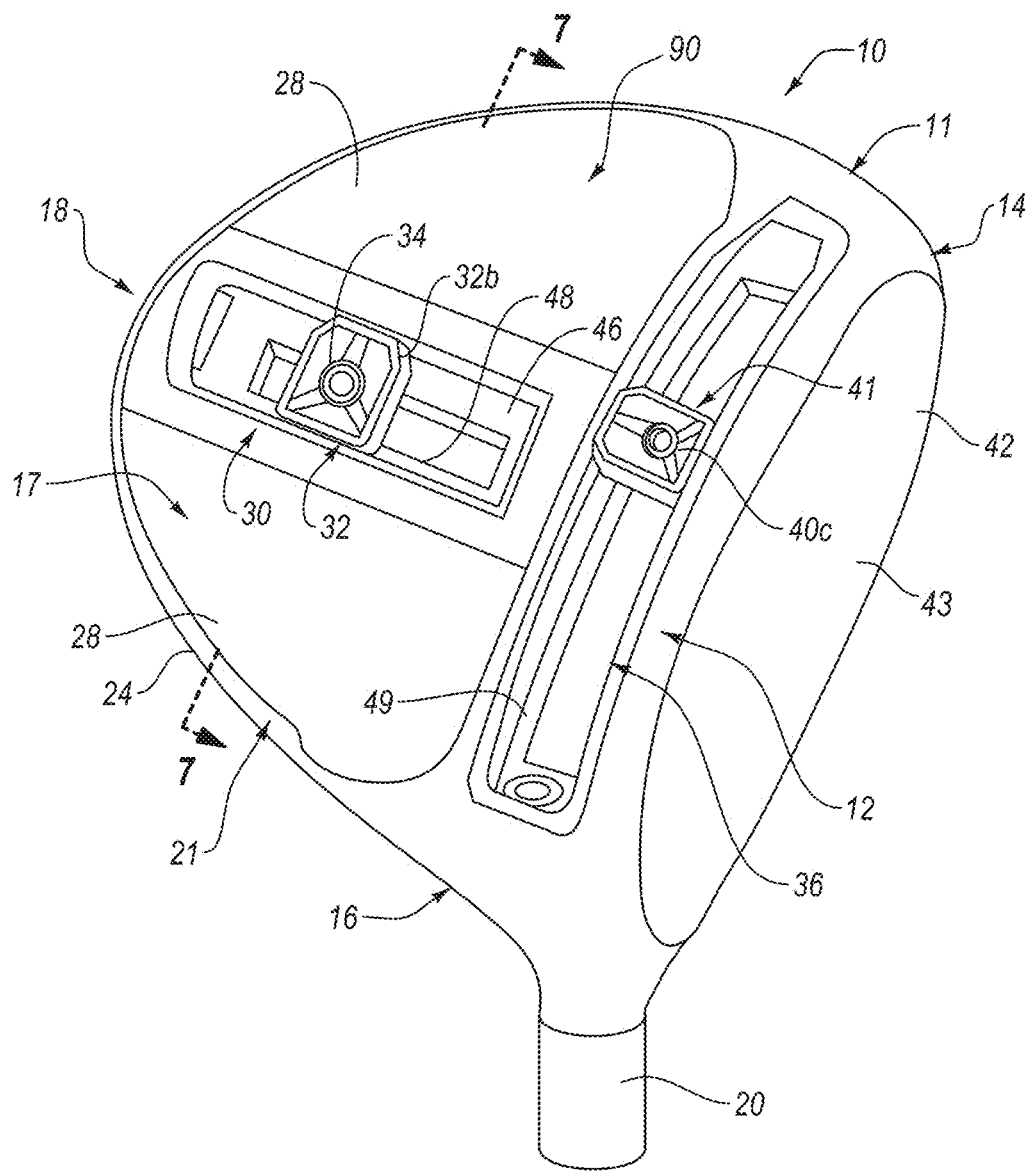
FIG. 1 is a perspective view from a bottom of a golf club head according to some embodiments.

According to another example, as shown for example in FIGS. 1 and 3, only a single weight 41 (or weight assembly 41) may be slidably mounted to the lateral weight track 36. The weight 41 may include only a single weight element, two weight elements (such as two stacked weight elements 41a, 41b fastened together by a screw 40c), or more than two weight elements.

The lateral weight track 36 allows one or more weights to be selectively loosened and tightened for slidable adjustment laterally, in the heel-to-toe direction, to adjust the effective CG of the golf club head 10 in the heel-to-toe direction. By adjusting the CG of the golf club head 10 laterally, the performance characteristics of the golf club head 10 are adjusted, which promotes an adjustment to the flight characteristics of a golf ball struck by the golf club head 10, such as the sidespin characteristics of the golf ball. Notably, the use of two weights (e.g., first and second weights 38, 39), that are independently adjustable relative to each other, allows for adjustment and interplay between the weights. For example, both weights can be positioned fully in the toe region 14, fully in the heel region 16, spaced apart a maximum distance from each other, with one weight fully in the toe region 14, and the other weight fully in the heel region 16, positioned together in the center or intermediate location of the lateral weight track 36, or in other weight location patterns. Additionally or alternatively, the first and second weights 38, 39 may be secured to the rear weight track 30 such that there may be two or more weights located in the rear weight track 30. Additionally or alternatively, each of the first and second weights 38, 39 may be interchangeable with the weight 32.

In some embodiments, the lateral weight track or forward channel 36 is offset from the face portion 42 by a forward channel offset distance, which is the minimum distance between a first vertical plane passing through a center of a striking face 43 of face portion 42 and the forward channel 36 at the same x-axis coordinate as the center of striking face 43, between about 5 mm and about 50 mm, such as between about 5 mm and about 35 mm, such as between about 5 mm and about 30 mm, such as between about 5 mm and about 20 mm, or such as between about 5 mm and about 15 mm. Similarly, the rearward track 30 is offset from the face portion 42 by a rearward track offset distance, which is the minimum distance between a first vertical plane passing through the center of striking face 43 and the rearward track 30 at the same x-axis coordinate as the center of striking face 43, between about 5 mm and about 50 mm, such as between about 5 mm and about 40 mm, such as between about 5 mm and about 30 mm, or such as between about 10 mm and about 30 mm.

In certain embodiments, both the forward channel 36 and rearward track 30 have a certain channel/track width. Channel/track width may be measured as the horizontal distance between a first channel wall and a second channel wall. For both the forward channel 36 and rearward track 30, the widths may be between about 5 mm and about 20 mm, such as between about 10 mm and about 18 mm, or such as between about 12 mm and about 16 mm. According to some embodiments, the depth of the channel or track (i.e., the vertical distance between the bottom channel wall and an imaginary plane containing the regions of the sole adjacent the front and rear edges of the channel) may be between about 6 mm and about 20 mm, such as between about 8 mm and about 18 mm, or such as between about 10 mm and about 16 mm.

Additionally, both the forward channel 36 and rearward track 30 have a certain channel/track length. Channel/track length may be measured as the horizontal distance between a third channel wall and a fourth channel wall. For both the forward channel 36 and rearward track 30, their lengths may be between about 30 mm and about 120 mm, such as between about 50 mm and about 100 mm, or such as between about 60 mm and about 90 mm. Additionally, or alternatively, the length of the forward channel 36 may be represented as a percentage of the striking face length. For example, the forward channel 36 may be between about 30% and about 100% of the striking face length, such as between about 50% and about 90%, or such as between about 60% and about 80% mm of the striking face length.

In some instances, the forward channel 36 may hold a sliding weight, or it may be a feature to improve and/or increase the coefficient of restitution (COR) across the face. In regards to a COR feature, the channel may take on various forms such as a channel or through slot, as will be described in more detail below.

Each of the golf club heads disclosed herein may have a volume equal to the volumetric displacement of the club head body. In other words, for a golf club head with one or more weight ports within the head, it is assumed that the weight ports are either not present or are "covered" by regular, imaginary surfaces, such that the club head volume is not affected by the presence or absence of ports. A golf club head of the present application can be configured to have a head volume between about 110 cm$^3$ and about 600 cm$^3$. In more particular embodiments, the head volume may be between about 250 cm$^3$ and about 500 cm$^3$. In yet more specific embodiments, the head volume may be between about 300 cm$^3$ and about 500 cm$^3$, between about 300 cm$^3$ and about 360 cm$^3$, between about 300 cm$^3$ and about 420 cm$^3$ or between about 420 cm$^3$ and about 500 cm$^3$.

In the case of a driver, the golf club head may have a volume between about 300 cm$^3$ and about 460 cm$^3$, and a total mass between about 145 g and about 245 g. In the case of a fairway wood, the golf club head may have a volume between about 100 cm$^3$ and about 250 cm$^3$, and a total mass between about 145 g and about 260 g. In the case of a utility or hybrid club the golf club head 10 may have a volume between about 60 cm$^3$ and about 150 cm$^3$, and a total mass between about 145 g and about 280 g.

According to one embodiment, the weight track 30, which can have a more complex shape with more three-dimensional features than the sole insert 28, may be made from the same, similar, or at least compatible material as the sole insert 28 to allow the rear weight track 30 to be injection molded, overmolded, or insert molded over the sole insert 28 to bond together the rear weight track 30 and sole insert 28. In one example, the crown insert 26, sole insert 28, and rear weight track 30 are made from compatible materials capable of bonding well to one another such as polymeric materials having a common matrix or base, or at least complementary matrices. For example, the crown insert 26 and/or sole insert 28 may be made from continuous fiber composite material well suited for thermoforming while the rear weight track 30 may be made of short fiber composite material well suited for injection molding (including insert molding and overmolding), with each having a common matrix. One example of a material suitable for injection molding is a thermoplastic carbon fiber composite material having short, chopped fibers in a polyphenylene sulfide (PPS) base or matrix. For example, the material of the rear weight track 30 may include 30% short carbon fibers (by volume) having a length of about ⅒ inch, which reinforces the PPS matrix. Another example of a commercial material that may be used for the rear weight track 30 is RTP 1385 UP, made by RTP Company. Other examples include nylon, RTP 285, RTP 4087 UP and RTP 1382 UP.

In one example, the sole insert 28 and rear weight track 30 are bonded together by placing the sole insert 28 in a mold and injection molding the track 30 over the sole insert 28. The injection molding process creates a strong fusion-like bond between the sole insert 28 and rear weight track 30 due to their material compatibility.

In an alternative example, in which the sole insert 28 may be formed using a thermosetting material, the sole insert 28 and rear weight track 30 are not compatible materials and will not bond well if left untreated. Accordingly, before the injection molding, insert molding, or overmolding step, the sole insert 28 preferably may be coated with a heat activated adhesive, such as, for example, ACA 30-114, manufactured by Akron Coating & Adhesive, Inc. ACA 30-114 is a heat-activated water-borne adhesive having a saturated polyurethane with an epoxy resin derivative and adhesion promoter designed from non-polar adherents. It will be appreciated that other types of heat-activated adhesives also may be used. After the coating step, the sole insert 28 may be then placed in a mold and the material of the rear weight track 30 may be overmolded (or injection molded) over the sole insert 28 as described above. During the injection molding step, heat activates the adhesive coating on the sole insert 28 to promote bonding between the sole insert 28 and the weight track 30.

After the sole insert 28 and rear weight track 30 are bonded together, and the crown insert 26 is formed, they are joined to the frame 24 in a manner that creates a strong integrated construction adapted to withstand normal stress, loading, and wear and tear expected of commercial golf clubs. For example, each of the sole insert 28 and crown insert 26 may be bonded to the frame 24 using epoxy adhesive, with the crown insert 26 seated in and overlying the crown opening 62 and the sole insert 28 seated in and overlying the sole opening 60. Alternative attachment methods include bolts, rivets, snap fit, adhesives, and other known joining methods or any combination thereof may be used to couple the crown insert 26 and the sole insert 28 with the frame 24.

Figure 4:
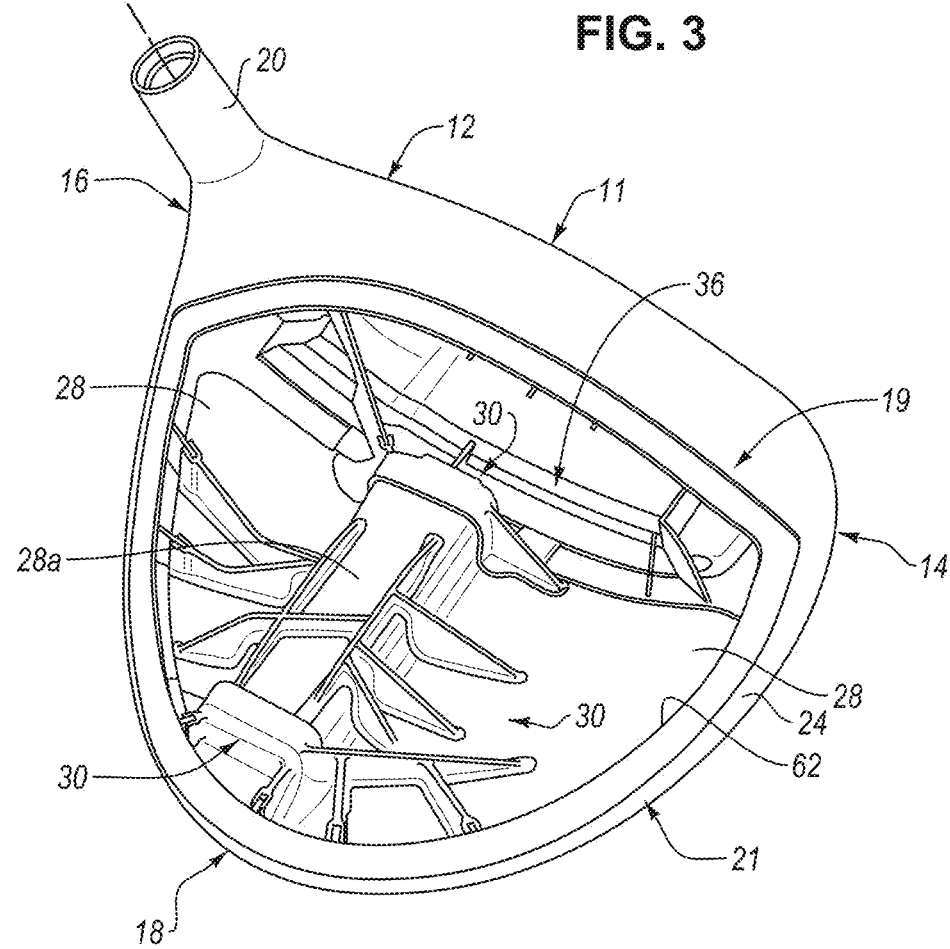
FIG. 4 is a perspective view from a top of the golf club head of FIG. 1, shown with a crown insert removed, according to some embodiments.

FIG. 4 shows the head with the crown insert 26 removed, and provides a view of the hollow interior of the head from the top. Additionally, FIG. 4 illustrates how the rear weight track 30 includes internal ribs, supports and other features overmolded on the sole insert 28. For example, the rear weight track 30 may include various supports wrapping over a central ridge 28a of the sole insert, fore-aft supporting ribs along the top of the ridge 28a, and lateral ribs extending outwardly from the central ridge 28a. It can be seen that the overmolding process allows the weight track and other intricate features and details to be incorporated into the design of the golf club head 10. For example, in addition to the performance benefits provided by the weight track 30, the various ribs and features shown in FIG. 4 can provide structural support and additional rigidity for the golf club head 10 and also modify and even fine tune the acoustic properties of the golf club head 10. The sound and modal frequencies emitted by the golf club head 10 when it strikes the ball are very important to the sensory experience of the golfer and provides functional feedback as to where the ball impact occurs on the striking face 43 (and whether the ball is well struck).

Figure 5:
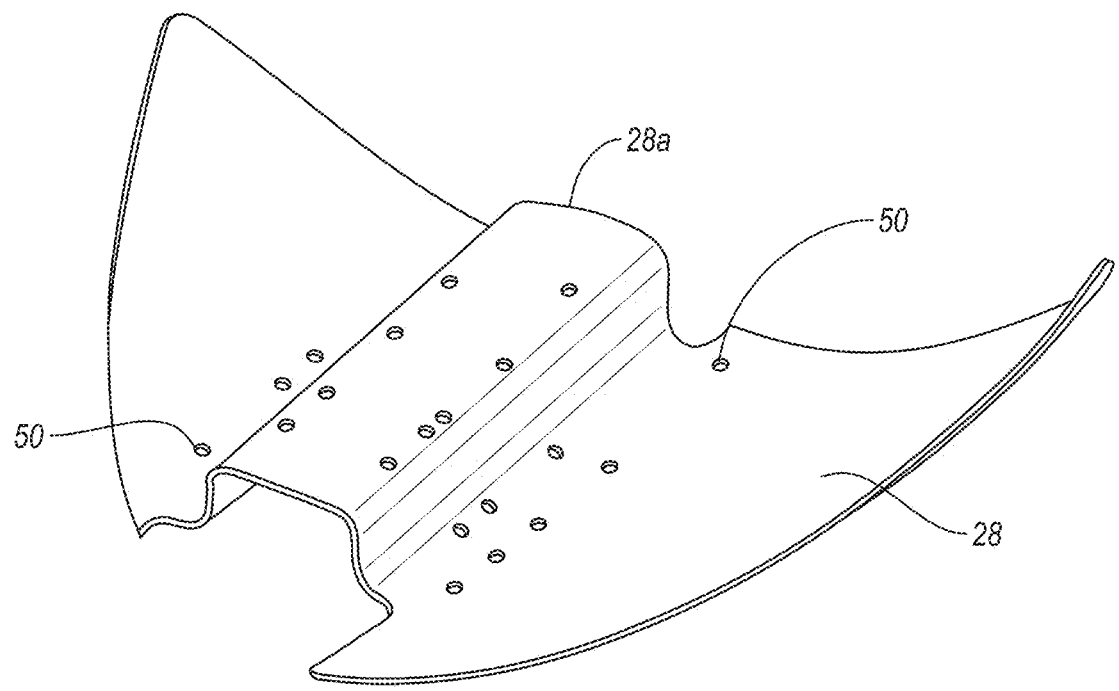
FIG. 5 is a perspective view of a sole insert of the golf club head of FIG. 1 according to some embodiments.

FIG. 5 shows the sole insert 28, including its central rib or ridge 28a, before the rear weight track 30 has been overmolded thereto. The ridge 28a may be centrally located on the sole insert and extends generally from front to back to provide additional structural support for the sole of the golf club head. The ridge 28a also provides an elongate weight recess or port on its outer surface within which to seat the fore-aft weight track 30. The sole insert may include a plurality of through holes 50 in various locations to provide a flow path for injection mold melt during the injection molding step and create a mechanical interlock between the sole insert 28 and overmolded weight track 30, thereby forming the sole insert unit.

Figure 6:
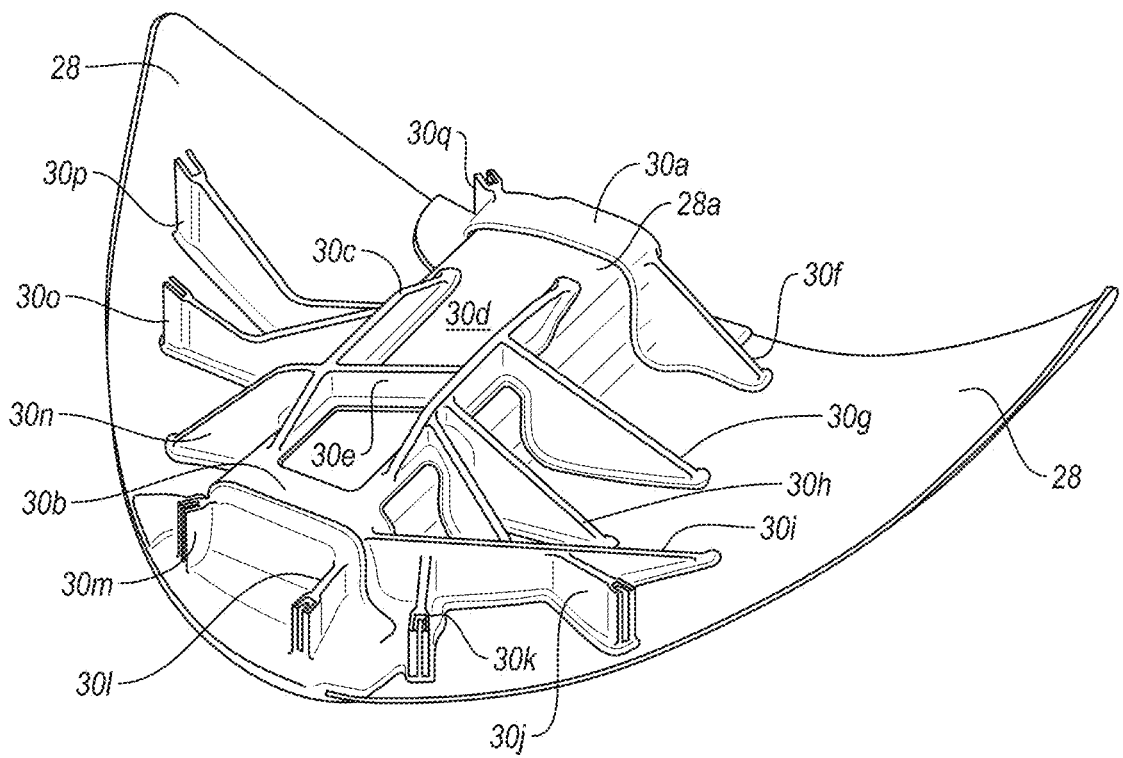
FIG. 6 is a perspective view of a sole insert and a weight track of the golf club head of FIG. 1 according to some embodiments.

FIG. 6 shows in greater detail the sole insert 28 with the overmolded rear weight track 30 joined thereto. It can be seen (especially in the context of the other figures) that the rear weight track 30 wraps around both sides (interior and exterior) of the sole insert 28. In addition to a weight installation channel 48 and peripheral ledge (or rail) 46 overmolded on the outer surface of the sole insert 28, the rear weight track 30 also preferably includes one or more ribs and other features on the interior surface of the sole insert. For example, FIG. 6 shows reinforcing supports 30a, 30b draped over opposite ends of the ridge 28a, parallel fore-aft extending ribs 30c, 30d tracking along the top of the ridge 28a, cross-rib 30e connecting the ribs 30c, 30d, and various lateral and other ribs 30f, 30g, 30h, 30i, 30j, 30k, 30l, 30m, 30n, 30o, 30p, and 30q, which are all interconnected to form a reinforcing network or matrix of supporting ribs and supports to reinforce the sole insert 28 and the golf club head 10. In some embodiments, movement of the at least one weight member within the rear weight track 30 produces a change in a head origin z-axis coordinate of a center-of-gravity of the golf club head of less than between about 0.5 mm and about 2.0 mm (e.g., about 1.0 mm) throughout the adjustability range of the at least one weight member.

Because the ribs are injection molded they can have a wide variety of shapes, sizes, orientations, and locations on the sole insert to adjust and fine tune acoustic properties of the golf club head. It can be seen in FIG. 6 that the rib network adds rigidity in both the lateral and longitudinal directions and thereby imparts strategically located stiffness to the golf club head. In this regard, some of the ribs, such as ribs 30j, 30k, 30l, 30m, 30o, 30p, and 30q, have forked ends to engage mating structural elements on the frame 24, thereby aligning the sole insert 28 for attachment to the frame 24 as well as providing a strong mechanical bond between the sole insert 28 unit and frame 24.

Figure 7:
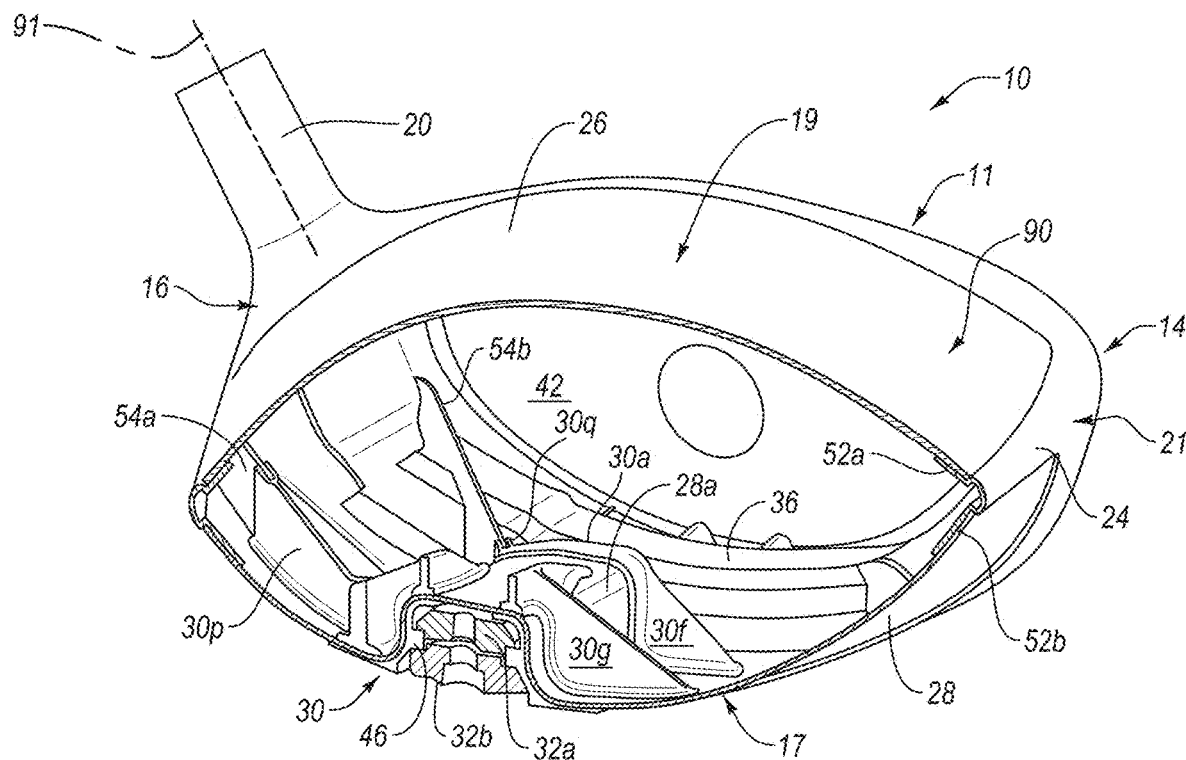
FIG. 7 is a cross-sectional perspective view from a back of the golf club head of FIG. 1, taken along line 7-7 of FIG. 1.

Referring to FIG. 7, the frame 24 preferably includes a recessed seat or ledge 52a extending around the crown opening 62 to seat the crown insert 26. Similarly, the frame 24 includes a seat or ledge 52b around the sole opening 60 to receive the sole insert 28. The weight elements 32a, 32b of the weight 32 are shown seated in their respective channels and separated by rail 46. Weight elements 32a, 32b are shown having aligned bores to receive the screw 34 (see, e.g., FIGS. 1 and 2). The bore of the weight element 32a may be threaded such that loosening of the screw 34 separates the weight elements to allow sliding movement forward and rearward within the weight track 30, while tightening the screw 34 pulls the weights together into locking engagement with the rail 46 to prevent sliding movement during play on the golf course.

Figure 8:
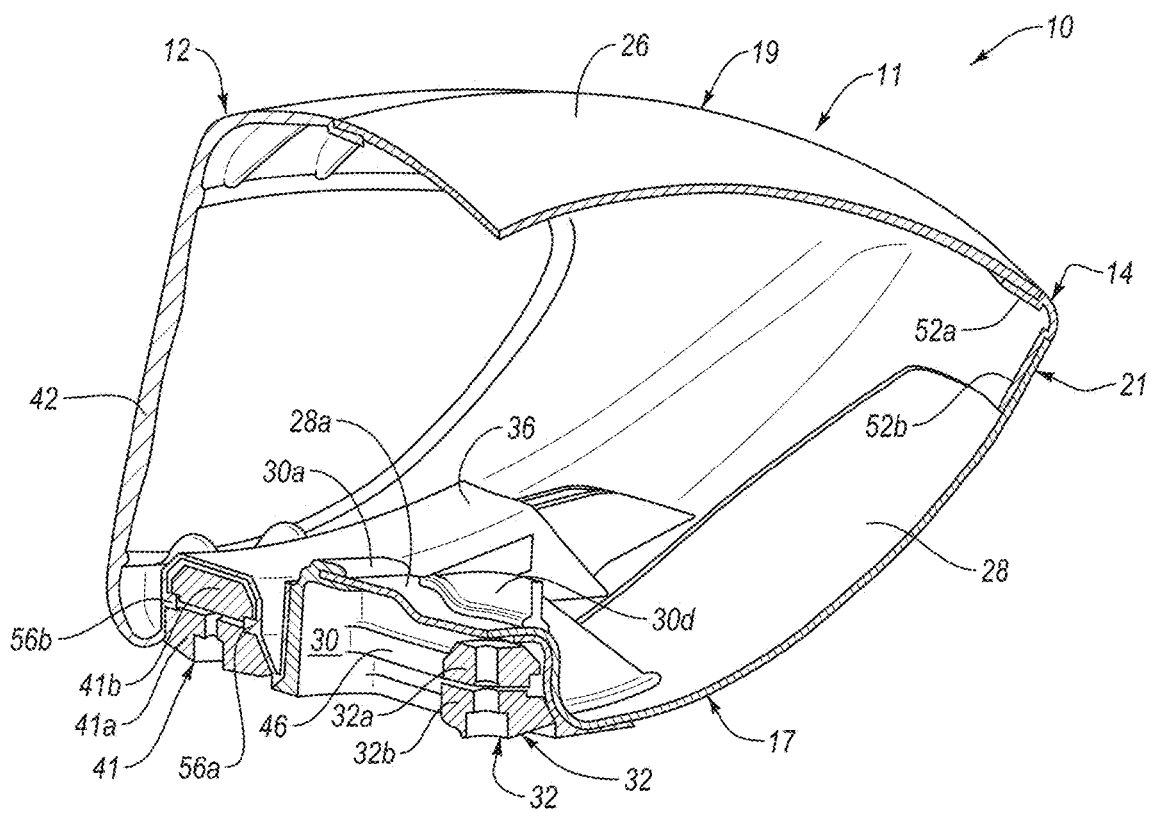
FIG. 8 is a cross-sectional perspective view from a back of the golf club head of FIG. 1, taken along line 7-7 of FIG. 1 and line 8-8 of FIG. 3.

As shown in FIG. 8, the rear weight track 30 and a two-piece weight 32 (with weight elements 32a, 32b) is similar to the weight track 36 and two-piece weight 41 (which includes weight elements 41a, 41b).

Similar to that mentioned above, in some embodiments, the width of the channels or sliding weight tracks (i.e., the distance between a first channel wall and a second channel wall adjacent to the locations of a first ledge and a second ledge) may be between about 8 mm and about 20 mm, such as between about 10 mm and about 18 mm, or such as between about 12 mm and about 16 mm. Also in line with that mentioned above, in certain embodiments, the depth of the channel (i.e., the vertical distance between a bottom channel wall and an imaginary plane containing the regions of the sole adjacent the ledges of the channel) may be between about 6 mm and about 20 mm, such as between about 8 mm and about 18 mm, or such as between about 10 mm and about 16 mm. Further to that mentioned above, according to some embodiments, the length of the channels (i.e., the horizontal distance between a first end of the channel and a second end of the channel) may be between about 30 mm and about 120 mm, such as between about 50 mm and about 100 mm, or such as between about 60 mm and about 90 mm.

According to some embodiments, to use the adjustable weight systems of a golf club head (e.g., golf club head 10 shown in FIGS. 1-8), a user will use an engagement end of a tool (such as the torque wrench) to loosen the fastening bolt of the weight assembly. Once the fastening bolt is loosened, the weight assembly may be adjusted by either sliding the weight assembly in a channel or by repositioning the weight assembly at different locations on the club head. Once the weight assembly is in the desired location, the fastening bolt may be tightened until the weight assembly is secured to the club head. In the case of a sliding weight, the weight fastening bolt may be tightened until the clamping force, between a washer and a mass member of the weight system, upon a front ledge and/or rear ledge of a weight track or channel is sufficient to restrain the weight assembly in place. In some embodiments, the golf club head may include locking projections located on the front ledge and/or rear ledge and locking notches located on the washer that cooperate to increase the locking force provided by the washer and the mass member. In other embodiments, the golf club head may include locating projections located on the front ledge and/or rear ledge and locating notches located on the washer. The locating projections or bumps are sized to have a width smaller than the width of the notches or recesses in the outer weight member or washer such that the outer weight member can move a limited amount when placed over one of the bumps. In this manner, the projections or bumps serve as markers or indices to help locate the position of the weight assembly along the channel, but do not perform a significant locking function. Instead, the weight assembly may be locked into place at a selected position along the channel by tightening the bolt.

In the embodiments shown, the weight assembly includes three components: an inner member, an outer member, and a fastening bolt. The outer member may be located within an outer portion of the interior channel volume, engaging the outward-facing surfaces of the ledges. The inner member may be located within an inner portion of the interior channel volume, engaging the inward-facing surfaces of the ledges. The fastening bolt has a threaded shaft that extends through a center aperture of the outer member and engages mating threads located in a center aperture of the mass member. This is a tension system for securing the weight assembly. Alternatively, the washer could have the mating threads in a center aperture, and the fastening bolt could go through a center aperture of the mass member and be tightened by a drive on the exposed outer surface of the bolt. In this embodiment, the head of the bolt would be captured on the inner surface of the mass member holding it in place during tightening.

In some embodiments, the washer may be heavier than mass member, and vice versa. Or, the washer and the mass member may have similar masses. An advantage of making the washer heavier than the mass member is an even lower CG. The washer and/or mass member may have a mass in the range of 1 g to 50 g.

The composite sole and weight track disclosed in various embodiments herein overcome manufacturing challenges associated with conventional club heads having titanium or other metal weight tracks, and replace a relatively heavy weight track with a light composite material (freeing up discretionary mass which can be strategically allocated elsewhere within the golf club head). For example, additional ribs can be strategically added to the hollow interior of the golf club head and thereby improve the acoustic properties of the head. Ribs can be strategically located to strengthen or add rigidity to select locations in the interior of the head. Discretionary mass in the form of ribs or other features also can be strategically located in the interior to shift the effective CG fore or aft, toe-ward or heel-ward or both (apart from any further CG adjustments made possible by slidable weight features). Additionally, composite sole and crown inserts 28, 26 provide structural support and stiffness to the golf club head 10, as well as free up discretionary mass that can be allocated elsewhere on the golf club head 10.

According to some embodiments, the golf club head 10 of the present disclosure includes at least one coefficient of restitution (COR) feature located on the sole portion of the body 11 of the golf club head 10. The COR of the golf club head 10 is a measurement of the energy loss or retention between the golf club head 10 and a golf ball when the golf ball is struck by the golf club head 10. Desirably, the COR of the golf club head 10 is high to promote the efficient transfer of energy from the golf club head 10 to the ball during impact with the ball. Accordingly, the COR feature of the golf club head 10 promotes an increase in the COR of the golf club head 10.

In some implementations of the golf club head 10, the COR feature is one or more of a channel, slot, or some other member configured to increase the COR of the golf club head 10. Generally, the COR feature, such as the channel or slot, increases the COR of the golf club head 10 by increasing or enhancing the perimeter flexibility of the striking face 43 of the golf club head 10. According to certain implementations, the COR feature may be located in the forward region 12 of the sole portion 17 of the body 11, adjacent to or near to a forwardmost edge of the sole portion 17.

Further details concerning the channel of the COR feature of the golf club head 10 can be found in U.S. patent application Ser. Nos. 13/338,197, 13/469,031, 13/828,675, filed Dec. 27, 2011, May 10, 2012, and Mar. 14, 2013, respectively, and incorporated herein by reference in their entirety. Additional details concerning the slot of the COR feature of the golf club head 10 can be found in U.S. patent application Ser. No. 13/839,727, filed Mar. 15, 2013, and incorporated herein by reference in its entirety. Yet further details concerning the COR feature of the golf club head 10 can be found in U.S. Pat. No. 8,235,844, filed Jun. 1, 2010, U.S. Pat. No. 8,241,143, filed Dec. 13, 2011, U.S. Pat. No. 8,241,144, filed Dec. 14, 2011, all of which are incorporated herein by reference.

The golf club head 10 of the present disclosure may include other features to promote the performance characteristics of the golf club head 10. For example, the golf club head 10, in some implementations, includes movable weight features similar to those described in more detail in U.S. Pat. Nos. 6,773,360; 7,166,040; 7,452,285; 7,628,707; 7,186,190; 7,591,738; 7,963,861; 7,621,823; 7,448,963; 7,568,985; 7,578,753; 7,717,804; 7,717,805; 7,530,904; 7,540,811; 7,407,447; 7,632,194; 7,846,041; 7,419,441; 7,713,142; 7,744,484; 7,223,180; 7,410,425; and 7,410,426, the entire contents of each of which are incorporated herein by reference in their entirety.

In certain implementations, for example, the golf club head 10 includes slidable weight features similar to those described in more detail in U.S. Pat. Nos. 7,775,905 and 8,444,505; U.S. patent application Ser. No. 13/898,313, filed on May 20, 2013; U.S. patent application Ser. No. 14/047,880, filed on Oct. 7, 2013; U.S. Patent Application No. 61/702,667, filed on Sep. 18, 2012; U.S. patent application Ser. No. 13/841,325, filed on Mar. 15, 2013; U.S. patent application Ser. No. 13/946,918, filed on Jul. 19, 2013; U.S. patent application Ser. No. 14/789,838, filed on Jul. 1, 2015; U.S. Patent Application No. 62/020,972, filed on Jul. 3, 2014; Patent Application No. 62/065,552, filed on Oct. 17, 2014; and Patent Application No. 62/141,160, filed on Mar. 31, 2015, the entire contents of each of which are hereby incorporated herein by reference in their entirety.

According to some implementations, the golf club head 10 includes aerodynamic shape features similar to those described in more detail in U.S. Patent Application Publication No. 2013/0123040A1, the entire contents of which are incorporated herein by reference in their entirety.

According to yet some implementations, the golf club head 10 includes adjustable loft/lie features similar to those described in more detail in U.S. Pat. Nos. 8,025,587; 8,235,831; 8,337,319; U.S. Patent Application Publication No. 2011/0312437A1; U.S. Patent Application Publication No. 2012/0258818A1; U.S. Patent Application Publication No. 2012/0122601A1; U.S. Patent Application Publication No. 2012/0071264A1; and U.S. patent application Ser. No. 13/686,677, the entire contents of which are incorporated by reference herein in their entirety.

Additionally, in some implementations, the golf club head 10 includes adjustable sole features similar to those described in more detail in U.S. Pat. No. 8,337,319; U.S. Patent Application Publication Nos. 2011/0152000A1, 2011/0312437, 2012/0122601A1; and U.S. patent application Ser. No. 13/686,677, the entire contents of each of which are incorporated by reference herein in their entirety.

According to certain implementations, the golf club head 10 includes variable thickness face portion features similar to those described in more detail in U.S. patent application Ser. No. 12/006,060; and U.S. Pat. Nos. 6,997,820; 6,800,038; and 6,824,475, which are incorporated herein by reference in their entirety.

In some implementations, the golf club head 10 includes composite face portion features similar to those described in more detail in U.S. patent application Ser. Nos. 11/998,435; 11/642,310; 11/825,138; 11/823,638; 12/004,386; 12/004,387; 11/960,609; 11/960,610; and U.S. Pat. No. 7,267,620, which are herein incorporated by reference in their entirety.

According to one embodiment, a method of making a golf club, such as golf club head 10, includes one or more of the following steps: (1) forming a frame having a sole opening, forming a composite laminate sole insert, injection molding a thermoplastic composite head component over the sole insert to create a sole insert unit, and joining the sole insert unit to the frame; (2) providing a composite head component, which is a weight track capable of supporting one or more slidable weights; (3) forming a sole insert from a thermoplastic composite material having a matrix compatible for bonding with a weight track; (4) forming a sole insert from a continuous fiber composite material having continuous fibers selected from the group consisting of glass fibers, aramide fibers, carbon fibers and any combination thereof, and having a thermoplastic matrix consisting of polyphenylene sulfide (PPS), polyamides, polypropylene, thermoplastic polyurethanes, thermoplastic polyureas, polyamide-amides (PAI), polyether amides (PEI), polyetheretherketones (PEEK), and any combinations thereof; (5) forming both a sole insert and a weight track from thermoplastic composite materials having a compatible matrix; (6) forming a sole insert from a thermosetting material, coating a sole insert with a heat activated adhesive, and forming a weight track from a thermoplastic material capable of being injection molded over the sole insert after the coating step;

(7) forming a frame from a material selected from the group consisting of titanium, one or more titanium alloys, aluminum, one or more aluminum alloys, steel, one or more steel alloys, and any combination thereof; (8) forming a frame with a crown opening, forming a crown insert from a composite laminate material, and joining the crown insert to the frame such that the crown insert overlies the crown opening; (9) selecting a composite head component from the group consisting of one or more ribs to reinforce the head, one or more ribs to tune acoustic properties of the head, one or more weight ports to receive a fixed weight in a sole portion of the golf club head, one or more weight tracks to receive a slidable weight, and combinations thereof; (10) forming a sole insert and a crown insert from a continuous carbon fiber composite material; (11) forming a sole insert and a crown insert by thermosetting using materials suitable for thermosetting, and coating the sole insert with a heat activated adhesive; (12) forming a frame from titanium, titanium alloy or a combination thereof to have a crown opening, a sole insert, and a weight track from a thermoplastic carbon fiber material having a matrix selected from the group consisting of polyphenylene sulfide (PPS), polyamides, polypropylene, thermoplastic polyurethanes, thermoplastic polyureas, polyamide-amides (PAI), polyether amides (PEI), polyetheretherketones (PEEK), and any combinations thereof; and (13) forming a frame with a crown opening, forming a crown insert from a thermoplastic composite material, and joining the crown insert to the frame such that the crown insert overlies the crown opening.

Additionally, or alternatively, the body 11 and/or the frame 24 may be made of from the following materials: carbon steel, stainless steel (e.g. 17-4 PH stainless steel), alloy steel, Fe—Mn—Al alloy, nickel-based ferroalloy, cast iron, super alloy steel, aluminum alloy, magnesium alloy, copper alloy, titanium alloy or mixtures thereof. The sole insert, crown insert, and/or sliding weight track may be formed of a non-metal material with a density less than about 2 $g/cm^3$, such as between about 1 $g/cm^3$ to about 2 $g/cm^3$. The nonmetal material may be preferably comprised of a polymer or polymer reinforced composite. The polymer can be either thermoset or thermoplastic, and can be amorphous, crystalline and/or a semi-crystalline structure. The polymer may also be formed of an engineering plastic such as a crystalline or semi-crystalline engineering plastic or an amorphous engineering plastic. Potential engineering plastic candidates include polyphenylene sulfide ether (PPS), polyetherimide (PEI), polycarbonate (PC), polypropylene (PP), acrylonitrile-butadience styrene plastics (ABS), polyoxymethylene plastic (POM), nylon 6, nylon 6-6, nylon 12, polymethyl methacrylate (PMMA), polypheylene oxide (PPO), polybothlene terephthalate (PBT), polysulfone (PSU), polyether sulfone (PES), polyether ether ketone (PEEK) or mixtures thereof. Besides, during forming the sole insert, crown insert, and/or sliding weight track, organic short fibers, such as fiberglass, carbon fiber, or metallic fiber, can be added into the engineering plastic, so as to enhance the structural strength of the sole insert, crown insert, and/or sliding weight track. Preferably, however, the reinforcements are continuous long fibers, rather than short fibers. The most preferable thermoset would be continuous long fiber graphite epoxy composite. The most preferable thermoplastics would be either PPS or PSU polymer with continuous long fiber graphite reinforcements. One of the advantages of epoxy and PSU is both are relatively stiff with relatively low damping which produces a better sounding or more metallic sounding golf club compared to other polymers which may be overdamped. Additionally, PSU requires less post processing in that it does not require a finish or paint to achieve a final finished golf club head.

In some embodiments, the method of making a golf club head may include forming a crown insert or a sole insert, the formation of the insert including one or more of the following steps: (1) coating carbon fibers for form color coated carbon fibers; (2) layering a plurality of prepreg unidirectional fiber composite plies to form a prepreg fiber composite layer, the plurality of prepreg unidirectional fiber composite plies including an innermost prepreg unidirectional fiber composite ply and an outermost prepreg unidirectional fiber composite ply; (3) forming a woven composite layer including the colored carbon fibers; (4) curing the prepreg fiber composite layer and the woven composite layer; (5) adhering the woven composite layer directly or indirectly to the outermost prepreg unidirectional fiber composite ply; and (6) coating an outermost surface of the woven composite layer with an optically transparent coating. In step (1), the carbon fibers may be coated using an electroplating process, a CVD process, a PVD process, or an anodization process. In some embodiments, in step (2) the outermost prepreg unidirectional fiber composite ply may include color coated carbon fibers. In some embodiments, in step (5) the prepreg fiber composite layer and the woven composite layer may be cured together to adhere the woven composite layer directly to the outermost prepreg unidirectional fiber composite ply. In some embodiments, a sole insert and/or a crown insert may be made by a process including thermoforming.

In some embodiments, coating carbon fibers may include coating individual fibers. In some embodiments, coating carbon fibers may include coating individual tows of carbon fibers. In some embodiments, coating carbon fibers may include coating a sheet of woven carbon fibers and/or carbon fiber tows.

In some embodiments, the method of making a golf club head may include forming a crown insert or a sole insert, the formation of the insert including one or more of the following steps: (1) weaving carbon fibers to form a woven pattern; (2) layering a plurality of prepreg unidirectional fiber composite plies to form a prepreg fiber composite layer; (3) metallic/color coating the woven pattern; (4) embedding the woven fiber pattern in a matrix material; (5) curing the prepreg fiber composite layer and/or the woven composite layer; (6) adhering the woven composite layer directly or indirectly to the outermost prepreg unidirectional fiber composite ply; and (7) coating an outermost surface of the woven composite layer with an optically transparent coating. In step (3), the coating may be applied using an electroplating process, a CVD process, a PVD process, or an anodization process. In some embodiments, in step (2) the outermost prepreg unidirectional fiber composite ply may include color coated carbon fibers. In some embodiments, in step (5) the prepreg fiber composite layer and the woven composite layer may be cured together to adhere the woven composite layer directly to the outermost prepreg unidirectional fiber composite ply. In some embodiments, a sole insert and/or a crown insert may be made by a process including thermoforming.

In some embodiments, a desired shape of woven carbon fiber material may be cut from a woven sheet for processing into a golf club component. The woven sheet from which a desired shape is cut may be sheet of woven fiber material embedded in a cured matrix material.

In some embodiments, the method of a making a golf club component may include weaving a pattern of carbon fiber (e.g., a sheet of woven carbon fiber material) with a minimum weave density. Any of the weave patterns discussed herein may be woven to have a minimum weave density discussed herein (e.g., a minimum weave density in the range of 50-650 grams per meter squared (g/m²) of weave pattern). In some embodiments, the fibers woven into a pattern may be color/metallic coated. In some embodiments, the fibers woven into a pattern may not be color/metallic coated. In some embodiments, after weaving a woven fiber pattern having a suitable weave density, the woven fiber pattern may be embedded in a matrix material to form a woven fiber composite. In embodiments where a woven pattern of carbon fibers and/or carbon fiber tows is color/metallic coated, the color/metallic coating may be applied prior to embedding the woven pattern in a matrix material. The color/metallic coating may be applied to a top surface of the woven pattern and/or a bottom surface of the woven pattern.

Exemplary polymers for embodiments described herein may include without limitation, synthetic and natural rubbers, thermoset polymers such as thermoset polyurethanes or thermoset polyureas, as well as thermoplastic polymers including thermoplastic elastomers such as thermoplastic polyurethanes, thermoplastic polyureas, metallocene catalyzed polymer, unimodalethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, polyamides (PA), polyketones (PK), copolyamides, polyesters, copolyesters, polycarbonates, polyphenylene sulfide (PPS), cyclic olefin copolymers (COC), polyolefins, halogenated polyolefins [e.g. chlorinated polyethylene (CPE)], halogenated polyalkylene compounds, polyalkenamer, polyphenylene oxides, polyphenylene sulfides, diallylphthalate polymers, polyimides, polyvinyl chlorides, polyamide-ionomers, polyurethane ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic block copolymers including styrene-butadiene-styrene (SBS), styrene-ethylene-butylene-styrene, (SEBS) and styrene-ethylene-propylene-styrene (SEPS), styrenic terpolymers, functionalized styrenic block copolymers including hydroxylated, functionalized styrenic copolymers, and terpolymers, cellulosic polymers, liquid crystal polymers (LCP), ethylene-propylene-diene terpolymers (EPDM), ethylene-vinyl acetate copolymers (EVA), ethylene-propylene copolymers, propylene elastomers (such as those described in U.S. Pat. No. 6,525,157, to Kim et al, the entire contents of which is hereby incorporated by reference), ethylene vinyl acetates, polyureas, and polysiloxanes and any and all combinations thereof.

Of these preferred are polyamides (PA), polyphthalimide (PPA), polyketones (PK), copolyamides, polyesters, copolyesters, polycarbonates, polyphenylene sulfide (PPS), cyclic olefin copolymers (COC), polyphenylene oxides, diallylphthalate polymers, polyarylates, polyacrylates, polyphenylene ethers, and impact-modified polyphenylene ethers. Especially preferred polymers for use in the golf club heads of the present invention are the family of so called high performance engineering thermoplastics which are known for their toughness and stability at high temperatures. These polymers include the polysulfones, the polyetherimides, and the polyamide-imides. Of these, the most preferred are the polysulfones.

Aromatic polysulfones are a family of polymers produced from the condensation polymerization of 4,4'-dichlorodiphenylsulfone with itself or one or more dihydric phenols. The aromatic polysulfones include the thermoplastics sometimes called polyether sulfones, and the general structure of their repeating unit has a diaryl sulfone structure which may be represented as -arylene-SO2-arylene-. These units may be linked to one another by carbon-to-carbon bonds, carbon-oxygen-carbon bonds, carbon-sulfur-carbon bonds, or via a short alkylene linkage, so as to form a thermally stable thermoplastic polymer. Polymers in this family are completely amorphous, exhibit high glass-transition temperatures, and offer high strength and stiffness properties even at high temperatures, making them useful for demanding engineering applications. The polymers also possess good ductility and toughness and are transparent in their natural state by virtue of their fully amorphous nature. Additional key attributes include resistance to hydrolysis by hot water/steam and excellent resistance to acids and bases. The polysulfones are fully thermoplastic, allowing fabrication by most standard methods such as injection molding, extrusion, and thermoforming. They also enjoy a broad range of high temperature engineering uses.

Three commercially important polysulfones are a) polysulfone (PSU); b) Polyethersulfone (PES also referred to as PESU); and c) Polyphenylene sulfoner (PPSU).

Particularly important and preferred aromatic polysulfones are those comprised of repeating units of the structure —C6H4SO2-C6H4-O— where C6H4 represents a m- or p-phenylene structure. The polymer chain can also comprise repeating units such as —C6H4-, C6H4-O—, —C6H4-(lower-alkylene)-C6H4-O—, —C6H4-O—C6H4-O—, —C6H4-S—C6H4-O—, and other thermally stable substantially-aromatic difunctional groups known in the art of engineering thermoplastics. Also included are the so called modified polysulfones where the individual aromatic rings are further substituted in one or substituents including

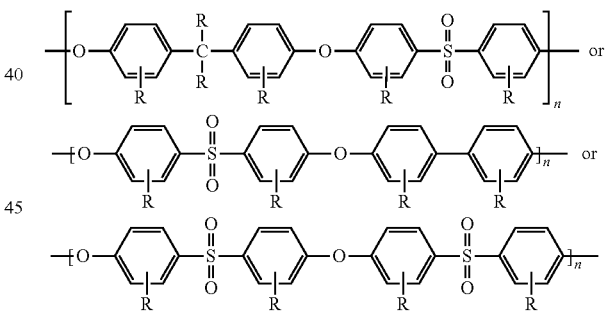

wherein R is independently at each occurrence, a hydrogen atom, a halogen atom or a hydrocarbon group or a combination thereof. The halogen atom includes fluorine, chlorine, bromine and iodine atoms. The hydrocarbon group includes, for example, a C1-C20 alkyl group, a C2-C20 alkenyl group, a C3-C20 cycloalkyl group, a C3-C20 cycloalkenyl group, and a C6-C20 aromatic hydrocarbon group. These hydrocarbon groups may be partly substituted by a halogen atom or atoms, or may be partly substituted by a polar group or groups other than the halogen atom or atoms. As specific examples of the C1-C20 alkyl group, there can be mentioned methyl, ethyl, propyl, isopropyl, amyl, hexyl, octyl, decyl and dodecyl groups. As specific examples of the C2-C20 alkenyl group, there can be mentioned propenyl, isopropepyl, butenyl, isobutenyl, pentenyl and hexenyl groups. As specific examples of the C3-C20 cycloalkyl group, there can be mentioned cyclopentyl and cyclohexyl groups. As specific examples of the C3-C20 cycloalkenyl group, there can be mentioned cyclopentenyl and cyclohexenyl groups. As specific examples of the aromatic hydrocarbon group, there can be mentioned phenyl and naphthyl groups or a combination thereof.

Individual preferred polymers include (a) the polysulfone made by condensation polymerization of bisphenol A and 4,4'-dichlorodiphenyl sulfone in the presence of base, and having the main repeating structure

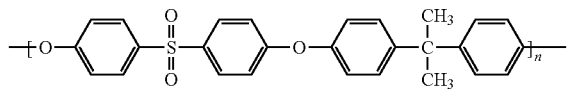

and the abbreviation PSF and sold under the tradenames Udel®, Ultrason® S, Eviva®, RTP PSU, (b) the polysulfone made by condensation polymerization of 4,4'-dihydroxydiphenyl and 4,4'-dichlorodiphenyl sulfone in the presence of base, and having the main repeating structure

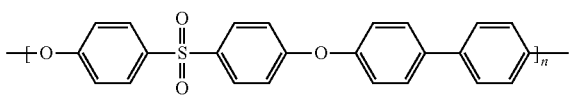

and the abbreviation PPSF and sold under the tradenames RADEL® resin; and (c) a condensation polymer made from 4,4'-dichlorodiphenyl sulfone in the presence of base and having the principle repeating structure

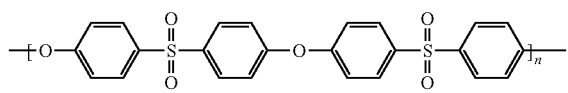

and the abbreviation PPSF and sometimes called a "polyether sulfone" and sold under the tradenames Ultrason® E, LNP™, Veradel®PESU, Sumikaexce, and VICTREX® resin," and any and all combinations thereof.

Suitable exemplary composite materials for composite fiber layers are as follows. For each exemplary composite material, unless specified otherwise, the properties of that material are that of the material without the addition of a color/metallic coating to the fibers of the material. However, a sufficiently thin color/metallic coating may not change properties (e.g., mechanical properties) of a composite material. Suitable composite materials, such as carbon composites, may be made of a composite including multiple plies or layers of a fibrous material (e.g., graphite, or carbon fiber including turbostratic or graphitic carbon fiber or a hybrid structure with both graphitic and turbostratic parts present). Examples of some of these composite materials for use in metalwood golf clubs and their fabrication procedures are described in U.S. patent application Ser. No. 10/442,348 (now U.S. Pat. No. 7,267,620), Ser. No. 10/831,496 (now U.S. Pat. No. 7,140,974), Ser. Nos. 11/642,310, 11/825,138, 11/998,436, 11/895,195, 11/823,638, 12/004,386, 12/004,387, 11/960,609, 11/960,610, and 12/156,947, which are incorporated herein by reference. The composite material may be manufactured according to the methods described at least in U.S. patent application Ser. No. 11/825,138, the entire contents of which are herein incorporated by reference.

Alternatively, short or long fiber-reinforced formulations of the previously referenced polymers can be used. Exemplary formulations include a Nylon 6/6 polyamide formulation, which is 30% Carbon Fiber Filled and available commercially from RTP Company under the trade name RTP 285. This material has a Tensile Strength of 35000 psi (241 MPa) as measured by ASTM D 638; a Tensile Elongation of 2.0-3.0% as measured by ASTM D 638; a Tensile Modulus of $3.30 \times 10^6$ psi (22754 MPa) as measured by ASTM D 638; a Flexural Strength of 50000 psi (345 MPa) as measured by ASTM D 790; and a Flexural Modulus of $2.60 \times 10^6$ psi (17927 MPa) as measured by ASTM D 790.

Other materials also include is a polyphthalamide (PPA) formulation which is 40% Carbon Fiber Filled and available commercially from RTP Company under the trade name RTP 4087 UP. This material has a Tensile Strength of 360 MPa as measured by ISO 527; a Tensile Elongation of 1.4% as measured by ISO 527; a Tensile Modulus of 41500 MPa as measured by ISO 527; a Flexural Strength of 580 MPa as measured by ISO 178; and a Flexural Modulus of 34500 MPa as measured by ISO 178.

Yet other materials include is a polyphenylene sulfide (PPS) formulation which is 30% Carbon Fiber Filled and available commercially from RTP Company under the trade name RTP 1385 UP. This material has a Tensile Strength of 255 MPa as measured by ISO 527; a Tensile Elongation of 1.3% as measured by ISO 527; a Tensile Modulus of 28500 MPa as measured by ISO 527; a Flexural Strength of 385 MPa as measured by ISO 178; and a Flexural Modulus of 23,000 MPa as measured by ISO 178.

Especially preferred materials include a polysulfone (PSU) formulation which is 20% Carbon Fiber Filled and available commercially from RTP Company under the trade name RTP 983. This material has a Tensile Strength of 124 MPa as measured by ISO 527; a Tensile Elongation of 2% as measured by ISO 527; a Tensile Modulus of 11032 MPa as measured by ISO 527; a Flexural Strength of 186 MPa as measured by ISO 178; and a Flexural Modulus of 9653 MPa as measured by ISO 178.

Also, preferred materials may include a polysulfone (PSU) formulation which is 30% Carbon Fiber Filled and available commercially from RTP Company under the trade name RTP 985. This material has a Tensile Strength of 138 MPa as measured by ISO 527; a Tensile Elongation of 1.2% as measured by ISO 527; a Tensile Modulus of 20685 MPa as measured by ISO 527; a Flexural Strength of 193 MPa as measured by ISO 178; and a Flexural Modulus of 12411 MPa as measured by ISO 178.

Further preferred materials include a polysulfone (PSU) formulation which is 40% Carbon Fiber Filled and available commercially from RTP Company under the trade name RTP 987. This material has a Tensile Strength of 155 MPa as measured by ISO 527; a Tensile Elongation of 1% as measured by ISO 527; a Tensile Modulus of 24132 MPa as measured by ISO 527; a Flexural Strength of 241 MPa as measured by ISO 178; and a Flexural Modulus of 19306 MPa as measured by ISO 178.

As described in detail in U.S. Pat. No. 6,623,378, filed Jun. 11, 2001, entitled "METHOD FOR MANUFACTURING AND GOLF CLUB HEAD" and incorporated by reference herein in its entirety, the crown or outer shell of the golf club head 10 may be made of a composite material, such as, for example, a carbon fiber reinforced epoxy, carbon fiber reinforced polymer, or a polymer. Additionally, U.S. patent application Ser. Nos. 10/316,453 and 10/634,023 describe golf club heads with lightweight crowns. Furthermore, U.S. patent application Ser. No. 12/974,437 (now U.S. Pat. No. 8,608,591) describes golf club heads with lightweight crowns and soles.

In some embodiments, composite materials used to construct the crown and/or should exhibit high strength and rigidity over a broad temperature range as well as good wear and abrasion behavior and be resistant to stress cracking. Such properties include (1) a Tensile Strength at room temperature of from about 7 ksi to about 330 ksi, preferably of from about 8 ksi to about 305 ksi, more preferably of from about 200 ksi to about 300 ksi, even more preferably of from about 250 ksi to about 300 ksi (as measured by ASTM D 638 and/or ASTM D 3039); (2) a Tensile Modulus at room temperature of from about 0.4 Msi to about 23 Msi, preferably of from about 0.46 Msi to about 21 Msi, more preferably of from about 0.46 Msi to about 19 Msi (as measured by ASTM D 638 and/or ASTM D 3039); (3) a Flexural Strength at room temperature of from about 13 ksi to about 300 ksi, from about 14 ksi to about 290 ksi, more preferably of from about 50 ksi to about 285 ksi, even more preferably of from about 100 ksi to about 280 ksi (as measured by ASTM D 790); and (4) a Flexural Modulus at room temperature of from about 0.4 Msi to about 21 Msi, from about 0.5 Msi to about 20 Msi, more preferably of from about 10 Msi to about 19 Msi (as measured by ASTM D 790).

In certain embodiments, composite materials that are useful for making club-head components comprise a fiber portion and a resin portion. In general the resin portion serves as a "matrix" in which the fibers are embedded in a defined manner. In a composite for club-heads, the fiber portion is configured as multiple fibrous layers or plies that are impregnated with the resin component. The fibers in each layer have a respective orientation, which is typically different from one layer to the next and precisely controlled. The usual number of layers for a striking face is substantial, e.g., forty or more. However for a sole or crown, the number of layers can be substantially decreased to, e.g., three or more, four or more, five or more, six or more, examples of which will be provided below. During fabrication of the composite material, the layers (each comprising respectively oriented fibers impregnated in uncured or partially cured resin; each such layer being called a "prepreg" layer) are placed superposedly in a "lay-up" manner. After forming the prepreg lay-up, the resin is cured to a rigid condition. If interested a specific strength may be calculated by dividing the tensile strength by the density of the material. This is also known as the strength-to-weight ratio or strength/weight ratio.

In tests involving certain club-head configurations, composite portions formed of prepreg plies having a relatively low fiber areal weight (FAW) have been found to provide superior attributes in several areas, such as impact resistance, durability, and overall club performance. FAW is the weight of the fiber portion of a given quantity of prepreg, in units of $g/m^2$. Crown and/or sole panels may be formed of plies of composite material having a fiber areal weight of between 20 $g/m^2$ and 200 $g/m^2$. However, FAW values below 100 $g/m^2$, and more desirably 75 $g/m^2$ or less, can be particularly effective. A particularly suitable fibrous material for use in making prepreg plies is carbon fiber, as noted. More than one fibrous material can be used. In other embodiments, however, prepreg plies having FAW values below 70 $g/m^2$ and above 100 $g/m^2$ may be used. Generally, cost is the primary prohibitive factor in prepreg plies having FAW values below 70 $g/m^2$.

In particular embodiments, multiple low-FAW prepreg plies can be stacked and still have a relatively uniform distribution of fiber across the thickness of the stacked plies. In contrast, at comparable resin-content (R/C, in units of percent) levels, stacked plies of prepreg materials having a higher FAW tend to have more significant resin-rich regions, particularly at the interfaces of adjacent plies, than stacked plies of low-FAW materials. Resin-rich regions tend to reduce the efficacy of the fiber reinforcement, particularly since the force resulting from golf-ball impact is generally transverse to the orientation of the fibers of the fiber reinforcement. The prepreg plies used to form the panels desirably comprise carbon fibers impregnated with a suitable resin, such as epoxy. An example carbon fiber is "34-700" carbon fiber (available from Grafil, Sacramento, Calif.), having a tensile modulus of 234 Gpa (34 Msi) and a tensile strength of 4500 Mpa (650 Ksi). Another Grafil fiber that can be used is "TR50S" carbon fiber, which has a tensile modulus of 240 Gpa (35 Msi) and a tensile strength of 4900 Mpa (710 ksi). Suitable epoxy resins are types "301" and "350" (available from Newport Adhesives and Composites, Irvine, Calif.). An exemplary resin content (R/C) is between 33% and 40%, preferably between 35% and 40%, more preferably between 36% and 38%.

Some of the embodiments of the golf club heads discussed throughout this application (e.g., golf club head 10) may include a separate crown, sole, and/or face that may be a composite, such as, for example, a carbon fiber reinforced epoxy, carbon fiber reinforced polymer, or a polymer crown, sole, and/or face. Alternatively, the crown, sole, and/or face may be made from a less dense material, such as, for example, Titanium or Aluminum. A portion of the crown may be cast from either steel (~7.8-8.05 $g/cm^3$) or titanium (~4.43 $g/cm^3$) while a majority of the crown may be made from a less dense material, such as for example, a material having a density of about 1.5 $g/cm^3$ or some other material having a density less than about 4.43 $g/cm^3$. In other words, the crown could be some other metal or a composite. Additionally or alternatively, the face may be welded in place rather than cast as part of the sole.

By making the crown, sole, and/or face out of a less dense material, it may allow for weight to be redistributed from the crown, sole, and/or face to other areas of the club head, such as, for example, low and forward and/or low and back. Both low and forward and low and back may be possible for club heads incorporating a front to back sliding weight track.

U.S. Pat. No. 8,163,119 discloses composite articles and methods for making composite articles, which is incorporated by reference herein in the entirety. U.S. Pat. Pub. Nos. 2015/0038262 and 2016/0001146 disclose various composite crown constructions that may be used for golf club heads, which are incorporated by reference herein in their entireties. The techniques and layups described in U.S. Pat. No. 8,163,119, U.S. Pat. Pub. No. 2015/0038262 and U.S. Pat. Pub. No. 2016/0001146 may be employed for constructing a composite crown panel, composite sole panel, composite toe panel located on the sole, and/or composite heel panel located on the sole.

U.S. Pat. No. 8,163,119 discloses the usual number of layers for a striking plate is substantial, e.g., fifty or more. However, improvements have been made in the art such that the layers may be decreased to between 30 and 50 layers. Additionally, for a panel located on the sole and/or crown the layers can be substantially decreased down to three, four, five, six, seven, or more layers.

Table 1 below provides examples of possible layups. These layups show possible crown and/or sole construction using unidirectional plies unless noted as woven plies. The construction shown is for a quasi-isotropic layup. A single layer ply may have a thickness ranging from about 0.065 mm to about 0.080 mm for a standard FAW of 70 g/m$^2$ with about 36% to about 40% resin content, however the crown and/or sole panels may be formed of plies of composite material having a fiber areal weight of between 20 g/m$^2$ and 200 g/m$^2$. In some embodiments, a ply of an insert may have a thickness in the range of 0.065 mm to 0.60 mm, including subranges. For example, the thickness of a ply may be 0.065 mm, 0.10 mm, 0.20 mm, 0.30 mm, 0.40 mm, 0.50 mm, 0.60 mm, or within a range having any two of these values as endpoints. The thickness of each individual ply may be altered by adjusting either the FAW or the resin content, and therefore the thickness of the entire layup may be altered by adjusting these parameters.

combined with thin walled titanium construction (0.4 mm to 0.9 mm) in other parts of the golf club head 10. The thin walled titanium construction increases the manufacturing difficulty and ultimately fewer parts are cast at a time. In the past, 100+ golf club heads could be cast at a single time, however due to the thinner wall construction fewer golf club heads are cast per cluster to achieve the desired combination of high yield and low material usage.

An important strategy for obtaining more discretionary mass is to reduce the wall thickness of the golf club head 10. For a typical titanium-alloy "metal-wood" club-head having a volume of 460 cm$^3$ (i.e., a driver) and a crown area of 100 cm$^2$, the thickness of the crown is typically about 0.8 mm, and the mass of the crown is about 36 g. Thus, reducing the wall thickness by 0.2 mm (e.g., from 1 mm to 0.8 mm) can yield a discretionary mass "savings" of 9.0 g.

The following examples will help to illustrate the possible discretionary mass "savings" by making a composite crown rather than a titanium-alloy crown. For example, reducing the material thickness to about 0.73 mm yields an additional

TABLE 1

| ply 1 | ply 2 | ply 3 | ply 4 | ply 5 | ply 6 | ply 7 | ply 8 | AW g/m$^2$ |
|---|---|---|---|---|---|---|---|---|
| 0 | −60 | +60 | | | | | | 290-360 |
| 0 | −45 | +45 | 90 | | | | | 390-480 |
| 0 | +60 | 90 | −60 | 0 | | | | 490-600 |
| 0 | +45 | 90 | −45 | 0 | | | | 490-600 |
| 90 | +45 | 0 | −45 | 90 | | | | 490-600 |
| +45 | 90 | 0 | 90 | −45 | | | | 490-600 |
| +45 | 0 | 90 | 0 | −45 | | | | 490-600 |
| −60 | −30 | 0 | +30 | 60 | 90 | | | 590-720 |
| 0 | 90 | +45 | −45 | 90 | 0 | | | 590-720 |
| 90 | 0 | +45 | −45 | 0 | 90 | | | 590-720 |
| 0 | 90 | 45 | −45 | 45 | 0/90 woven | | | 590-720 |
| 0 | 90 | 45 | −45 | 0/90 woven | | | | 590-720 |
| 90 | 0 | 45 | −45 | 45 | 90/0 woven | | | 590-720 |
| 0 | 90 | 45 | −45 | −45 | 45 | 0/90 woven | | 680-840 |
| 90 | 0 | 45 | −45 | −45 | 45 | 90/0 woven | | 680-840 |
| +45 | −45 | 90 | 0 | 0 | 90 | −45/45 woven | | 680-840 |
| 0 | 90 | 45 | −45 | −45 | 45 | 90 UD | | 680-840 |
| 0 | 90 | 45 | −45 | 0 | −45 | 45 | 0/90 woven | 780-960 |
| 90 | 0 | 45 | −45 | 0 | −45 | 45 | 90/0 woven | 780-960 |

The Area Weight (AW) is calculated by multiplying the density times the thickness. For the plies shown above made from composite material the density is about 1.5 g/cm$^3$ and for titanium the density is about 4.5 g/cm$^3$. Depending on the material used and the number of plies the composite crown and/or sole thickness ranges from about 0.195 mm to about 0.9 mm, preferably from about 0.25 mm to about 0.75 mm, more preferably from about 0.3 mm to about 0.65 mm, even more preferably from about 0.36 mm to about 0.56 mm. It should be understood that although these ranges are given for both the crown and sole together it does not necessarily mean the crown and sole will have the same thickness or be made from the same materials. In certain embodiments, the sole may be made from either a titanium alloy or a steel alloy. Similarly the main body of the golf club head 10 may be made from either a titanium alloy or a steel alloy. The titanium will typically range from 0.4 mm to about 0.9 mm, preferably from 0.4 mm to about 0.8 mm, more preferably from 0.4 mm to about 0.7 mm, even more preferably from 0.45 mm to about 0.6 mm. In some instances, the crown and/or sole may have non-uniform thickness, such as, for example varying the thickness between about 0.45 mm and about 0.55 mm.

A lot of discretionary mass may be freed up by using composite material in the crown and/or sole especially when discretionary mass "savings" of about 25.0 g over a 0.8 mm titanium-alloy crown. For example, reducing the material thickness to about 0.73 mm yields an additional discretionary mass "savings" of about 25 g over a 0.8 mm titanium-alloy crown or 34 g over a 1.0 mm titanium-alloy crown. Additionally, a 0.6 mm composite crown yields an additional discretionary mass "savings" of about 27 g over a 0.8 mm titanium-alloy crown. Moreover, a 0.4 mm composite crown yields an additional discretionary mass "savings" of about 30 g over a 0.8 mm titanium-alloy crown. The crown can be made even thinner yet to achieve even greater weight savings, for example, about 0.32 mm thick, about 0.26 mm thick, about 0.195 mm thick. However, the crown thickness must be balanced with the overall durability of the crown during normal use and misuse. For example, an unprotected crown i.e. one without a head cover could potentially be damaged from colliding with other woods or irons in a golf bag.

For example, the crown may be formed of plies of composite material having a fiber areal weight of between 20 g/m$^2$ and 200 g/m$^2$. The weight of the composite crown being at least 20% less than the weight of a similar sized piece formed of the metal of the body. The composite crown may be formed of at least four plies of uni-tape standard modulus graphite, the plies of uni-tape oriented at any combination of 0°, +45°, −45° and 90°. Additionally or alternatively, the crown may include an outermost layer of a woven graphite cloth.

Figure 10:
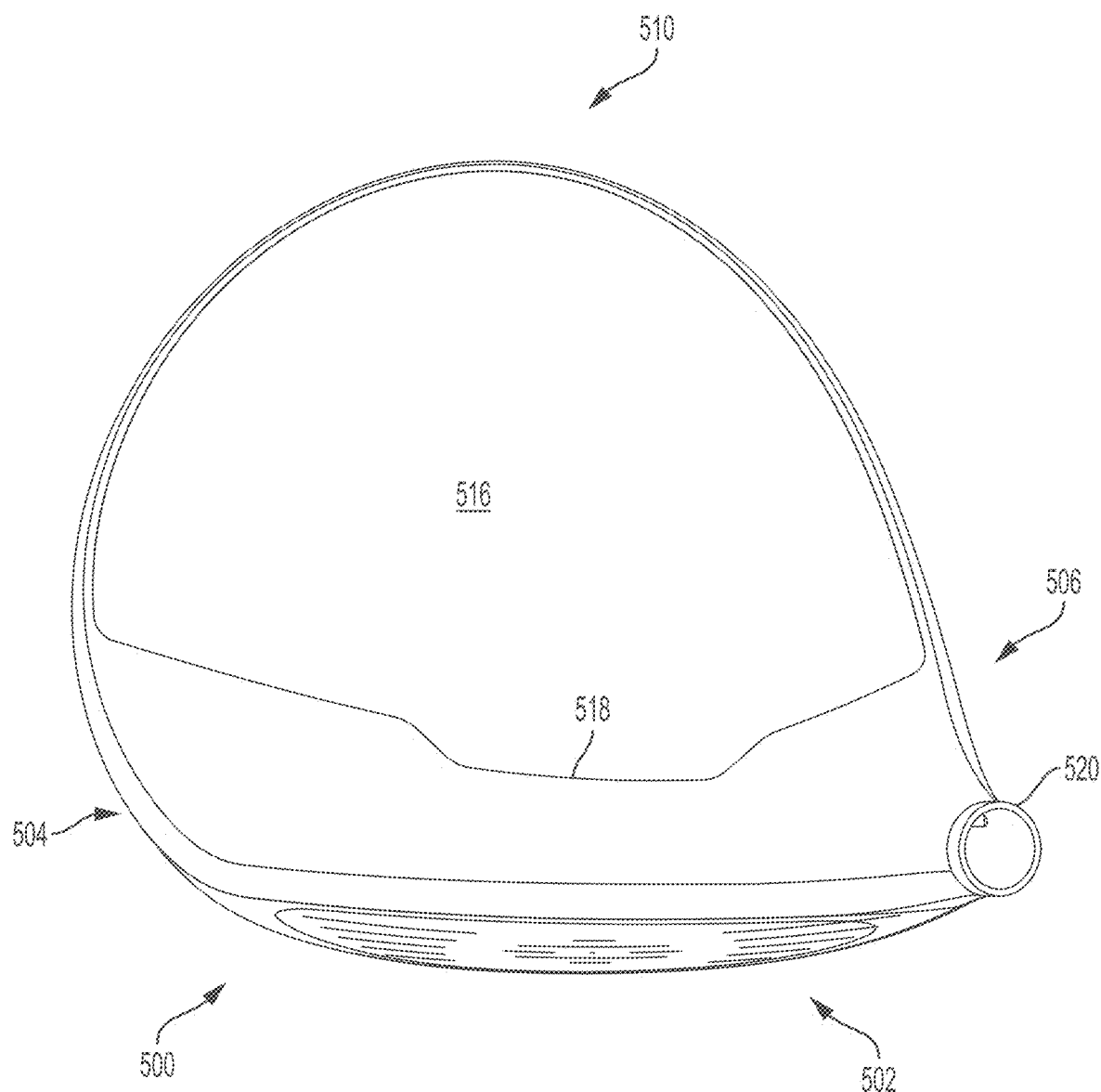
FIG. 10 is a top plan view of golf club head according to some embodiments.
Figure 11:
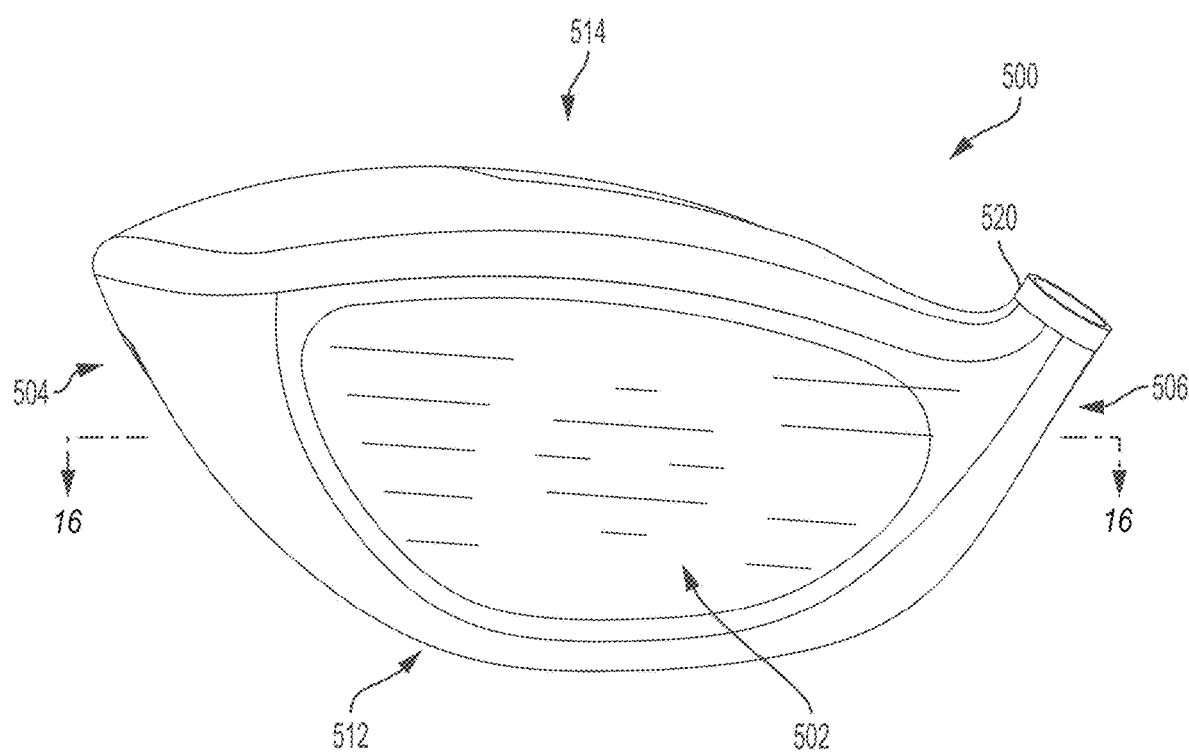
FIG. 11 is a front elevation view of the golf club head of FIG. 10 according to some embodiments.

An additional embodiment of a golf club head 500 is shown in FIGS. 10-17. Referring to FIGS. 10 and 11, the head 500 includes a forward face 502, toe 504, heel 506 opposite the toe 504, and a rear or aft section 510 opposite the face 502. The head also includes a sole 512 at the bottom of the club head and crown 514 at the top, which create a surface area expanse between the toe, heel, face and aft section to form a golf club head having a generally hollow interior. The embodiment described in FIGS. 10-17 is well-suited for metal-wood type club heads, especially driver-type club heads, having a hollow interior. The volume of the club head 500 is in the range previously described and, for example, one preferred driver-type head may have a volume typical of metal-wood drivers, such as between about 375 cm$^3$ to 500 cm$^3$.

FIG. 10 further illustrates that the crown 514 includes a crown insert 516, which preferably covers a substantial portion of the crown's surface area as, for example, at least 40%, at least 60%, at least 70% or at least 80% of the crown's surface area. The crown's outer boundary generally terminates where the crown surface undergoes a significant change in radius of curvature as it transitions to the head's sole or face. In one example, the crown insert 516 is set back from the face 502 and has a forwardmost edge that generally extends between the toe and heel and defines a centrally located notch 518 which protrudes toward the face 502. The head further includes a hosel 520 on the heel side to which a golf shaft may be attached.

Figure 12:
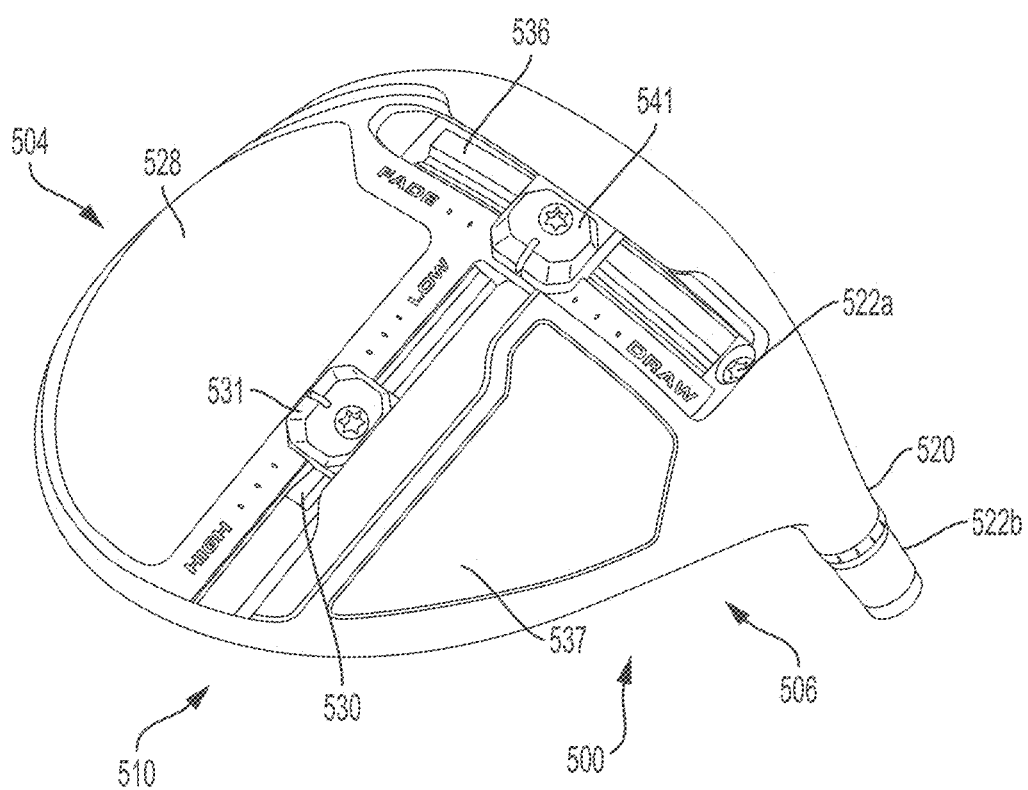
FIG. 12 is a bottom perspective view of the golf club head of FIG. 10 according to some embodiments.

The bottom perspective view of FIG. 12 shows the head in one example having an adjustable FCT component 522a, 522b (hosel insert), as previously described, front-to-back weight track 530, and lateral weight track 536. The weight tracks 530, 536 preferably are an integral part of the frame formed by casting, metal stamping, or other known processes as described above with respect to the frame 24. The frame may be made from materials also described above with reference to frame 24 and other embodiments, but in one preferred embodiment may be made from a metal material or other material which provides a strong framework for the club head in areas of high stress. In contrast with the FIG. 2 embodiment, FIG. 12 illustrates that the sole has a heel-side portion 537 on the heel side of rear weight track 30 which may be an integral (preferably cast) part of the frame.

As described above, the lateral weight track 536 defines a track proximate and generally parallel to the face 502 for mounting one or more one-piece or multi-piece slidable weights 541. The weight(s) may be laterally adjusted in the heel-toe direction to modify the performance characteristics of the head as previously described. Similarly, the weight track 530 defines a front-to-back weight track for mounting one or more one-piece or multi-piece slidable weight(s) 531. The weight(s) 531 may be slidably adjusted fore and aft to shift the CG of the club head in the front-to-rear direction, as previously described, and thereby modify the performance characteristics of the head (especially spin characteristics and height of golf balls launched by the head). FIG. 12 also illustrates that the sole 512 includes a sole insert 528 located on a toe-side of the sole and one side of the weight track 530. The sole insert 528 (as well as the crown insert 516) may be made from a lightweight material as, for example, one of the polymers described above and in one preferred example one of the polysulfone compositions. The sole insert covers a portion of the sole's surface area as, for example, at least 10%, at least 20%, at least 40% or at least 50% of the total sole surface area, and may be located entirely on one side of the weight track 530.

Figure 13:
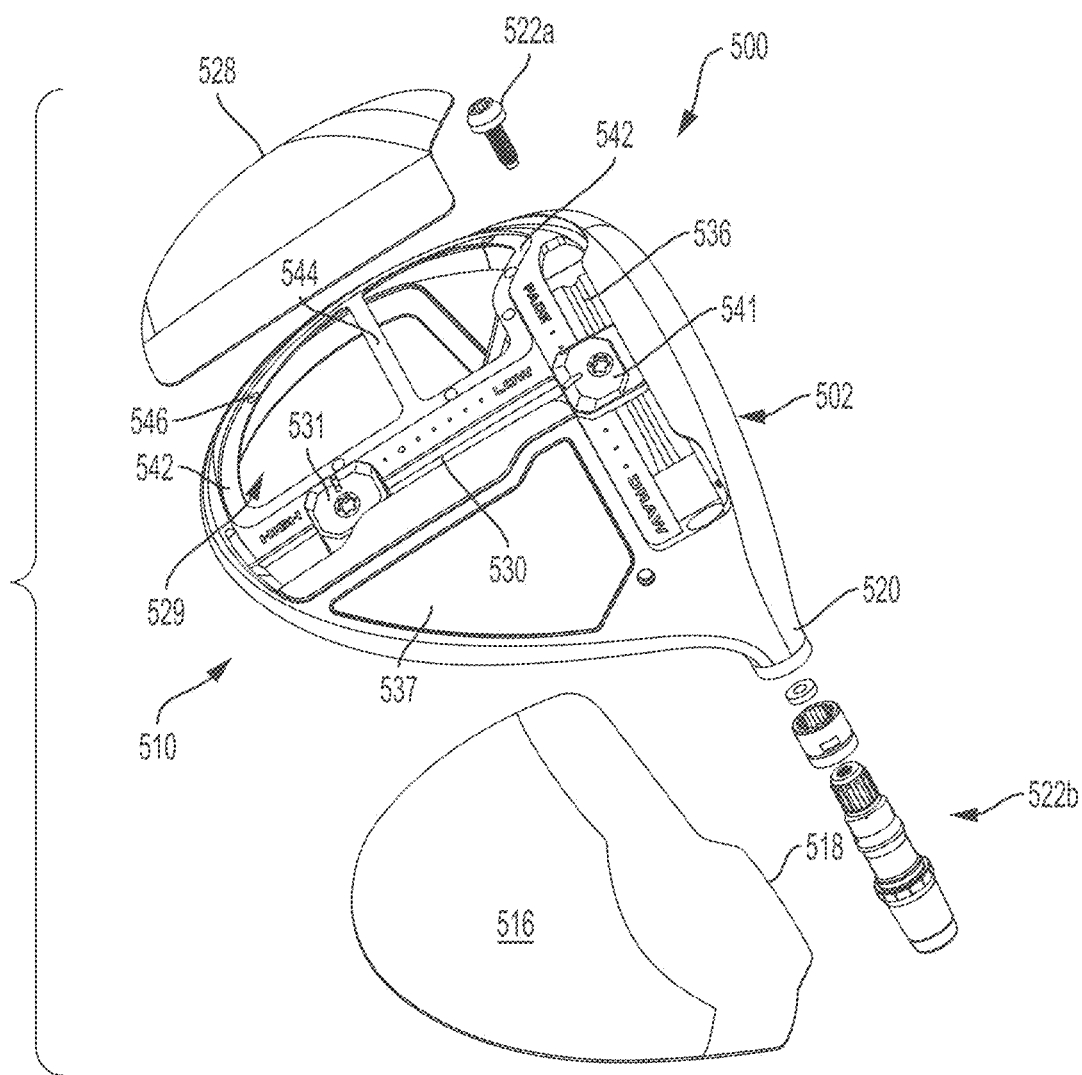
FIG. 13 is a bottom perspective exploded view of the golf club head of FIG. 10 according to some embodiments.

FIG. 13 is an exploded view of the head 500 showing the crown insert 516 and sole insert 528 separated from the frame of the head. The frame provides an opening 529 in the sole which reduces the mass of the head's frame or skeletal support structure. The frame includes a recessed ledge 542 along the periphery of the opening 529, and cross-support 544 to seat and support the sole insert 528. The sole insert 528 has a geometry and size compatible with the opening 529, and may be secured to the frame by adhesion or other secure fastening technique so as to cover the opening 529. The ledge 542 may be provided with indentations 546 along its length to receive matching protrusions or bumps on the underside of the sole insert 528 to further secure and align the sole insert on the frame.

FIG. 13 provides a more detailed illustration of FCT component 522b, which is secured to the hosel 520 by FCT component 522a. Component 522b mounts the golf shaft to the head and may be adjustably rotated to change the orientation of the club head relative to a standard address position of the golf shaft.

Figure 14:
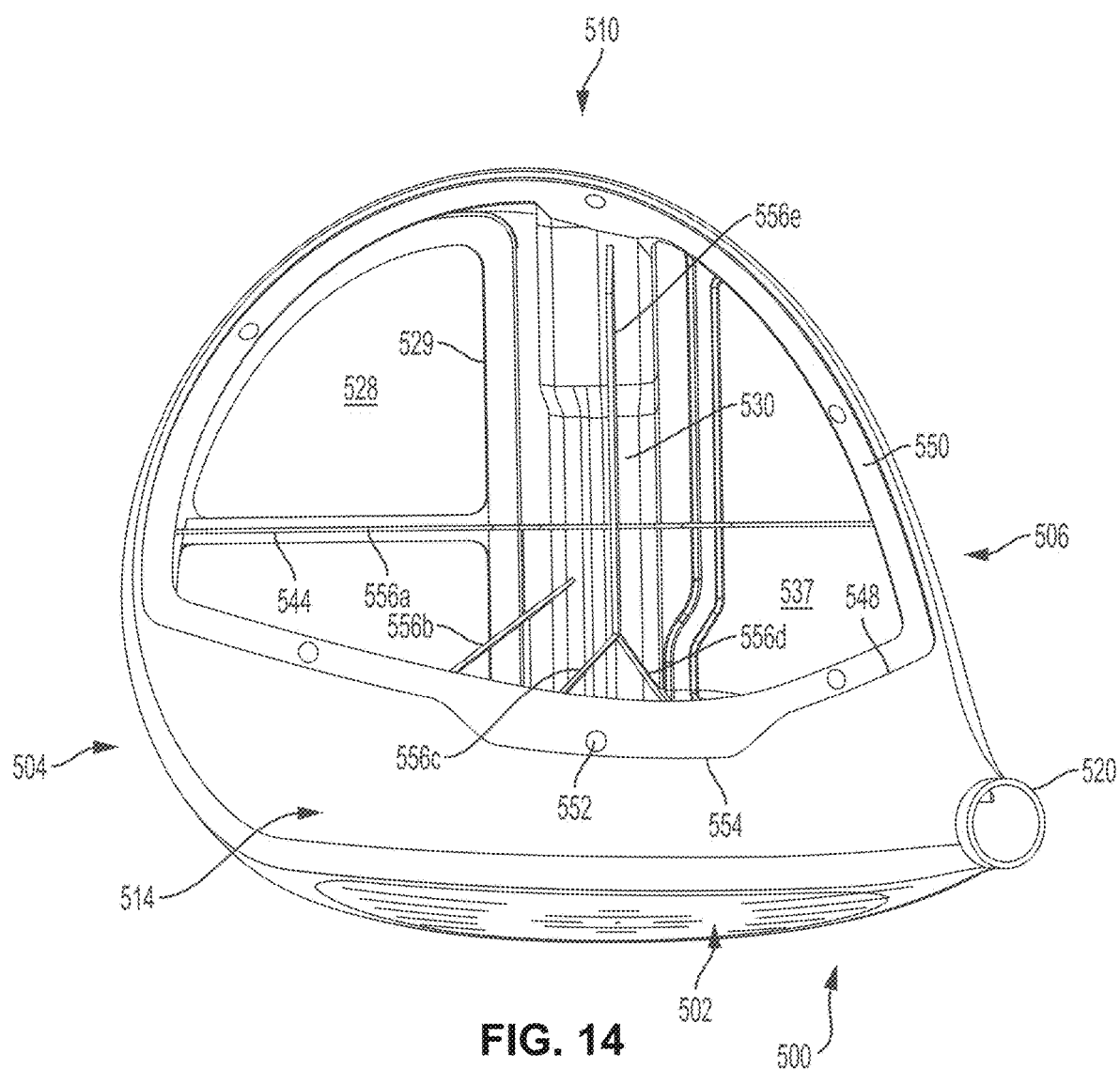
FIG. 14 is a top plan view of the golf club head of FIG. 10, shown with a crown insert removed, according to some embodiments.

FIG. 14 is a top plan view of the head with the crown insert 516 removed, revealing internal structural elements of the head and its frame. Like the sole, the crown also has an opening 548 which reduces the mass of the frame, and more significantly, reduces the mass of the crown, a region of the head where increased mass has the greatest impact on raising (undesirably) the CG of the head. Along the periphery of the opening 548, the frame includes a recessed ledge 550 to seat and support the crown insert 516. The crown insert 516 (not shown in FIG. 28) has a geometry and size compatible with the crown opening 548 and may be secured to the frame by adhesion or other secure fastening technique so as to cover the opening 548. The ledge 550 may be provided with indentations 552 along its length to receive matching protrusions or bumps on the underside of the crown insert to further secure and align the crown insert on the frame. As with the sole insert, the ledge 550 alternately may be provided with protrusions to match indentations provided on the crown insert.

Typically, the ledge 550 may be made from the same metal material (e.g., titanium alloy) as the body and, therefore, can add significant mass to the golf club head 500. In some embodiments, in order to control the mass contribution of the ledge 550 to the golf club head 500, the width of ledge 550 can be adjusted to achieve a desired mass contribution. In some embodiments, if the ledge 550 adds too much mass to the golf club head 500, it can take away from the decreased weight benefits of a crown insert 516 made from a lighter composite material (e.g., carbon fiber or graphite). In some embodiments, the width of the ledge 550 may range from about 3 mm to about 8 mm, preferably from about 4 mm to about 7 mm, and more preferably from about 5.5 mm to about 6.5 mm. In some embodiments, the width of the ledge may be at least four times as wide as a thickness of the crown insert. In some embodiments, the thickness of the ledge 550 may range from about 0.4 mm to about 1 mm, preferably from about 0.5 mm to about 0.8 mm, and more preferably from about 0.6 mm to about 0.7 mm. In some embodiments, the depth of the ledge 550 may range from about 0.5 mm to about 1.75 mm, preferably from about 0.7 mm to about 1.2 mm, and more preferably from about 0.8 mm to about 1.1 mm. Although the ledge 550 may extend or run along the entire interface boundary between the crown insert 516 and the golf club head 500, in alternative embodiments, it may extend only partially along the interface boundary.

The periphery of opening 548 is proximate to and closely tracks the periphery of the crown on the toe-, aft-, and heel-sides of the head. The face-side of the opening 548 preferably is spaced farther from the face 502 (i.e., forward-most region of the head) than the heel-, toe- and aft-sides of the opening are spaced from the skirt of the head. In this way, the head has additional frame mass and reinforcement in the crown area just rearward of the face 502. This area and other areas adjacent to the face along the toe, heel and sole support the face and are subject to the highest impact loads and stresses due to ball strikes on the face. As previously described, the frame may be made of a wide range of materials, including high strength titanium, titanium alloys, or other metals.

The opening 548 has a notch 554 which matingly corresponds to the crown insert notch 518 to help align and seat the crown insert on the crown.

FIG. 14 also illustrates sole insert opening 529, interior surface of sole insert 528, cross support 544, interior surface of front-to-back weight track 530, and interior surface of the heel-side sole portion 537. Various ribs 556a, b, c, d, e, f are shown located in the interior of the head to provide structural reinforcement and acoustic-modifying elements.

Figure 15:
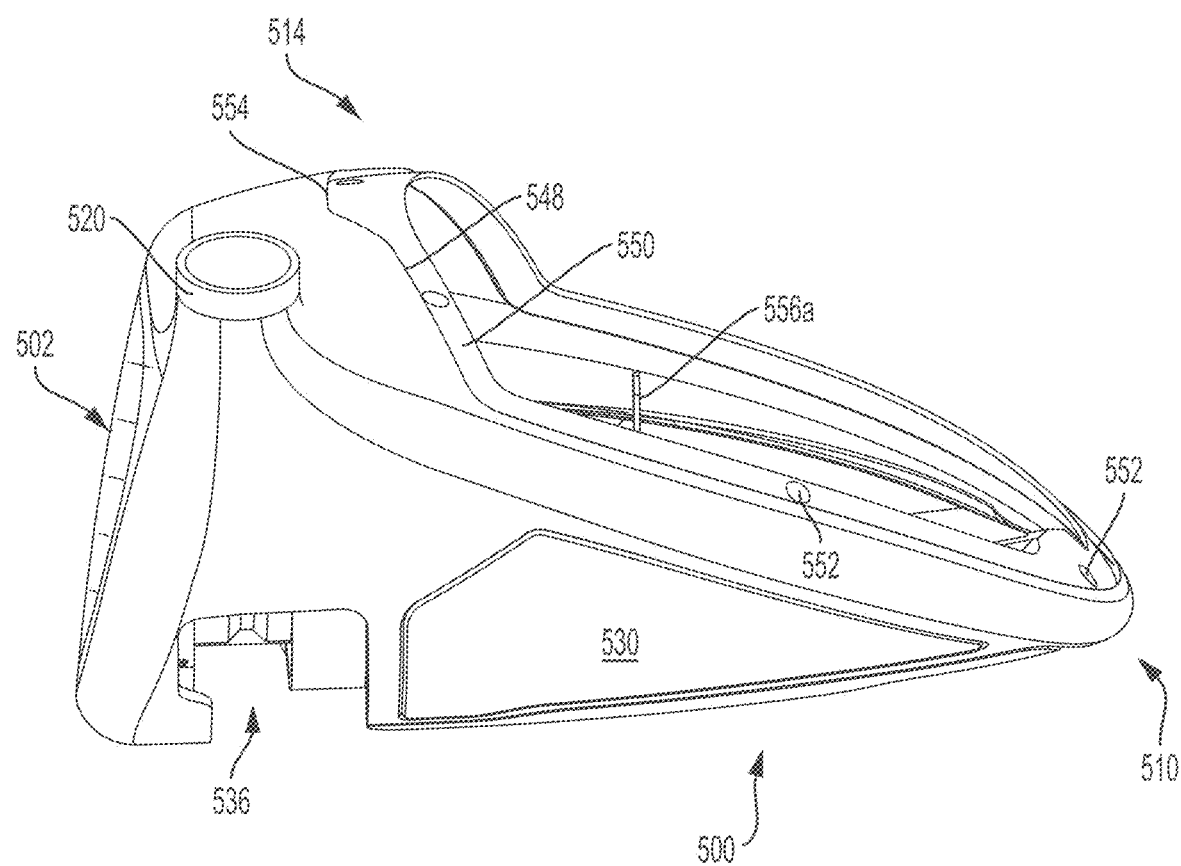
FIG. 15 is a side elevation view of the golf club head of FIG. 10, shown with the crown insert removed, according to some embodiments.

FIG. 15 is a side elevation view with the crown insert removed. It illustrates how the sole wraps upon the heel-side of the head to meet the crown 514 at the skirt interface between the sole and crown. The crown opening 548 is shown encompassing a substantial portion of the surface area of the crown, such as well over 50% of the crown's surface area in the illustrated example.

Figure 16:
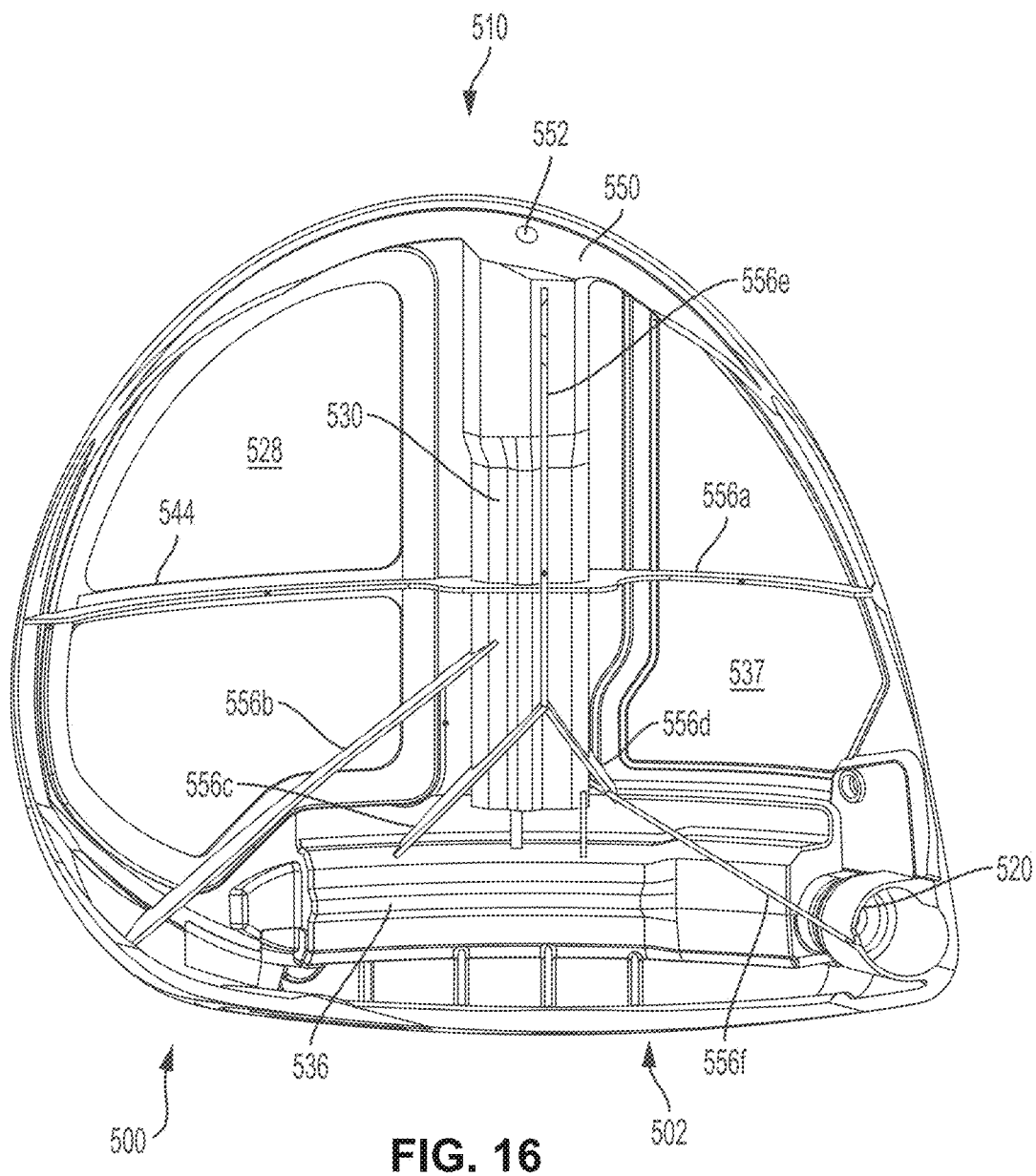
FIG. 16 is a cross-sectional top plan view of the golf club head of FIG. 10 taken along line 16-16 of FIG. 11.

FIG. 16 is a horizontal cross-section of the club, below the level of the crown, showing some of the internal structure apparent in FIG. 14 but in more detail. Cross rib 556 spans the internal width of the head from toe to heel and braces weight track 530. Rib 556e extends in the fore-to-aft direction and may be secured to a top interior surface of weight track 530. Diagonal ribs 556c, d are secured at opposite ends to the weight tracks 530, 536. An additional rib 556f is shown joined to the hosel 520 at one end and to the weight track 530 at the other end.

Figure 17:
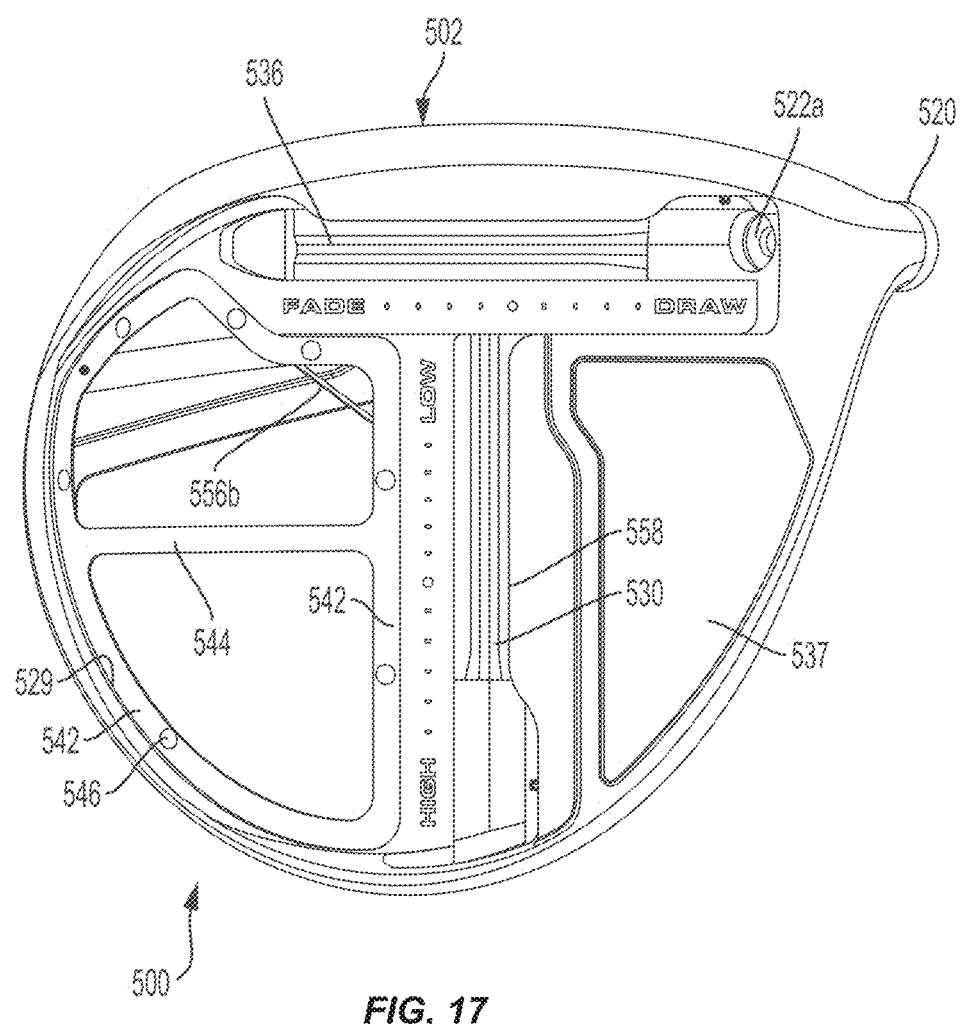
FIG. 17 is a bottom plan view of the golf club head of FIG. 10, shown with a sole insert panel removed, according to some embodiments.

FIG. 17 is a bottom plan view of the head with the sole insert removed. With reference to FIGS. 12 and 17, and explained further below, the sole of the present embodiment is a two tier or drop sole construction, in which one portion of the sole is dropped or raised, depending on perspective, relative to the other portion of the sole. The sole insert 528 on the toe-side of the weight track 530 is raised (when the club head is in the address position) relative to the heel-side portion 537 of the sole. The heel-side portion 537 also can be considered a drop sole part of the sole, since it is dropped or closer to the ground when the club head is in the address position. The heel-side portion 537 has an edge or portion 558 which extends over or overhangs a portion of the weight track 530. Though the front-to-back weight(s) are not shown in FIG. 17, it will be appreciated that the overhang portion 558 helps to capture the weight(s) in the weight track 530 by providing a narrow opening or channel through which the weights may be inserted into or removed from the weight track. At the same time, the weight(s) are free to be slidably moved and re-set in the weight track by loosening and then tightening the adjustment screw (see FIG. 12) which secures the weight(s) to the weight track.

U.S. Patent Application Publication No. 2014/0302946 A1 ('946 App), published Oct. 9, 2014, which is incorporated herein by reference in its entirety, describes a "reference position" similar to the address position used to measure the various parameters discussed throughout this application. The address or reference position is based on the procedures described in the United States Golf Association and R&A Rules Limited, "Procedure for Measuring the Club Head Size of Wood Clubs," Revision 1.0.0, (Nov. 21, 2003). Unless otherwise indicated, all parameters are specified with the club head in the reference position.

Figure 45:
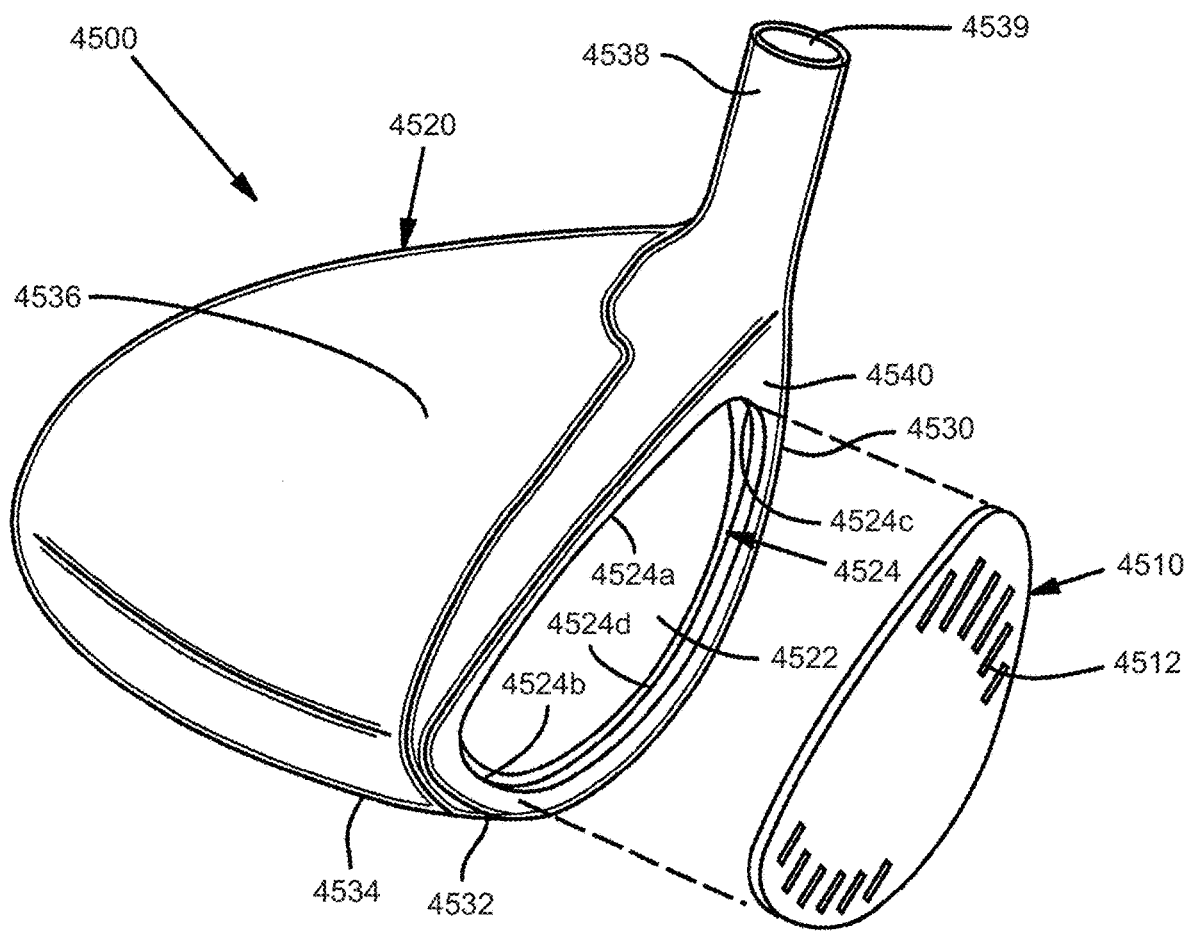
FIG. 45 is a metal-wood club head according to some embodiments.

FIG. 45 shows a metal-wood club head 4500 including face insert 4510 (also called a ace plate, strike plate, or striking plate) according to some embodiments. Face insert 4500 may be convex, and has an external outer ("striking") surface (face) 4512. Club head 4500 also includes a body 4520 that defines a front opening 4522. A face support 4524 is disposed about front opening 4522 for positioning and holding face insert 4510 to body 4520. Body 4520 also has a heel 4530, a toe 4532, a sole 4534, a top or crown 4536, and a hosel 4538. Around front opening 4522 is a "transition zone" 4540 that extends along the respective forward edges of heel 4530, toe 4532, sole 4534, and crown 4536. Transition zone 4540 effectively is a transition from body 4520 to face insert 4510. Face support 4524 may include a lip or rim that extends around front opening 4522 and is recessed relative to transition zone 4540 as shown. Hosel 4538 defines an opening 4539 that receives a distal end of a club shaft (e.g., shaft 102). Opening 4522 receives face insert 4510, which rests upon and is bonded to face support 4524 and transition zone 4540, thereby enclosing front opening 4522. Transition zone 4540 may include a sole-lip region 4524d, a crown-lip region 4524a, a heel-lip region 4524c, and a toe-lip region 4524b. These portions may be contiguous, or can be discontinuous, with spaces between them.

In some embodiments, at least a portion of face insert 4510 may be made of a composite including multiple plies or layers of a fibrous material (e.g., graphite, or carbon, fiber) embedded in a cured resin (e.g., epoxy). For example, face insert 4510 may include a composite component (e.g., component 4600 shown in FIGS. 46-48) that has an outer polymeric layer forming striking surface 4512. Examples of suitable polymers that can be used to form the outer coating, or cap, are described in detail below. Alternatively, face insert 4510 may have an outer metallic cap forming external striking surface 4512 of face insert 4510, as described in U.S. Pat. No. 7,267,620, which is incorporated herein in its entirety by reference thereto. In some embodiments, face insert 4510 may be a face insert as described in U.S. Pat. No. 8,682,434, issued on Jan. 14, 2014, which is incorporated herein in its entirety by reference thereto.

An exemplary thickness range of the composite portion of the face plate is 7.0 mm or less. In some embodiments the thickness of the face plate may be in the range of 7.0 mm to 4.0 mm. In some embodiments, the thickness of the face plate may be 5.0 mm+/−1.0 mm. In some embodiments, the thickness of the face plate may be 3.0 mm-6.0 mm at a center region and 1.0 mm-4.0 mm at the peripheral edge of the face plate. In some embodiments, the thickness of the face plate may be 4.0 mm-5.0 mm at a center region and 2.0 mm-3.0 mm at the peripheral edge of the face plate. The composite desirably is configured to have a relatively consistent distribution of reinforcement fibers across a cross-section of its thickness to facilitate efficient distribution of impact forces and overall durability. In addition, the thickness of face insert 4510 may be varied in certain areas to achieve different performance characteristics and/or improve the durability of club head 4500. For example, in some embodiments, the thickness of the face plate may be 3.0 mm-6.0 mm at a center region and 1.0 mm-4.0 mm at the peripheral edge of the face plate. As another example, in some embodiments, the thickness of the face plate may be 4.0 mm-5.0 mm at a center region and 2.0 mm-3.0 mm at the peripheral edge of the face plate. Face insert 4510 may be formed with any of various cross-sectional profiles, depending on club head's 4500 desired durability and overall performance, by selectively placing multiple strips of composite material in a predetermined manner in a composite lay-up to form a desired profile.

Attaching face insert 4510 to face support 4524 of club head body 4520 may be achieved using an appropriate adhesive (typically an epoxy adhesive or a film adhesive). To prevent peel and delamination failure at the junction of an all-composite face plate with the body of the club-head, the composite face plate can be recessed from or can be substantially flush with the plane of the forward surface of the metal body at the junction. Desirably, face insert 4510 is sufficiently recessed so that the ends of the reinforcing fibers in the composite component are not exposed.

The composite portion of face insert 4510 is made as a lay-up of multiple prepreg plies. For the plies the fiber reinforcement and resin are selected in view of the club-head's desired durability and overall performance. In order to vary the thickness of the lay-up, some of the prepreg plies comprise elongated strips of prepreg material arranged in one or more sets of strips. The strips in each set are arranged in a criss-cross, overlapping pattern so as to add thickness to the composite lay-up in the region where the strips overlap each other, as further described in greater detail below. The strips desirably extend continuously across the finished composite part; that is, the ends of the strips are at the peripheral edge of the finished composite part. In this manner, the longitudinally extending reinforcing fibers of the strips also can extend continuously across the finished composite part such that the ends of the fibers are at the periphery of the part. Consequently, during the curing process, defects can be shifted toward a peripheral sacrificial portion of the composite lay-up, which sacrificial portion subsequently can be removed to provide a finished part with little or no defects. Moreover, the durability of the finished part is increased because the free ends of the fibers are at the periphery of the finished part, away from the impact zone.

In tests involving certain club head configurations, composite portions formed of prepreg plies having a relatively low fiber areal weight (FAW) have been found to provide superior attributes in several areas, such as impact resistance, durability, and overall club performance. (FAW is the weight of the fiber portion of a given quantity of prepreg, in units of $g/m^2$.) FAW values below 100 $g/m^2$, and more desirably below 70 $g/m^2$, can be particularly effective. A particularly suitable fibrous material for use in making prepreg plies is carbon fiber. More than one fibrous material can be used. In some embodiments, prepreg plies having FAW values above 100 $g/m^2$ may be used.

In particular embodiments, multiple low-FAW prepreg plies can be stacked and still have a relatively uniform distribution of fiber across the thickness of the stacked plies. In contrast, at comparable resin-content (R/C, in units of percent) levels, stacked plies of prepreg materials having a higher FAW tend to have more significant resin-rich regions, particularly at the interfaces of adjacent plies, than stacked plies of low-FAW materials. Resin-rich regions tend to reduce the efficacy of the fiber reinforcement, particularly since the force resulting from golf-ball impact is generally transverse to the orientation of the fibers of the fiber reinforcement.

Figure 48:
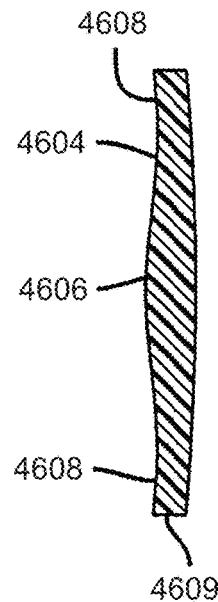
FIG. 48 is a cross-sectional view of the composite component of FIG. 46 taken along the line 48-48 in FIG. 46.
Figure 46:
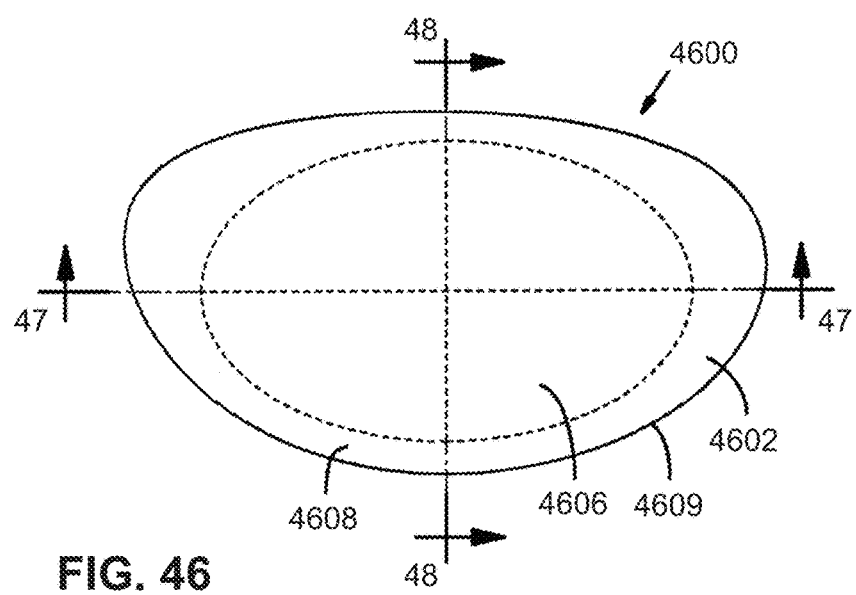
FIG. 46 is a composite component for a sole insert according to some embodiments.
Figure 47:
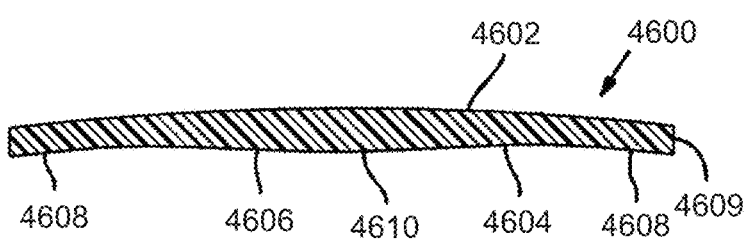
FIG. 47 is cross-sectional view of the composite component of FIG. 46 taken along the line 47-47 in FIG. 46.

FIGS. 46-48 show an exemplary embodiment of a finished composite component 4600 that is fabricated from a plurality of prepreg plies or layers and has a desired shape and size for use as a face insert for a club head (e.g., club heads 10, 500, or 4500) or as part of a face plate for a club head (e.g., club heads 10, 500, or 4500). Composite component 4600 has a front surface 4602 and a rear surface 4604. In this example, composite component 4600 has an overall convex shape, a central region 4606 of increased thickness, and a peripheral region 4608 having a relatively reduced thickness extending around central region 4606. Central region 4606 in the illustrated example is in the form of a projection or cone on rear surface 4604 having its thickest portion at a central point 4610 (FIG. 47) and gradually tapering away from the point in all directions toward peripheral region 4608. Central point 4610 represent the approximate center of the "sweet spot" (optimal strike zone) of a face insert (e.g., face insert 4510), but not necessarily the geometric center of the face insert. Thicker central region 4606 adds rigidity to central region 4606 of a face insert, which effectively provides a more consistent deflection across the face insert. In certain embodiments, central region 4606 has a thickness of about 5 mm to about 7 mm and peripheral region 4608 has a thickness of about 4 mm to about 5 mm.

Figure 49:
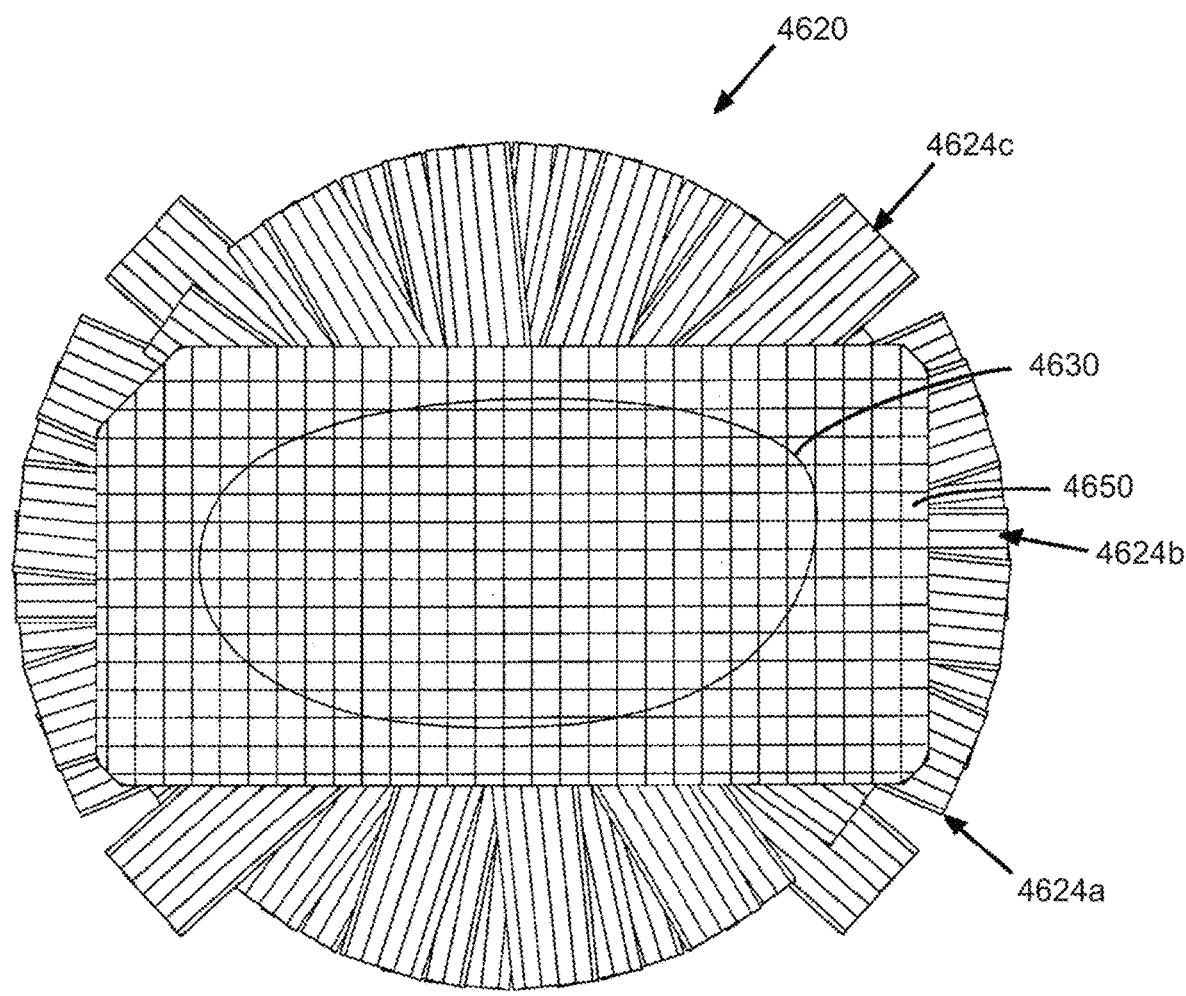
FIG. 49 is a top plan view of a composite lay-up according to some embodiments.
Figure 50:
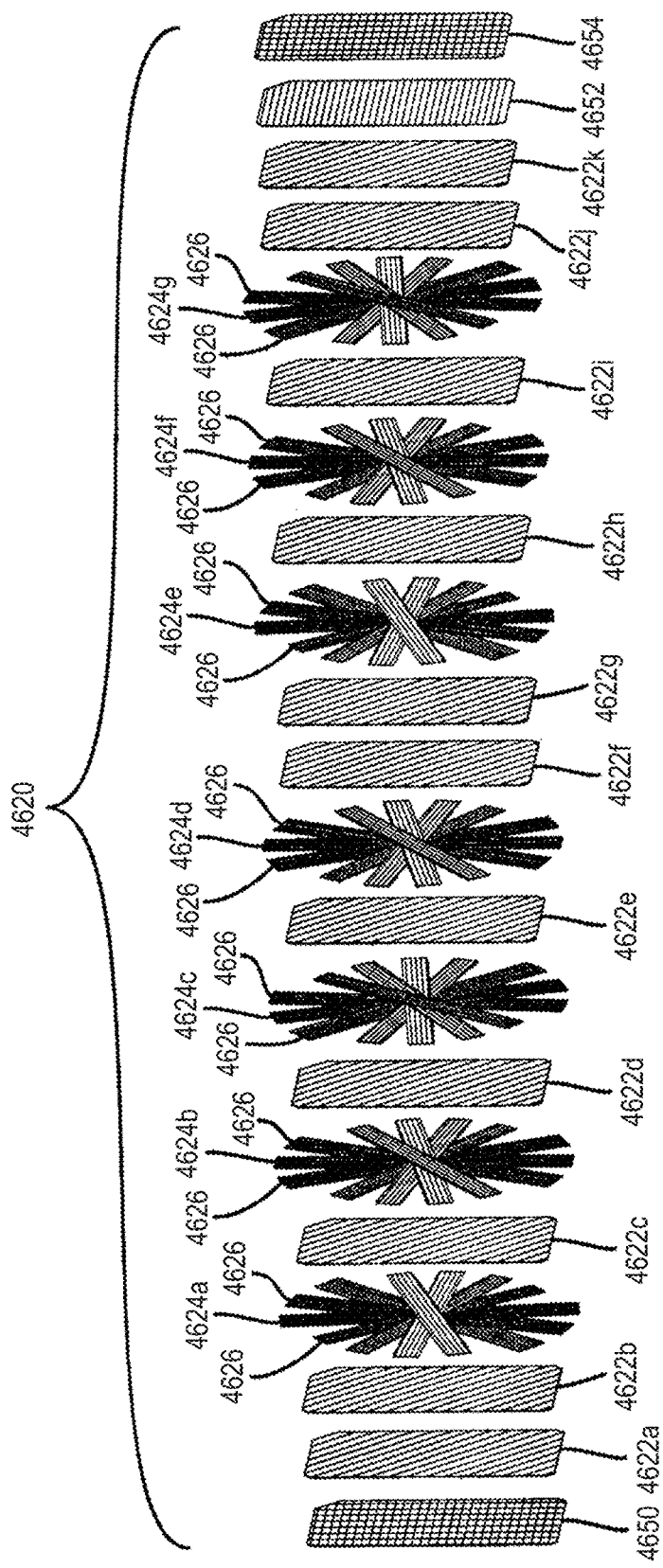
FIG. 50 is an exploded view of a composite lay-up according to some embodiments.

In certain embodiments, composite component 4600 may be fabricated by first forming an oversized lay-up of multiple prepreg plies, and then machining a sacrificial portion from the cured lay-up to form the finished part. FIG. 49 is a top plan view of one example of a lay-up 4620 from which composite component 4600 may be formed. The line 4630 in FIG. 49 represents the outline of composite component 4600. Once cured, the portion surrounding line 4630 can be removed to form composite component 4600. FIG. 50 is an exploded view of lay-up 4620. In lay-up 4620, each prepreg ply desirably has a prescribed fiber orientation, and the plies are stacked in a prescribed order with respect to fiber orientation. In some embodiments, lay-up 4620 may define all or a portion of the non-woven composite layer 2210 or 2310 in layered structures 2200 and 2300, respectively.

As shown in FIG. 50, lay-up 4620 includes a plurality of sets, or unit-groups, 4622a-4622k of one or more prepreg plies of substantially uniform thickness and one or more sets, or unit-groups, 4624a-4624g of individual plies in the form of elongated strips 4646. For purposes of description, each set 4622a-4622k of one or more plies can be referred to as a composite "panel" and each set 4624a-4624g can be referred to as a "cluster" of elongated strips. Clusters 4624a-4624g of elongated strips 4626 are interposed between the panels 4622a-4622k and serve to increase the thickness of composite component 4600 at its central region 4606. Each panel 4622a-4622k includes one or more individual prepreg plies having a desired fiber orientation. The individual plies forming each panel 4622a-4622k desirably are of sufficient size and shape to form a cured lay-up from which the smaller composite component 4600 can be formed substantially free of defects. Clusters 4624a-4624g of strips 4626 desirably are individually positioned between and sandwiched by two adjacent panels (i.e., panels 4622a-4622k separate clusters 4624a-4624g of strips from each other) to facilitate adhesion between the many layers of prepreg material and provide an efficient distribution of fibers across a cross-section of composite component 4600.

In some embodiments, the number of panels 4622a-4622k can range from 9 to 14 (with eleven panels 4622a-4622k being used in the illustrated embodiment) and the number of clusters 4624a-4624g can range from 1 to 12 (with seven clusters 4624a-4624g being used in the illustrated embodiment). However, in some embodiments, the number of panels and clusters can be varied depending on the desired profile and thickness of component 4600.

The prepreg plies used to form the panels 4622a-4622k and clusters 4624a-4624g desirably comprise carbon fibers impregnated with a suitable resin, such as epoxy. An example carbon fiber is "34-700" carbon fiber (available from Grafil, Sacramento, Calif.), having a tensile modulus of 234 Gpa (34 Msi) and a tensile strength of 4500 Mpa (650 Ksi). Another Grafil fiber that can be used is "TR50S" carbon fiber, which has a tensile modulus of 240 Gpa (35 Msi) and a tensile strength of 4900 Mpa (710 ksi). Suitable epoxy resins are types "301" and "350" (available from Newport Adhesives and Composites, Irvine, Calif.). An exemplary resin content (R/C) is 40%.

Figure 51:
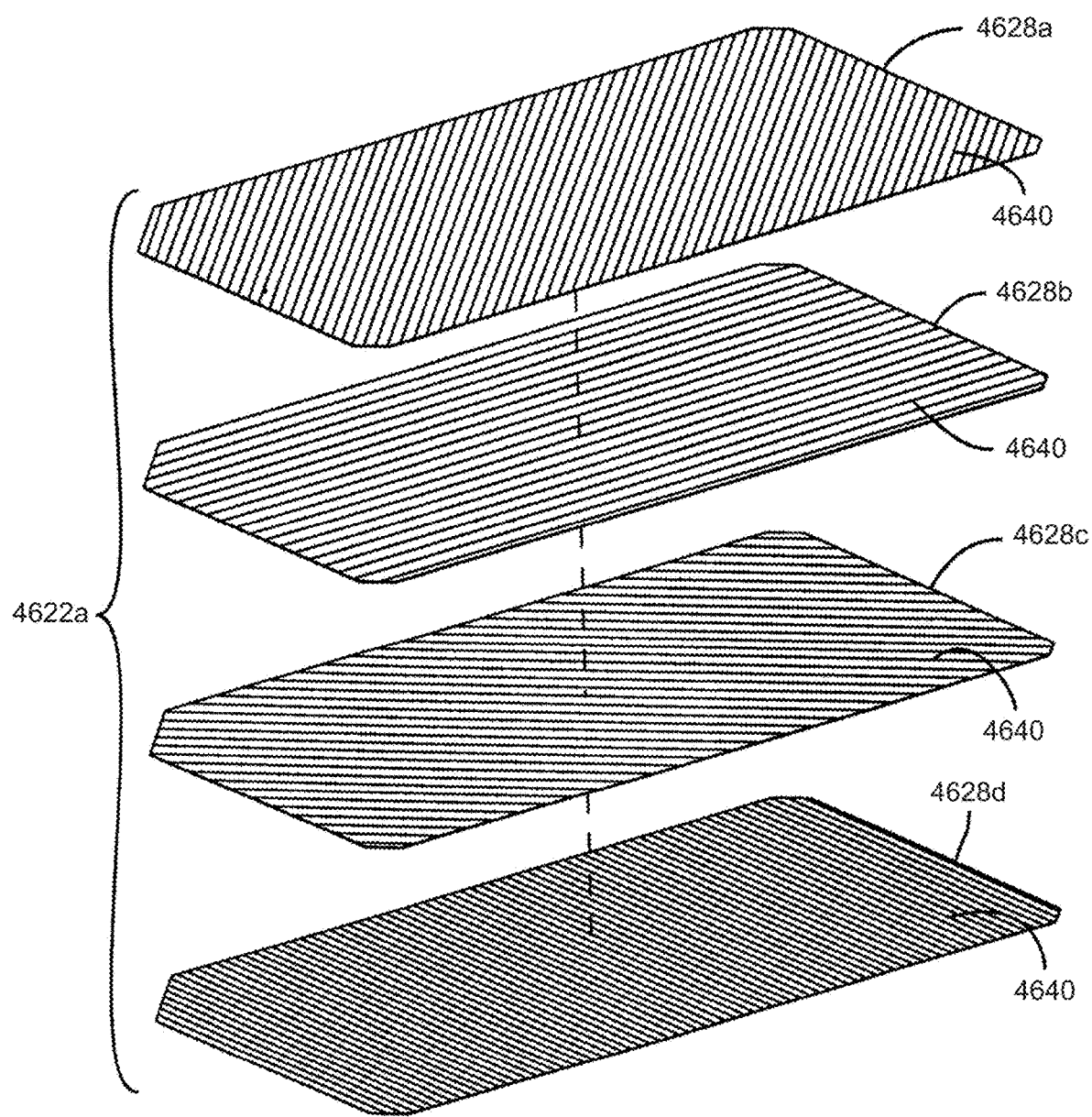
FIG. 51 is an exploded view of a composite panel according to some embodiments.

FIG. 51 is an exploded view of first panel 4622a. For convenience of reference, the fiber orientation (indicated by lines 4640) of each ply is measured from a horizontal axis of a club head's face plane to a line that is substantially parallel with the fibers in the ply. As shown in FIG. 51, panel 4622a in the illustrated example comprises a first ply 4628a having fibers oriented at +45 degrees, a second ply 4628b having fibers oriented at 0 degrees, a third ply 4628c having fibers oriented at −45 degrees, and a fourth ply 4628d having fibers oriented at 90 degrees. Panel 4622a of plies 4628a-4628d thus form a "quasi-isotropic" panel of prepreg material. In some embodiments, the remaining panels 4622b-4622k can have the same number of prepreg plies and fiber orientation as panel 4622a. In some embodiments, the remaining panels 4622b-4622k can have the a different number of prepreg plies and/or fiber orientation as panel 4622a.

In some embodiments, lay-up 4620 may include an outermost fiberglass ply 4650 adjacent to first panel 4622a, a single carbon-fiber ply 4652 adjacent eleventh and last panel 4622k, and an innermost fiberglass ply 4654 adjacent single ply 4652. In some embodiments, single ply 4652 can have a fiber orientation of 90 degrees. In some embodiments, fiberglass plies 4650, 4654 can have fibers oriented at 0 degrees and 90 degrees. Fiberglass plies 4650/4654 are essentially provided as sacrificial layers that protect the carbon-fiber plies when cured lay-up 4620 is subjected to surface finishing such as sand blasting to smooth the outer surfaces of the part. Fiberglass plies 4650/4654 may be referred to as scrim layers.

Figure 52:
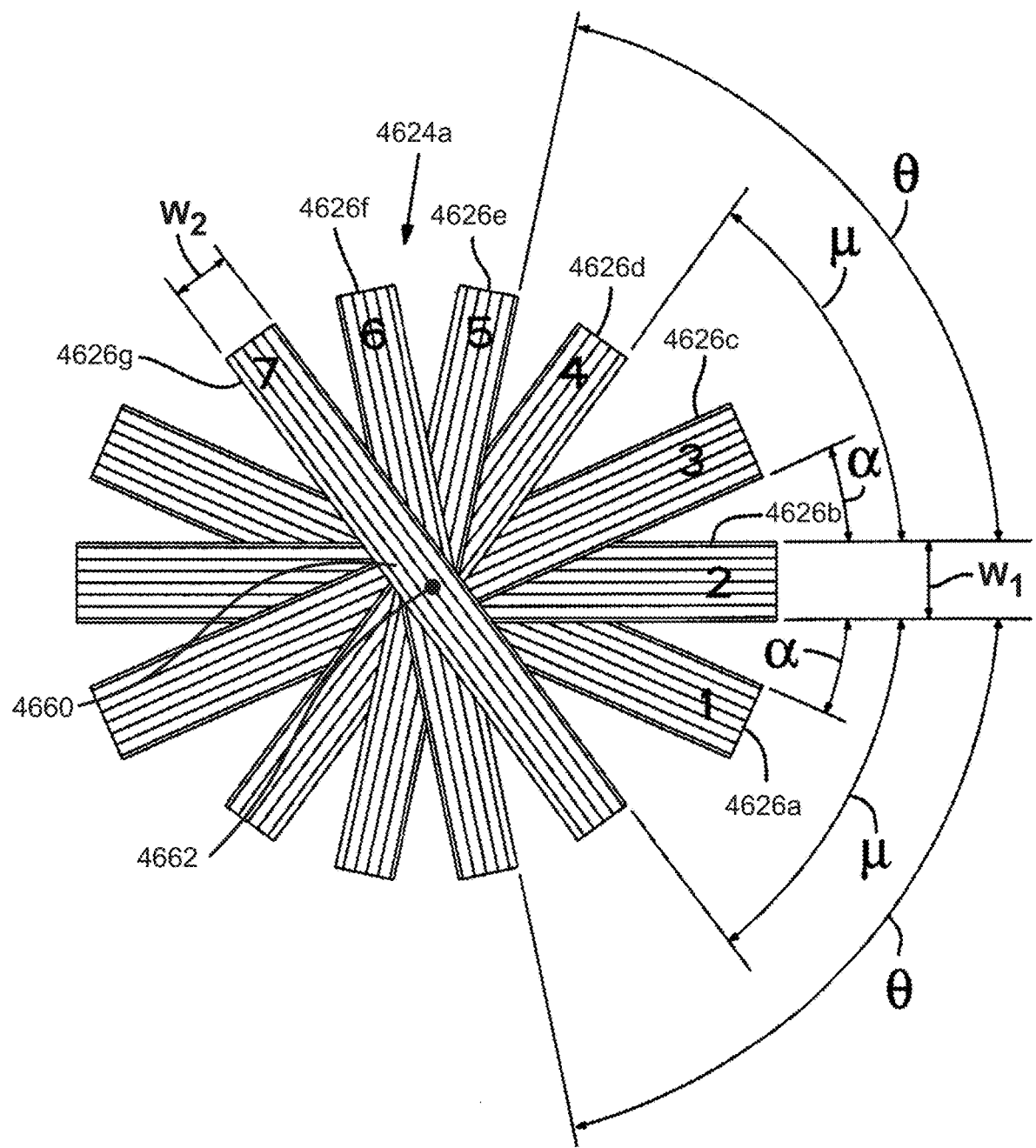
FIG. 52 is a cluster of composite strips for a lay-up according to some embodiments.

FIG. 52 is an enlarged plan view of first cluster 4624a of elongated prepreg strips which are arranged with respect to each other so that the cluster has a variable thickness. Cluster 4624a in the illustrated example includes a first strip 4626a, a second strip 4626b, a third strip 4626c, a fourth strip 4626d, a fifth strip 4626e, a sixth strip 4626f, and a seventh strip 4626g. The strips are stacked in a criss-cross pattern such that the strips overlap each other to define an overlapping region 4660 and the ends of each strip are angularly spaced from adjacent ends of another strip. Cluster 4624a is therefore thicker at the overlapping region 4660 than it is at the ends of the strips. The strips can have the same or different lengths and widths, which can be varied depending on the desired overall shape of composite component 4600, although each strip desirably is long enough to extend continuously across the composite component 4600 that is cut or otherwise machined from the oversized lay-up.

Strips 4626a-4626g may be of equal length and may be arranged such that the geometric center point 4662 of cluster 4624a corresponds to the center of each strip. In some embodiments, the first three strips 4626a-4626c may have a width $w_1$ that is greater than the width $w_2$ of the last four strips 56d-56g. The strips define an angle α between the horizontal edges of the second strip 4626b and the adjacent edges of strips 4626a and 4626c, an angle μ between the edges of strip 4626b and the closest edges of strips 4626d and 4626g, and an angle θ between the edges of strip 4626b and the closest edges of strips 4626e and 4626f. In some embodiments, width $w_1$ may be about 20 mm, the width $w_2$ may be about 15 mm, the angle α may be about 24 degrees, the angle μ may be about 54 degrees, and the angle θ may be about 78 degrees.

Referring again to FIG. 50, each cluster 4624a-4624g desirably is rotated slightly or angularly offset with respect to an adjacent cluster so that the end portions of each strip in a cluster are not aligned with the end portions of the strips of an adjacent cluster. In this manner, the clusters can be arranged relative to each other in lay-up 4620 to provide a substantially uniform thickness in the peripheral region 4608 of composite component 4600. In some embodiments, first cluster 4624a may have an orientation of −18 degrees, meaning that the "upper" edge of second strip 4626b extends at a −18 degree angle with respect to the "upper" horizontal edge of the adjacent unit-group 4622c. The next successive cluster 4624b has an orientation of 0 degrees, meaning that second strip 4626b is parallel to the "upper" horizontal edge of the adjacent unit-group 4622d. The next successive cluster 4624c has an orientation of +18 degrees, meaning that the "lower" edge of the respective second strip 4626b of cluster 4624c extends at a +18 degree angle with respect to the "lower" edge of the adjacent unit-group 4622e. Clusters 4624d, 4624e, 4624f, and 4624g can have an orientation of 0 degrees, −18 degrees, 0 degrees, and +18 degrees, respectively.

When stacked in lay-up 4620, the overlapping regions 4660 of the clusters are aligned in the direction of the thickness of lay-up 4620 to increase the thickness of central region 4606 of composite component 4600, while the "spokes" (the strips 4626a-46256g) are "fanned" or angularly spaced from each other within each cluster and with respect to spokes in adjacent clusters. Prior to curing/molding, lay-up 4620 has a cross-sectional profile that is similar to composite component 4600 except that lay-up 4620 is flat, that is, lay-up 4620 does not have an overall convex shape. Thus, in profile, the rear surface of lay-up 4620 has a central region of increased thickness and gradually tapers to a relatively thinner peripheral region of substantially uniform thickness surrounding the central region. In some embodiments, lay-up 4620 has a thickness of about 5 mm at the center of central region 4606 and a thickness of about 3 mm at peripheral region 4608. A greater or fewer number of panels and/or clusters of strips can be used to vary the thickness at the central region and/or peripheral region of lay-up 4620.

To form lay-up 4620, according to one specific approach, formation of panels 4622a-4622k may be done first by stacking individual precut, prepreg plies 4628a-4628d of each panel. After the panels are formed, lay-up 4620 is built up by laying second panel 4622b on top of the first panel 4622a, and then forming first cluster 4624a on top of second panel 4622b by laying individual strips 4626a-4626g in the prescribed manner. Remaining panels 4622c-4622k and clusters 4624b-4624g are then added to lay-up 4620 in the sequence shown in FIG. 50, followed by single ply 4652. Fiberglass plies 4650/4654 can then be added to the front and back of lay-up 4620.

The fully-formed lay-up 4620 can then be subjected to a "debulking" or compaction step (e.g., using a vacuum table)

to remove and/or reduce air trapped between plies. Lay-up 4620 can then be cured in a mold that is shaped to provide the desired bulge and roll of a face insert. Alternatively, any desired bulge and roll of a face insert may be formed during one or more debulking or compaction steps performed prior to curing. To form the bulge or roll, the debulking step can be performed against a die panel having the final desired bulge and roll. In either case, following curing, the cured lay-up 4620 is removed from the mold and machined to form composite component 4600.

In some embodiments, face insert 4510 may be composed of a composite material including one or more layers/plies that include metallic coated fibers embedded in a matrix material. In some embodiments, face insert 4510 may be composed of a composite material including one or more layers/plies that include color coated fibers embedded in a matrix material. In some embodiments, the color coating on the fibers may be a metallic color coating. In some embodiments, the fibers may be carbon fibers fiberglass fibers, or polymer based fibers (e.g., aramid fibers, such as Kevlar® fibers, or polyester fibers, such as Mylar® fibers). In embodiments including color coated fibers, the color coating may be a different color than the color of the fibers themselves. In some embodiments, the color/metallic coated fibers may be unidirectional fibers embedded within a matrix material. In some embodiments, the color/metallic coated fibers may be fibers woven in a pattern and embedded within a matrix material. In some embodiments, color/metallic fibers woven in a pattern may not be embedded within a matrix material and may be bonded (e.g., adhesively bonded) to other layers in a layered structure.

Using the color coated fibers and methods discussed herein, customized golf clubs may be manufactured based on a consumer's preferences. For example, a golf club head may be constructed with a customized crown insert, one or more customized sole inserts, and/or a customized face insert. As another example, a golf club shaft may customized based on consumer's preferences. When customizing a club head or club shaft, visual features of the golf club head or shaft that may be customized include, but are not limited to, alignment features, logos, brand names, product names, and aesthetic patterns. Visual characteristics of the visual features that may be customized include, but are not limited to, the color(s), the location, and the size of the visual features.

In some embodiments, a consumer may visit a website to create or select a customized golf club. In some embodiments, the website may include a "login" feature. The "login" feature may allow a server to associate a particular session at the website with a particular consumer. That is, the login feature may allow a consumer to identify himself or herself to the server for the duration of a session using the website. In some embodiments, the server may associate information obtained from a particular consumer during the session and store the information in a database so that it can later be associated with the consumer during subsequent sessions at the website. Data associated and saved for a consumer's account may include, but is not limited to, previous builds, established measurements, and personal information (e.g., height, gender, and handedness). In some embodiments, the login feature may prompt a consumer to input a name and password and submit this information to the server. In some embodiments, the website may provide a consumer with the option of creating a new account or proceeding as a "guest."

In order to customize a product, such as a golf club head, a consumer may activate a build command button on the website. After activating the build command button, the server provides the consumer's computer device with a web page including various command buttons corresponding to various products that may be customized. In response to activation of one of these command buttons, the server then acts (using, e.g., a Java Server Pages technique) to search a database for all of the image/link combinations corresponding to a selected product. When these image/link combinations have been identified, the server causes the web page to display some or all of these image/link combinations.

An image/link combination can provide a variety of information to the consumer. For example, an image/link combination can provide a user with the name of the product, an image of the product, and a price to have the product custom-manufactured. The consumer may employ the web page to review various products to be custom-manufactured.

After the consumer selects a product (e.g., a club head) to have custom-manufactured, a build process page may be displayed. The build process page may include an image component for receiving selection or characteristic information from a consumer and then displaying an image based upon that information. For example, when the consumer activates an image/link combination to select a product for custom-manufacturing, the server provides this information to the component, which then creates or retrieves an image corresponding to the selected product. This image is then incorporated into the version of the web page delivered to the consumer in response to the consumer's activation of the image/link combination to select the product. In some embodiments, the component may operate using, e.g., Java Script Pages techniques or other similar technique known in the art.

A build process page may include one or more step or characteristic components. Each step or characteristic component may correspond to an attribute or characteristic of the item that can be designated by the consumer. For example, one step or characteristic component may be for designating the base color of the product to be custom-manufactured and/or the primary accent color of the product to be custom-manufactured. Based upon the product selected by the consumer, the step or characteristic component may create or retrieve an image showing the base colors or color combinations that are available for that particular product. This image is then also incorporated into the version of the web page delivered to the consumer in response to the consumer's selection of the product.

Various step or characteristic components that may be included on the webpage include, but are not limited to, a component for designating the dominant hand of the consumer, a component for designating a design for a name, logo, or slogan of a golf club, a component for designating text to be displayed on the golf club, a component for designating a pattern (e.g., a weave pattern) on a golf club, a component for designating a design for an alignment feature on a golf club, a component for selecting the location of a pattern, logo, slogan, text, or alignment feature, a component for selecting the size of a pattern, logo, slogan, text, or alignment feature, and a component for selecting the color of a pattern, logo, slogan, text, or alignment feature. Each time the consumer makes a selection via a step or characteristic component, the web page may be refreshed to include a new image file showing customized product.

Once the consumer has designated all of the customizable characteristics for the product (e.g., golf club head), the consumer may review the characteristics he or she has selected by activating a link entitled, for example, "review" or "inspect." When this link is activated, the server provides the consumer's computer with an inspection web page. If the consumer is satisfied with his or her selections, and decides to purchase the product, then the consumer may activate a link to add the build to the consumer's shopping cart. In response, the server may provide the consumer's computer device with a web page that includes an image of the customized product and a message indicating to the consumer when he or she can expect to receive the item if it is purchased. Finally, the webpage may provide the consumer with the option of activating a link to purchase the customized product.

FIG. 55 illustrates an exemplary computer system 5500 in which embodiments, or portions thereof, may be implemented as computer-readable code. For example, customizing one or more golf club components to a consumers' preferences may be implemented in computer system 5500 using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the inventions may be implemented in terms of this example computer system 5500. After reading this description, it will become apparent to a person skilled in the relevant art how to implement one or more of the inventions using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 5504 may be a special purpose or a general purpose processor device. As will be appreciated by persons skilled in the relevant art, processor device 5504 may also be a single processor in a multi-core/multiprocessor system, such system operating alone, or in a cluster of computing devices operating in a cluster or server farm. Processor device 5504 is connected to a communication infrastructure 5506, for example, a bus, message queue, network, or multi-core message-passing scheme.

Computer system 5500 also includes a main memory 5508, for example, random access memory (RAM), and may also include a secondary memory 5510. Secondary memory 5510 may include, for example, a hard disk drive 5512, or removable storage drive 5514. Removable storage drive 5514 may include a floppy disk drive, a magnetic tape drive, an optical disk drive, a flash memory, a Universal Serial Bus (USB) drive, or the like. The removable storage drive 5514 reads from and/or writes to a removable storage unit 5518 in a well-known manner. Removable storage unit 5518 may include a floppy disk, magnetic tape, optical disk, etc. which is read by and written to by removable storage drive 5514. As will be appreciated by persons skilled in the relevant art, removable storage unit 5518 includes a computer usable storage medium having stored therein computer software and/or data.

Computer system 5500 (optionally) includes a display interface 5502 (which can include input and output devices such as keyboards, mice, etc.) that forwards graphics, text, and other data from communication infrastructure 5506 (or from a frame buffer not shown) for display on display unit 5530.

In alternative implementations, secondary memory 5510 may include other similar means for allowing computer programs or other instructions to be loaded into computer system 5500. Such means may include, for example, a removable storage unit 5522 and an interface 5520. Examples of such means may include a program cartridge and cartridge interface (such as that found in video game devices), a removable memory chip (such as an EPROM, or PROM) and associated socket, and other removable storage units 5522 and interfaces 5520 which allow software and data to be transferred from the removable storage unit 5522 to computer system 5500.

Computer system 5500 may also include a communication interface 5524. Communication interface 5524 allows software and data to be transferred between computer system 5500 and external devices. Communication interface 5524 may include a modem, a network interface (such as an Ethernet card), a communication port, a PCMCIA slot and card, or the like. Software and data transferred via communication interface 5524 may be in the form of signals, which may be electronic, electromagnetic, optical, or other signals capable of being received by communication interface 5524. These signals may be provided to communication interface 5524 via a communication path 5526. Communication path 5526 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 5518, removable storage unit 5522, and a hard disk installed in hard disk drive 5512. Computer program medium and computer usable medium may also refer to memories, such as main memory 5508 and secondary memory 5510, which may be memory semiconductors (e.g. DRAMs, etc.).

Computer programs (also called computer control logic) are stored in main memory 5508 and/or secondary memory 5510. Computer programs may also be received via communication interface 5524. Such computer programs, when executed, enable computer system 5500 to implement the embodiments as discussed herein. In particular, the computer programs, when executed, enable processor device 5504 to implement the processes of the embodiments discussed here. Accordingly, such computer programs represent controllers of the computer system 5500. Where the embodiments are implemented using software, the software may be stored in a computer program product and loaded into computer system 5500 using removable storage drive 5514, interface 5520, and hard disk drive 5512, or communication interface 5524.

Embodiments of the inventions also may be directed to computer program products comprising software stored on any computer useable medium. Such software, when executed in one or more data processing device, causes a data processing device(s) to operate as described herein. Embodiments of the inventions may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." The term "about" in some embodiments, can be defined to mean within +/−5% of a given value.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) has/have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A golf club, comprising:
   a grip;
   a golf club shaft; and
   a golf club head,
   wherein at least a portion of an outer surface of the golf club head is defined by a layered structure comprising:
      a non-woven composite layer comprising a plurality of unidirectional fiber composite plies, the unidirectional fiber composite plies comprising an innermost unidirectional fiber composite ply and an outermost unidirectional fiber composite ply;
      a woven composite layer disposed over the outermost unidirectional fiber composite ply and comprising color coated fibers; and
      an optically transparent coating disposed over the woven composite layer, the optically transparent coating defining the least a portion of the outer surface of the golf club head,
   wherein the golf club head comprises a crown insert comprising the layered structure.

2. The golf club of claim 1, wherein the woven composite layer comprises a fiber areal weight of 200 grams per meter squared or more.

3. The golf club of claim 1, wherein the golf club head comprises a sole insert comprising the layered structure.

4. The golf club of claim 1, wherein the golf club head comprises a face insert comprising the layered structure.

5. The golf club of claim 1, wherein the color coated fibers of the woven composite layer comprise a core fiber and a metallic coating layer coated on the core fiber.

6. The golf club of claim 5, wherein the core fiber comprises at least one of carbon fiber, fiberglass, or polymer based fibers.

7. The golf club of claim 5, wherein the metallic coating layer is a different color than the core fiber.

8. The golf club of claim 1, wherein the color coated fibers of the woven composite layer are embedded in a polymeric matrix material.

9. The golf club of claim 8, wherein the polymeric matrix material is optically transparent.

10. The golf club of claim 8, wherein the color coated fibers of the woven composite layer comprise a core fiber, a coating layer coated on the core fiber, and a polymeric sizing layer coated on the coating layer and configured to adhere the color coated fibers to the polymeric matrix material.

11. The golf club of claim 1, wherein the color coated fibers of the woven composite layer each comprise color coated carbon fibers.

12. The golf club of claim 1, wherein the woven composite layer comprises a weave pattern selected from the group consisting of: a plain weave pattern, a twill weave pattern, a satin weave pattern, a harness-satin weave pattern, a triaxial pattern, jacquard pattern, an aquarius pattern, a constellation pattern, a galaxy pattern, a rock pattern, an atomic pattern, a wasp pattern, a roswell pattern, a labyrinth pattern, a basket weave pattern, a dobby weave pattern, a piqué weave pattern, a momie weave pattern, a leno weave pattern, a swivel weave pattern, a double weave pattern, a pile weave pattern, a slack-tension weave pattern, a tapestry weave pattern, a spread tow weave pattern, a rib weave pattern, and an oxford weave pattern.

13. The golf club of claim 1, wherein the layered structure has a thickness in the range of 0.10 mm to 1.20 mm.

14. The golf club of claim 1, wherein the layered structure has a thickness in the range of 0.5 mm to 1.0 mm.

15. The golf club of claim 1, wherein the layered structure has a thickness in the range of 0.25 mm to 0.8 mm.

16. The golf club of claim 15, wherein the metallic fiber is a color coated metallic fiber.

17. The golf club of claim 1, wherein the woven composite layer comprises color coated carbon fibers and metallic fibers interwoven with the color coated carbon fibers.

18. The golf club of claim 1, further comprising a movable weight configured to be moved from a first position to a second position in the golf club head.

19. The golf club of claim 1, further comprising a hosel portion configured to receive a sleeve attached to the golf club shaft, the sleeve being capable of being positioned to adjust the loft, lie, or face angle of the golf club head.

20. The golf club of claim 1, wherein the color coated fibers of the woven composite layer comprise colored electroplated fibers.

21. The golf club of claim 1, wherein the outermost unidirectional fiber composite ply comprises color coated fibers.

22. A golf club head, comprising:
   an outer surface comprising at least a portion defined by a layered structure comprising:
      an inner composite layer comprising a plurality of unidirectional fiber composite plies; and
      an outer composite layer disposed over the inner composite layer and comprising color coated fibers embedded in a matrix material,
   wherein the golf club head comprises a crown insert comprising the layered structure.

23. The golf club head of claim 22, wherein the color coated fibers comprise a core fiber and a metallic coating layer coated on the core fiber.

24. A golf club, comprising:
   a grip;
   a golf club shaft; and
   a golf club head comprising a hosel portion configured to receive a sleeve attached to the golf club shaft, the sleeve being capable of being positioned to adjust the loft, lie, or face angle of the golf club head,
   wherein at least a portion of an outer surface of the golf club head is defined by a layered structure comprising:
      an inner composite layer comprising a plurality of unidirectional fiber composite plies; and
      an outer composite layer disposed over the inner composite layer and comprising color coated fibers embedded in a matrix material, wherein the color coated fibers comprise a core fiber and a metallic coating layer coated on the core fiber.

* * * * *

UNITED STATES PATENT AND TRADEMARK OFFICE
CERTIFICATE OF CORRECTION

PATENT NO.         : 10,576,335 B2
APPLICATION NO.    : 16/039844
DATED              : March 3, 2020
INVENTOR(S)        : Greaney et al.

Page 1 of 1

It is certified that error appears in the above-identified patent and that said Letters Patent is hereby corrected as shown below:

In the Claims

In Claim 1, Line 22, delete the phrase "defining the least a portion" and replace it with the phrase --defining the at least a portion--.

Signed and Sealed this
First Day of September, 2020

Andrei Iancu
*Director of the United States Patent and Trademark Office*